US012606672B2

(12) United States Patent
Iida et al.

(10) Patent No.: US 12,606,672 B2
(45) **Date of Patent: *Apr. 21, 2026**

(54) CURABLE COMPOSITION

(71) Applicant: DAIKIN INDUSTRIES, LTD., Osaka (JP)

(72) Inventors: Isao Iida, Tokyo (JP); Kazuhisa Ono, Tokyo (JP); Tetsuo Fujimoto, Tokyo (JP); Kazuki Maruhashi, Osaka (JP); Hisashi Mitsuhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 861 days.

This patent is subject to a terminal disclaimer.

(21) Appl. No.: 17/787,309

(22) PCT Filed: Dec. 10, 2020

(86) PCT No.: PCT/JP2020/046152

§ 371 (c)(1),
(2) Date: Jun. 18, 2022

(87) PCT Pub. No.: WO2021/125058

PCT Pub. Date: Jun. 24, 2021

(65) Prior Publication Data

US 2023/0068054 A1 Mar. 2, 2023

(30) Foreign Application Priority Data

Dec. 19, 2019 (JP) ................................ 2019-229652

(51) Int. Cl.

| | |
|---|---|
| ***C08G 65/336*** | (2006.01) |
| ***C08G 65/00*** | (2006.01) |
| ***C08K 5/5419*** | (2006.01) |
| ***C08K 5/544*** | (2006.01) |
| ***C08K 5/57*** | (2006.01) |

(52) U.S. Cl.

CPC ......... *C08G 65/336* (2013.01); *C08G 65/007* (2013.01); *C08K 5/5419* (2013.01); *C08K 5/544* (2013.01); *C08K 5/57* (2013.01); *C08G 2650/48* (2013.01)

(58) Field of Classification Search

CPC ............................ C08G 65/336; C08K 5/5419

See application file for complete search history.

(56) References Cited

U.S. PATENT DOCUMENTS

| | | | | |
|---|---|---|---|---|
| 4,980,396 A | 12/1990 | Yoshida | | |
| 5,352,752 A | 10/1994 | Koike et al. | | |
| 5,705,591 A | 1/1998 | Matsuda et al. | | |
| 5,919,886 A | 7/1999 | Matsuda et al. | | |
| 6,020,450 A * | 2/2000 | Matsuda | C07F 7/21 | 528/21 |
| 6,218,499 B1 * | 4/2001 | Tarumi | C08G 65/007 | 528/36 |
| 6,716,534 B2 | 4/2004 | Moore et al. | | |
| 7,094,471 B2 | 8/2006 | Moore et al. | | |
| 9,637,600 B2 | 5/2017 | Scheim et al. | | |
| 11,535,749 B2 | 12/2022 | Honda | | |
| 2001/0008914 A1 | 7/2001 | Osawa et al. | | |
| 2004/0091720 A1 | 5/2004 | Moore et al. | | |
| 2005/0164010 A1 | 7/2005 | Trombetta | | |
| 2010/0129672 A1 | 5/2010 | Hao et al. | | |
| 2013/0220177 A1 | 8/2013 | Iyer et al. | | |
| 2014/0302267 A1 | 10/2014 | Wynne et al. | | |
| 2015/0038632 A1 | 2/2015 | Dinkar et al. | | |
| 2017/0152396 A1 | 6/2017 | Jinks et al. | | |
| 2018/0162985 A1 | 6/2018 | Honda et al. | | |
| 2018/0282578 A1 | 10/2018 | Audenaert et al. | | |
| 2019/0048190 A1 | 2/2019 | Stanjek et al. | | |
| 2020/0325277 A1 | 10/2020 | Honda | | |
| 2020/0325279 A1 | 10/2020 | Honda | | |
| 2021/0189072 A1 | 6/2021 | Honda | | |
| 2023/0137488 A1 | 5/2023 | Maruhashi et al. | | |

FOREIGN PATENT DOCUMENTS

| | | |
|---|---|---|
| CN | 1582319 A | 2/2005 |
| CN | 109988504 A | 7/2019 |
| CN | 110229524 A | 9/2019 |
| CN | 106750432 B | 4/2020 |
| DE | 102006021522 A1 | 11/2007 |
| JP | H06166690 A | 6/1994 |
| JP | H06234923 A | 8/1994 |
| JP | H0753919 A | 2/1995 |
| JP | H0977777 A | 3/1997 |
| JP | H0977944 A | 3/1997 |

(Continued)

OTHER PUBLICATIONS

Office Action (Non-Final Rejection) dated Mar. 18, 2025, issued in related U.S. Appl. No. 17/785,414.

Office Action (Non-Final Rejection) dated Mar. 18, 2025, issued in related U.S. Appl. No. 17/787,312.

International Search Report (ISR) (and English translation thereof) dated Feb. 22, 2021, issued in International Application No. PCT/JP2020/046152.

Written Opinion dated Feb. 22, 2021, issued in International Application No. PCT/JP2020/046152.

Office Action (Non-Final Rejection) dated Apr. 22, 2025, issued in related U.S. Appl. No. 17/787,310.

(Continued)

*Primary Examiner* — Vickey Nerangis

(74) *Attorney, Agent, or Firm* — Holtz, Holtz & Volek PC

(57) ABSTRACT

A curable composition includes a perfluoro(poly)ether group-containing silane compound represented by the general formula (I) (wherein, definitions of each group are as described in the specification); (b) an organic silicon compound having at least two $OR^2$ groups bonded to Si atom (here, $R^2$s are each independently a hydrogen atom or a monovalent organic group at each appearance) or a partially hydrolyzed condensate thereof; and (c) a condensation catalyst.

7 Claims, No Drawings

(56) References Cited

FOREIGN PATENT DOCUMENTS

| | | | |
|---|---|---|---|
| JP | H09137027 | A | 5/1997 |
| JP | H09263639 | A | 10/1997 |
| JP | H09263640 | A | 10/1997 |
| JP | 2005220361 | A | 8/2005 |
| JP | 2006182937 | A | 7/2006 |
| JP | 2008007680 | A | 1/2008 |
| JP | 2008101113 | A | 5/2008 |
| JP | 2008214566 | A | 9/2008 |
| JP | 2009191101 | A | 8/2009 |
| JP | 2013060589 | A | 4/2013 |
| JP | 2014501804 | A | 1/2014 |
| JP | 2015521211 | A | 7/2015 |
| JP | 2019112509 | A | 7/2019 |
| JP | 2019151768 | A | 9/2019 |
| WO | 03040247 | A1 | 5/2003 |
| WO | 2016199909 | A1 | 12/2016 |
| WO | 2018168973 | A1 | 9/2018 |
| WO | 2019088110 | A1 | 5/2019 |
| WO | 2019088126 | A1 | 5/2019 |
| WO | 2019088129 | A1 | 5/2019 |
| WO | 2019088133 | A1 | 5/2019 |

OTHER PUBLICATIONS

Extended European Search Report (EESR) dated Nov. 29, 2023, issued in European Application No. 20904141.7 (which is a counterpart of related U.S. Appl. No. 17/787,310).

Chinese Office Action dated Oct. 28, 2023, issued in counterpart Chinese Application No. 202080081804.2 (which is a counterpart of related U.S. Appl. No. 17/787,310).

Yongqiang, et al., "Pervaporation composite membrane for bioethanol separation", First Edition, p. 19, Jun. 2018.

International Search Report (ISR) (and English translation thereof) dated Feb. 16, 2021, issued in International Application No. PCT/JP2020/046154, corresponding to related U.S. Appl. No. 17/787,310.

International Search Report (ISR) (and English translation thereof) dated Feb. 16, 2021, issued in International Application No. PCT/JP2020/046156, corresponding to related U.S. Appl. No. 17/787,312.

International Search Report (ISR) (and English translation thereof) dated Feb. 22, 2021, issued in International Application No. PCT/JP2020/046155, corresponding to related U.S. Appl. No. 17/787,311.

International Search Report (ISR) (and English translation thereof) dated Mar. 2, 2021, issued in International Application No. PCT/JP2020/046153, corresponding to related U.S. Appl. No. 17/785,414.

Notice of Reasons for Revocation (and English translation thereof) dated Jun. 23, 2022, in Japanese Patent No. 6935028, counterpart to related U.S. Appl. No. 17/787,310.

Statement of Opposition to patent (and English translation thereof) dated Apr. 20, 2022, in Japanese Patent No. 6935028, counterpart of related U.S. Appl. No. 17/787,310.

U.S. Appl. No. 17/785,414; First Named Inventor: Isao Iida; Title: "Curable Composition"; filed Jun. 15, 2022.

U.S. Appl. No. 17/787,310; First Named Inventor: Isao Iida; Title: "Curable Composition"; filed Jun. 18, 2022.

U.S. Appl. No. 17/787,311; First Named Inventor: Isao Iida; Title: "Curable Composition"; filed Jun. 18, 2022.

U.S. Appl. No. 17/787,312; First Named Inventor: Isao Iida; Title: "Curable Composition"; filed Jun. 18, 2022.

Written Opinion dated Feb. 16, 2021, issued in International Application No. PCT/JP2020/046154, corresponding to related U.S. Appl. No. 17/787,310.

Written Opinion dated Feb. 16, 2021, issued in International Application No. PCT/JP2020/046156, corresponding to related U.S. Appl. No. 17/787,312.

Written Opinion dated Feb. 22, 2021, issued in International Application No. PCT/JP2020/046155, corresponding to related U.S. Appl. No. 17/787,311.

Written Opinion dated Mar. 2, 2021, issued in International Application No. PCT/JP2020/046153, corresponding to related U.S. Appl. No. 17/785,414.

"Current state of electroconductive carbonblack", Journal of Printing Science and Technology (vol. 44, No. 3), published 2007, pp. 133-143), accessed at URL: https://doi.org/10.11413/nig.44.133.

"Current state of light and ultrafine calcium carbonate industry", Gypsum and Lime, vol. 122, published January 1, 19731, accessed at URL: https://doi.org/10.11451/mukimate 1953.1973.33.

Office Action (Non-Final Rejection) dated Jun. 11, 2025, issued in related U.S. Appl. No. 17/787,311.

Office Action (Final Rejection) dated Sep. 26, 2025, issued in U.S. Appl. No. 17/787,311.

Office Action (Non-Final Rejection) dated Oct. 16, 2025, issued in U.S. Appl. No. 17/787,310.

* cited by examiner

CURABLE COMPOSITION

TECHNICAL FIELD

The present invention relates to a curable composition.

BACKGROUND ART

A composition containing a certain kind of a fluoro(poly) ether-based compound has excellent water repellent property, oil repellent property, etc. For example, in Patent Document 1, there is described about rubber wherein a cured film of a room-temperature curing type perfluoro(poly)ether composition is formed on the surface thereof, and rubber to which release property, solvent resistance, chemical resistance, weather resistance, water repellent property, oil repellent property, etc., had been imparted can be provided. In Example of Patent Document 1, there is described a composition using a compound having $(OCF_2CF(CF_3))_m OCF_2CF_2O(CF(CF_3)CF_2O)_n$ (wherein, m+n=90) as a perfluoro(poly)ether structure. In addition, in Patent Documents 2 to 7, there are described moisture-curable compositions having a perfluoro(poly)ether structure.

PRIOR ART DOCUMENTS

Patent Documents

Patent Document 1: JP 2008-214566A
Patent Document 2: JP Hei. 6-166690A
Patent Document 3: JP Hei. 6-234923A
Patent Document 4: JP Hei. 9-77777A
Patent Document 5: JP Hei. 9-77944A
Patent Document 6: JP Hei. 9-263639A
Patent Document 7: JP Hei. 9-263640A

SUMMARY OF THE INVENTION

Problems to be Solved by the Invention

A cured product of a perfluoro(poly)ether composition can be utilized as rubber having water repellent property, oil repellent property, etc., but in a moisture-curable type curable composition which utilizes a water component such as moisture in the air, for curing the perfluoro(poly)ether composition, if the water component is not entered not only to the surface of the composition but also into inside thereof, it does not become rubber cured at the deep part. If curing to the deep part takes a time, handling property is impaired, and if curing to the deep part is not completed, fixation by adhesion is not stable, whereby these may affect reliability as an adhesive.

An object of the present invention is to provide a curable composition excellent in deep part curability.

Means to Solve the Problems

According to the first gist of the present invention, it is provided a curable composition which comprises (a) a perfluoro(poly)ether group-containing silane compound represented by the following general formula (I):

[Formula 1]

(I)

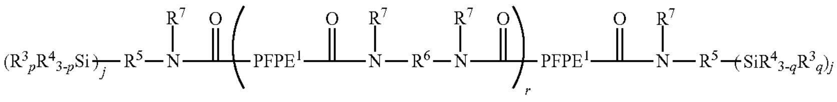

[wherein, $R^3$s each independently represent a hydrogen atom or a monovalent organic group at each appearance, $R^4$s each independently represent a hydroxyl group or a hydrolyzable group(s) at each appearance, $R^5$s each independently represent a j+1 valent organic group at each appearance, $R^6$s each independently represent a divalent organic group at each appearance, $R^7$s each independently represent a hydrogen atom or a lower alkyl group at each appearance, provided that at least one of $R^7$s is a hydrogen atom, $PFPE^1$s are each independently a divalent perfluoro(poly) ether group represented by the formula:

$$-(C_fF_{2f})-(OCF_2)_{a1}-(OC_2F_4)_{a2}-(OC_3X^{10}_6)_{a3}-(OC_4F_8)_{a4}-(OC_5F_{10})_{a5}-(OC_6F_{12})_{a6}-(OC_7F_{14})_{a7}-(OC_8F_{16})_{a8}-$$

(wherein, f is an integer of 1 or more and 10 or less, a1, a2, a3, a4, a5, a6, a7 and a8 are each independently an integer of 0 or more and 200 or less, a sum of a1, a2, a3, a4, a5, a6, a7 and a8 is an integer of 5 or more and 200 or less, and the unit represented by $(C_fF_{2f})$ is located at the left end of the group, the order of existence of each repeating unit enclosed in parentheses with the subscript a1, a2, a3, a4, a5, a6, a7 or a8 is arbitrary in the formula, $X^{10}$s are each independently a hydrogen atom, a fluorine atom or a chlorine atom at each appearance, provided that when all $X^{10}$s are hydrogen atoms or chlorine atoms, at least one of a1, a2, a4, a5, a6, a7 and a8 is an integer of 1 or more) at each appearance, j is each independently an integer of 1 to 9 at each appearance, p and g are each 0 or 1, and r is an integer of 1 or more];

(b) an organic silicon compound having at least two $OR^2$ groups (here, $R^2$s are each independently a hydrogen atom or a monovalent organic group at each appearance) bonded to an Si atom (provided that, (a) is excluded) or a partially hydrolyzed condensate thereof; and (c) a condensation catalyst.

Effects of the Invention

According to the present invention, it can provide a moisture-curable curable composition which is excellent in deep part curability.

EMBODIMENTS TO CARRY OUT THE INVENTION

Hereinafter, the curable composition of the present invention will be explained.

The curable composition of the present invention comprises a perfluoro(poly)ether group-containing silane compound (in the following, sometimes referred to as "PFPE-containing silane compound (a)") which is a compound having two or more Si atoms bonded to at least one group selected from the group consisting of a hydroxyl group and a hydrolyzable group(s), and a perfluoro (poly)ether group, and is represented by the following general formula (I):

[Formula 2]

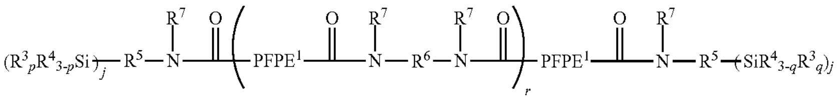

(I)

[wherein, $R^3$s each independently represent a hydrogen atom or a monovalent organic group at each appearance, $R^4$s each independently represent a hydroxyl group or a hydrolyzable group(s) at each appearance, $R^5$s each independently represent a j+1 valent organic group at each appearance, $R^6$s each independently represent a divalent organic group at each appearance, $R^7$s each independently represent a hydrogen atom or a lower alkyl group at each appearance, provided that, at least one of $R^7$s is a hydrogen atom, $PFPE^1$s are each independently a divalent perfluoro(poly) ether group represented by the formula:

$$-(C_fF_{2f})-(OCF_2)_{a1}-(OC_2F_4)_{a2}-(OC_3X^{10}_6)_{a3}-(OC_4F_8)_{a4}-(OC_5F_{10})_{a5}-(OC_6F_{12})_{a6}-(OC_7F_{14})_{a7}-(OC_8F_{16})_{a8}-$$

(wherein, f is an integer of 1 or more and 10 or less, a1, a2, a3, a4, a5, a6, a7 and a8 are each independently an integer of 0 or more and 200 or less, a sum of a1, a2, a3, a4, a5, a6, a7 and a8 is an integer of 5 or more and 200 or less, and the unit represented by ($C_fF_{2f}$) is located at the left end of the group, the order of existence of each repeating unit enclosed in parentheses with the subscript a1, a2, a3, a4, a5, a6, a7 or a8 is arbitrary in the formula, $X^{10}$s are each independently a hydrogen atom, a fluorine atom or a chlorine atom at each appearance, provided that when all $X^{10}$s are hydrogen atoms or chlorine atoms, at least one of a1, a2, a4, a5, a6, a7 and a8 is an integer of 1 or more) at each appearance js are each independently an integer of 1 to 9 at each appearance, p and q are each 0 or 1, and r is an integer of 1 or more], (b) an organic silicon compound having at least two $OR^2$ groups (here, $R^2$s are each independently a hydrogen atom or a monovalent organic group at each appearance) bonded to an Si atom (provided that, the PFPE-containing silane compound (a) is excluded) or a partially hydrolyzed condensate thereof (in the following, sometimes referred to as "crosslinking agent (b)"); and (c) a condensation catalyst.

Incidentally, when used in the present specification, the "2 to 10 valent organic group" means a group of 2 to 10 valent containing a carbon(s). Such a 2 to 10 valent organic group is not particularly limited, and may be mentioned a 2 to 10 valent group in which 1 to 9 hydrogen atoms is/are further eliminated from the hydrocarbon group. The divalent organic group is not particularly limited, and may be mentioned a divalent group in which one hydrogen atom is further eliminated from the hydrocarbon group.

When used in the present specification, the "hydrocarbon group" means a group which is a group containing carbon and hydrogen, and one hydrogen atom is eliminated from the molecule. Such a hydrocarbon group is not particularly limited, and may be mentioned a hydrocarbon group having 1 to 20 carbon atoms which may be substituted by one or more substituents, for example, an aliphatic hydrocarbon group, an aromatic hydrocarbon group, etc. The above-mentioned "aliphatic hydrocarbon group" may be any of linear, branched or cyclic, and may be any of saturated or unsaturated. Also, the hydrocarbon group may contain one or more cyclic structure. Incidentally, such a hydrocarbon group may have one or more N, O, S, Si, amide, sulfonyl, siloxane, carbonyl, carbonyloxy, etc., at the terminal(s) or in the molecular chain.

When used in the present specification, the substituent of the "hydrocarbon group" is not particularly limited, and may be mentioned, for example, one or more groups selected from a halogen atom; a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group and a 5 to 10-membered heteroaryl group, each of which may be substituted by one or more halogen atoms.

In the present specification, the alkyl group and the phenyl group may be unsubstituted or may be substituted, otherwise specifically mentioned. The substituent of such a group is not particularly limited, and there may be mentioned, for example, one or more groups selected from a halogen atom, a $C_{1-6}$ alkyl group, a $C_{2-6}$ alkenyl group and a $C_{2-4}$ alkynyl group.

(PFPE-Containing Silane Compound (a))

The above-mentioned PFPE-containing silane compound (a) is a compound having two or more Si atoms bonded to at least one group selected from the group consisting of a hydroxyl group and a hydrolyzable group(s), and having a perfluoro-(poly)ether group, and having at least one structure represented by —C(═O)NH— to which the perfluoro (poly)ether group is linked.

The term "hydrolyzable group" mean, when used in the present specification, a group capable of undergoing a hydrolysis reaction, that is, a group capable of being eliminated from the main skeleton of a compound by a hydrolysis reaction. Examples of the hydrolyzable group may be mentioned —OR, —OCOR, —O—N═$CR_2$, —$NR_2$, —NHR, a halogen atom (in these formulae, Rs each independently represent a substituted or unsubstituted alkyl group having 1 to 4 carbon atoms), etc., and preferably —OR (that is, an alkoxy group). Examples of R contain an unsubstituted alkyl group such as a methyl group, an ethyl group, a propyl group, an isopropyl group, an n-butyl group, an isobutyl group, a t-butyl group, etc.; and a substituted alkyl group such as a chloromethyl group, etc. Among these, an alkyl group, in particular, an unsubstituted alkyl group is preferable, and a methyl group or an ethyl group is more preferable. A hydroxyl group is not particularly limited, and may be a group generated by hydrolysis of a hydrolyzable group. As the halogen atom, there may be mentioned a fluorine atom, a chlorine atom, a bromine atom and an iodine atom, and among these, a chlorine atom is preferable.

The Si atom bonded to at least one group selected from the group consisting of a hydroxyl group and a hydrolyzable group(s) is preferably present at both ends of the main chain of the molecule of the PFPE-containing silane compound (a). In the present specification, the main chain of the molecule of the PFPE-containing silane compound (a) represents a relatively longest binding chain in the molecule of the PFPE-containing silane compound (a).

The perfluoro(poly)ether group represented by $PFPE^1$ is the formula:

$$—(C_fF_{2f})—(OCF_2)_{a1}—(OC_2F_4)_{a2}—(OC_3X^{10}{}_6)_{a3}—(OC_4F_8)_{a4}—(OC_5F_{10})_{a5}—(OC_6F_{12})_{a6}—(OC_7F_{14})_{a7}—(OC_8F_{16})_{a8}—.$$

Wherein, f is an integer of 1 to 10, a1, a2, a3, a4, a5, a6, a7 and a8 are each independently an integer of 10 or more and 200 or less, a sum of a1, a2, a3, a4, a5, a6, a7 and a8 is at least more than 5, more preferably more than 10, for example, 10-200. The unit represented by $(C_fF_{2f})$ is located at the left end of the group, the order of existence of each repeating unit enclosed in parentheses with the subscript a1, a2, a3, a4, a5, a6, a7 or a8 is arbitrary in the formula, $X^{10}$s are each independently a hydrogen atom, a fluorine atom or a chlorine atom at each appearance, provided that all $X^{10}$s are hydrogen atoms or chlorine atoms, at least one of a1, a2, a4, a5, a6, a7 and a8 is an integer of 1 or more. In the following, the perfluoro(poly)ether group having the above-mentioned structure sometimes refers to as "$PFPE^1$". The curable composition of the present invention can have a low glass transition temperature (Tg) by having the above $PFPE^1$. The -$PFPE^1$- portion in the present specification is a polymer structure comprising one kind or a plural kind of fluoroalkyl ether structures in combination. a1 to a8 or a sum thereof refers to the number of recurring units of the fluoroalkyl ether structure in the polymer, and these values are an average value in each structure unit in the polymer, and it can be understood for those skilled in the art that it is an approximate value. For example, when $PFPE^1$ is represented by $-(C_fF_{2f})-(OCF_2)_{a1}-(OC_2F_4)_{a2}-$, the value of a1 represents an average of the number of the $(OCF_2)_{a1}$ unit per each -$PFPE^1$- portion, and the value of a2 represents an average of the number of the $(OC_2F_4)_{a2}$ unit per each -$PFPE^1$- portion, respectively, and when it is described as a1+a2=, it represents that the average of the sum of each recurring unit is the value (approximate value).

In one embodiment, a1 and a2 are each independently an integer of 0 or more and 200 or less, in one preferred embodiment, a1 and a2 are each independently an integer of 1 or more and 200 or less. The value of a1 and a2 are preferably, each independently an integer of 1 or more and 50 or less. A sum of a1 and a2 is an integer of preferably 20 or more, more preferably 30 or more, further preferably 40 or more.

In one embodiment, a3, a4, a5, a6, a7 and a8 are integers each independently, preferably 0 or more and 30 or less, more preferably integers of 20 or less, further preferably integers of 10 or less, particularly preferably integers of 5 or less, and may be 0.

In one embodiment, a sum of a3, a4, a5, a6, a7 and a8 is preferably 30 or less, more preferably integers of 20 or less, further preferably 10 or less, and particularly preferably integers of 5 or less.

In one embodiment, it is preferable that a1 is an integer of 0 or more and 50 or less, a2 is an integer of 0 or more and 50 or less, a3 is an integer of 0 or more and 30 or less, a4 to a8 are 0, and a sum of a1, a2 and a3 is 5 or more and 50 or less.

These recurring units may be linear or branched. Also, even if the recurring units have the same number of carbon atoms, two or more kinds of different linear or branched structures can be simultaneously contained in $PFPE^1$. These recurring units are preferably linear. For example, $-(OC_8F_{16})-$ may be $-(OCF_2CF_2CF_2CF_2CF_2CF_2CF_2CF_2)-$, $-(OCF(CF_3)CF_2CF_2CF_2CF_2CF_2CF_2)-$, $-(OCF_2CF(CF_3)CF_2CF_2CF_2CF_2CF_2)-$, $-(OCF_2CF_2CF(CF_3)CF_2CF_2CF_2CF_2)-$, $-(OCF_2CF_2CF_2CF(CF_3)CF_2CF_2CF_2)-$, $-(OCF_2CF_2CF_2CF_2CF(CF_3)CF_2CF_2)-$, $-(OCF_2CF_2CF_2CF_2CF_2CF(CF_3)CF_2)-$, $-(OCF_2CF_2CF_2CF_2CF_2CF_2CF(CF_3))-$, etc., and preferably $-(OCF_2CF_2CF_2CF_2CF_2CF_2CF_2CF_2)-$. $-(OC_7F_{14})-$ may be $-(OCF_2CF_2CF_2CF_2CF_2CF_2CF_2)-$, $-(OCF(CF_3)CF_2CF_2CF_2CF_2CF_2)-$, $-(OCF_2CF(CF_3)CF_2CF_2CF_2CF_2)-$, $-(OCF_2CF_2CF(CF_3)CF_2CF_2CF_2)-$, $-(OCF_2CF_2CF_2CF(CF_3)CF_2CF_2)-$, $-(OCF_2CF_2CF_2CF_2CF(CF_3)CF_2)-$, $-(OCF_2CF_2CF_2CF_2CF_2CF(CF_3))-$, etc., and preferably $-(OCF_2CF_2CF_2CF_2CF_2CF_2CF_2)-$. $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, etc., and preferably $-(OCF_2CF_2CF_2CF_2CF_2CF_2)-$, $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, etc., and preferably $-(OCF_2CF_2CF_2CF_2CF_2)-$, $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, and preferably $-(OCF_2CF_2CF_2CF_2)-$. $-(OC_3F_6)-$ (that is, $X^{10}$ is a fluorine atom in the above-mentioned formula) may be any of $-(OCF_2CF_2CF_2)-$, $-(OCF(CF_3)CF_2)-$ and $-(OCF_2CF(CF_3))-$, and preferably $-(OCF_2CF_2CF_2)-$. Also, $-(OC_2F_4)-$ may be any of $-(OCF_2CF_2)-$ and $-(OCF(CF_3))-$, and preferably $-(OCF_2CF_2)-$.

The unit represented by $-(C_fF_{2f})-$ is a structure located at the end of the left side of $PFPE^1$. "f" is an integer of 1 to 10, preferably an integer of 1 to 6, more preferably an integer of 1 to 4. It is more preferable that the value off is the same as the number of carbon atoms contained in any one of the recurring units possessed by $PFPE^1$. The unit represented by $-(C_fF_{2f})-$ may be linear or may be branched. Accordingly, the unit represented by $-(C_fF_{2f})-$ can have a structure, for example, in addition to $-(CF_2)-$, such as $-(CF_2CF_2)-$, $-(CF(CF_3))-$, $-(CF_2CF_2CF_2)-$, $-(CF(CF_3)CF_2)-$, $-(CF_2CF(CF_3))-$, $-(CF_2CF_2CF_2CF_2)-$, $-(CF(CF_3)CF_2CF_2)-$, $-(CF_2CF(CF_3)CF_2)-$, $-(CF_2CF_2CF(CF_3))-$, $-(CF(CF_2CF_3)CF_2)-$, $-(CF_2CF(CF_2CF_3))-$, $-(CF_2C(CF_3)_2CF_2)-$, etc.

The PFPE-containing silane compound (a) may have a recurring units comprising an oxygen atom and a perfluoroalkylene group having 9 or more carbon atoms in addition to these recurring units, as long as it is a material capable of preparing as a perfluoropolyether group.

In one embodiment, $PFPE^1$ has a linear recurring units. In this embodiment, motility of the molecule of the PFPE-containing silane compound (a) at a low temperature is less likely to lower. By having a linear recurring units, physical property values (for example, elastic modulus at a low temperature) of the PFPE-containing silane compound (a) can be less likely to low as compared with the values at room temperature. Therefore, the composition can be applied on the wide range of temperature. Incidentally, in the present specification, "elastic modulus" indicates dynamic elastic modulus, more specifically storage elastic modulus.

$PFPE^1$ is preferably $-(C_fF_{2f})-(OCF_2)_{a1}-(OC_2F_4)_{a2}-(OC_3F_6)_{a3}-(OC_4F_8)_{a4}-$ (wherein, f is an integer of 1 to 4, preferably an integer of 1 to 3, a1 and a2 are each independently an integer of 1 or more and 200 or less, preferably 5 or more and 200 or less, more preferably 10 or more and 200 or less, a3 and a4 are each independently an integer of 0 or more and 30 or less, and the order of existence of each repeating unit with the subscripts a1, a2, a3 or a4 and enclosed in parentheses is arbitrary in the formula). $PFPE^1$ is preferably $-(C_fF_{2f})-(OCF_2)_{a1}-(OCF_2CF_2)_{a2}-$ $(OCF_2CF_2CF_2)_{a3}$—$(OCF_2CF_2CF_2CF_2)_{a4}$—. In one more preferred embodiment, PFPE[1] is —$(C_fF_{2f})$—$(OCF_2)_{a1}$—$(OC_2F_4)_{a2}$— (wherein, f is 1 or 2, a1 and a2 are each independently an integer of 1 or more and 200 or less, preferably 5 or more and 200 or less, more preferably 10 or more and 200 or less, and the order of existence of each repeating unit with the subscripts a1 or a2 and enclosed in parentheses is arbitrary in the formula).

In the above-mentioned PFPE[1], the quantitative relationship between the respective values of the values of a1, a2, a3, a4, a5, a6, a7 and a8 is not particularly limited as long as they satisfy the respective ranges. For example, when the structure represented by —$(OCF_2)_{a1}$— is used with a much amount, rubber characteristics can be easily maintained even at a low temperature and it can be made a composition suitable for low temperature use. Also, when the structure represented by —$(OC_2F_4)_{a2}$— is used with a much amount, it is more advantageous due to formation of a cured product which is difficultly decomposed at a high temperature. Depending on the physical properties required for the final use, the structure and the composition of PFPE[1] can be appropriately adjusted.

In another preferred embodiment, PFPE[1] is a divalent perfluoro(poly)ether group represented by the formula:

$$—(C_fF_{2f})—(OCF_2)_{a1}—(OCF_2CF_2)_{a2l}—(OCF(CF_3))_{a2'}—(OCF_2CF_2CF_2)_{a3l}—(OCF_2CF(CF_3))_{a3'}—(OCF(CF_3)CF_2)_{a3''}—(OCF_2CF_2CF_2CF_2)_{a4}—$$

(here, f is an integer of 1 or more and 4 or less, and more preferably 1 or more and 3 or less, a1, a2l, a2', a3l, a3', a3" and a4 are each independently an integer of 10 or more and 200 or less, a sum of a2l and a2' equals to a2, a sum of a3l, a3' and a3" equals to a3, a sum of a1, a2l, a2', a3l, a3', a3" and a4 is 5 or more, and the order of existence of each repeating unit is arbitrary in the formula). In a more preferable example as an embodiment, PFPE[1] is a divalent perfluoro(poly)ether group wherein, in the above-mentioned formula, a1 is an integer of 0 or more and 50 or less, a2 is an integer of 0 or more and 50 or less, a3 is an integer of 0 or more and 30 or less, a4 is an integer of 0 or more and 30 or less, and a sum of a1, a2, a3 and a4 is 5 or more and 200 or less. In a further preferable example as an embodiment, PFPE[1] is a perfluoro(poly)ether group having recurring units represented by —$(OCF_2CF(CF_3))_{a3'}$— and/or —$(OCF(CF_3)CF_2)_{a3''}$—. That is, in another more preferable embodiment, PFPE[1] has a branched perfluoroalkyl group, in particular, has a perfluoropropyl group. Specific examples thereof may be mentioned the following structures.

$$-(C_fF_{2f})-(OCF_2CF(CF_3))_{a3'}-(OCF_2CF_2)-(OCF(CF_3)CF_2)_{a3''}-(OCF(CF_3))-(C_fF_{2f})-(OCF_2CF(CF_3))_{a3'}-(OCF_2CF_2CF_2CF_2)-(OCF(CF_3)CF_2)_{a3''}-(OCF(CF_3)-$$

In the curable composition of the present invention, the cured product thereof is difficultly decomposed at a high temperature. In the present specification, the cured product is "difficultly decomposed at a high temperature" refers to that 1% decomposition temperature of the cured product is in a relatively high temperature. That is, the curable composition of the present invention can contribute to formation of a cured product that can be used in a wide temperature range. In the present specification, "1% decomposition temperature" means a temperature at which 1% by mass of the cured product decomposes based on the whole cured product. The 1% decomposition temperature means a value measured by thermogravimetric and differential thermal analysis (TG/DTA), and specifically, it is measured under an Air atmosphere with a temperature raising rate of 10° C./min and in the range of 25° C. to 600° C. As the above-mentioned TG/DTA, for example, there may be mentioned DTG-60 manufactured by Shimadzu Corporation.

A number average molecular weight of the -PFPE[1]- portion is preferably in the range of 2,000 to 200,000, and more preferably in the range of 3,000 to 100,000. The above-mentioned number average molecular weight is defined to be a value measured by $^{19}F$-NMR.

In one embodiment, the number average molecular weight of the -$PFPE^1$-portion can be in the range of 2,000 to 10,000, and preferably to be in the range of 2,000 to 5,000. By having the number average molecular weight of the -$PFPE^1$- portion as mentioned above, a viscosity of the curable composition can be low and handling property thereof can be good. The curable composition having the number average molecular weight of the -$PFPE^1$- portion as mentioned above is also advantageous, for example, in the point of suppressing the viscosity when it is made a solution state using together with a solvent.

In one embodiment, the number average molecular weight of the -$PFPE^1$-portion can be in the range of 10,000 to 100,000, and preferably to be in the range of 10,000 to 50,000. By having the number average molecular weight of the -$PFPE^1$-portion as mentioned above, physical properties such as elongation characteristics of the curable composition after curing can be good.

"r" in the general formula (I) of the above-mentioned PFPE-containing silane compound (a) represents a number of a recurring unit of the structure shown by the following formula:

$$—PFPE^1—C(=O)NR^7—R^6—NR^7C(=O)—$$

in the general formula (I). The value of r is 1 or more. Accordingly, in the above-mentioned PFPE-containing silane compound (a), at least two units having the structure represented by —C(=O)$NR^7$— are present at the both terminals of -$PFPE^1$-. That is, the above-mentioned PFPE-containing silane compound (a) has at least four structures represented by —C(=O)$NR^7$—. The value of r is not particularly limited as long as it is in the range of capable of preparing the above-mentioned PFPE-containing silane compound (a), and preferably an integer of 1 or more and 5 or less. According to this, the parts that can be considered to contribute to deep part curability of the curable composition can be provided in one molecule with a large number.

Although the present invention is not bound by any particular theory, the structure represented by —C(=O)$NR^7$— can contribute to formation of a hydrogen bond with a water molecule by the oxygen of the carbonyl group and the hydrogen atom when $R^7$ is hydrogen. By increasing a number of the structure represented by —C(O)$NR^7$— in one molecule, it results to have the portions that generate the hydrogen bond with a large number, so that affinity with water that participates in curing of the curable composition is increased. Therefore, it can be considered to be preferable since the curing reaction easily occurs at the deep part of the curable composition. Accordingly, by having the value of r of 1 or more in the above-mentioned general formula (I), a number of the amide bonds contained in each one molecule of the PFPE-containing silane compound (a) is increased. This structure can bring about improvement in affinity with water molecules by the hydrogen bond, and can be considered to contribute to good deep part curability of the curable composition.

$R^7$ in the structure represented by the above-mentioned —C(O)$NR^7$— each independently represent a hydrogen atom or a lower alkyl group at each appearance. Provided that at least one, preferably at least three of R's is/are a hydrogen atom(s). That is, by preferably having a plurality of the structures represented by —C(=O)NH— in the above-mentioned PFPE-containing silane compound (a), the obtainable curable composition can be cured well to a deep part. When a part(s) of Res is/are a hydrogen atom(s), it is not particularly limited whether $R^7$ at which position in the above-mentioned PFPE-containing silane compound (a) is a hydrogen atom. In the preparation of the above-mentioned PFPE-containing silane compound (a), the position at which the structure represented by —C(=O)NH— is introduced can be controlled by selection of the raw material. From the viewpoint of forming hydrogen bonds, it is preferable that a ratio of hydrogen atoms among all $R^7$s present in the PFPE-containing silane compound (a) is large since deep part curability is more improved, and in a particularly preferable embodiment, all $R^7$s in the above-mentioned PFPE-containing silane compound (a) are hydrogen atoms.

In the above-mentioned PFPE-containing silane compound (a), the structure represented by the above-mentioned —C(=O)$NR^7$— is bound to an organic group represented by $R^5$ or $R^6$ through the nitrogen atom.

$R^5$ is a group that acts as a linker to link the silicon atom at the terminal with the amide bond. $R^5$s each independently represent a j+1 valent organic group at each appearance. Here, the value of j represents a number of the groups containing a silicon atom(s) existing at the terminal of the above-mentioned PFPE-containing silane compound (a), and the value is in the range of 1 to 9. Accordingly, $R^5$s each independently represent a 2 to 10 valent organic group at each appearance. Therefore, the $R^5$s may be any group as long as it is a 2 to 10 valent organic group in which the above-mentioned PFPE-containing silane compound (a) can exist stably. The definition of the "2 to 10 valent organic group" is as defined previously. Specific examples of $R^5$ may be mentioned those described as the portion corresponding to $R^5$ in the formulae (A) to (D) mentioned later. $R^5$ is preferably a 2 to 7 valent, more preferably a 2 to 4 valent, and further preferably a divalent organic group. Accordingly, the value of j is preferably 1 to 6, more preferably 1 to 3, and further preferably 1.

$R^5$ preferably does not have a hetero atom or an aromatic structure on the molecular chain directly linking the silicon atom and the amide bond, and more preferably does not have an aromatic structure. As $R^5$, it is preferable to be an aliphatic hydrocarbon group which may have a hetero atom(s) occasionally, more preferably an unsubstituted aliphatic hydrocarbon, and further preferably a divalent alkylene group. As $R^5$, it is more preferably a $C_{1-20}$ alkylene group, further preferably a $C_{1-6}$ alkylene group, and particularly specifically, a methylene group, an ethylene group, a propylene group, a methylethylene group, a butylene group, a hexamethylene group, etc. The two $R^5$s existing in the above-mentioned PFPE-containing silane compound (a) may be the same or different from each other, and are preferably the same since preparation of the compound becomes easy. Also, $R^5$ has j+1 bonding arms, it may be bonded to the —C(=O)$NR^7$— portion with any bonding arm.

$R^6$ is a divalent organic group linking the structures represented by the above-mentioned —C(=O)$NR^7$—. The definition of the "divalent organic group" is the same as that in the case where $R^5$ is a divalent organic group, and as $R^6$, it is preferably a divalent alkylene group, more preferably a $C_{1-20}$ alkylene group, further preferably a $C_{1-6}$ alkylene group, and particularly specifically, a methylene group, an ethylene group, a propylene group, a methylethylene group, a butylene group, a hexamethylene group, etc. Also, $R^6$ is a group linking two —C(═O)NR$^7$— portions, and as long as it can be prepared as a stable compound, two bonding arms possessed by R$^6$ may be bonded to either of the —C(═O)NR$^7$— portions at the both sides thereof. For example, when R$^6$ is a methylethylene group (—CH(CH$_3$)CH$_2$—) in the above-mentioned formula (I), the CH$_2$-portion of the methylethylene group may be bonded to the —C(═O)NR$^7$— portion present on the right side in the formula (I), or may be bonded to the —C(═O)NR$^7$— portion present on the left side. The R$^6$ portion can be introduced by, for example, acting a diamine on a compound having reactive functional groups capable of forming a bond with R$^5$ or R$^6$ through an amide bond, at the both terminals of PFPE$^1$ (hereinafter, such a compound is referred to as a "PFPE-modified product" and, for example, the said compound when the terminal is an ester group, it is sometimes referred to as a "PFPE ester modified product"). A number of the R$^6$ portion (in other words, the value of r) in the molecular chain can be controlled by adjusting an amount relationship of the reactants.

R$^5$ and R$^6$ are preferably both divalent alkylene groups.

The above-mentioned PFPE-containing silane compound (a) has a structure represented by $R^3{}_pR^4{}_{3-p}$Si— or $R^3{}_qR^4{}_{3-q}$Si— as the structure of the molecular terminals. The definitions of R$^3$, R$^4$, p and q are as defined above. That is, at the molecular terminals of the above-mentioned PFPE-containing silane compound (a), a structure in which two or three hydroxyl groups or hydrolyzable groups are bonded to the silicon atom is present. The "hydrolyzable group" has the same meaning as defined above. Different groups may be mixedly present in each of R$^3$s and R$^4$s in one molecule or one molecular terminal structure. The structure(s) in which two or three hydroxyl groups or hydrolyzable groups are bonded to the silicon atom is/are present at each terminal of the molecule with a number of j. The value of j is in the range of 1 to 9. Accordingly, the PFPE-containing silane compound (a) has at least two above-mentioned terminal structures. The value of j is preferably 1. That is, in a preferred embodiment, the PFPE-containing silane compound (a) is a linear molecule having silicons to which hydrolyzable groups are bonded at the both terminals.

In the above-mentioned formula, R$^3$s are each independently a hydrogen atom or a monovalent organic group at each appearance. As R$^3$, it is preferably an alkyl group having 1 to 22 carbon atoms, and more preferably an alkyl group having 1 to 4 carbon atoms.

R$^4$ is a hydroxyl group or a hydrolyzable group, and is preferably a hydrolyzable group. Examples of the hydrolyzable group are as mentioned above, and among these, in particular, —OR (here, R represents a substituted or unsubstituted alkyl group having 1 to 4 carbon atoms), that is, an alkoxy group is preferred. Examples of the alkoxy group may be mentioned an unsubstituted alkoxy group such as a methoxy group, an ethoxy group, a propoxy group, an isopropoxy group, an n-butoxy group, an isobutoxy group, etc.; and a substituted alkoxy group such as a chloromethoxy group, etc. Among these, a methoxy group or an ethoxy group is more preferred.

p or q is each 0 or 1. It is preferably to be 0. Accordingly, the PFPE-containing share compound (a) has a structure in which two or three hydroxyl groups or hydrolyzable groups are bonded to the silicon atom. Also, the structure at the molecular terminal of the PFPE-containing silane compound (a) is preferably a trialkoxysilyl group, and more preferably a trimethoxysilyl group.

In a particularly preferred embodiment, the PFPE-containing silane compound (a) is a compound in which R$^7$s are all hydrogen atoms, R$^5$ and R$^6$ are divalent alkylene groups, j is 1, and p and q are 0. The PFPE-containing silane compound (a) may be used with a single kind of the compound alone, or may be used with two or more kinds as a mixture. As a non-limitative example of the specific PFPE-containing silane compound (a), there may be mentioned a compound having the following structure.

$$(CH_3O)_3Si—CH_2CH_2CH_2—NHCO—CF_2—(OCF_2)_{29}—(OCF_2CF_2)_{17}—OCF_2—CONHCH_2CH_2NHCO—CF_2—(OCF_2)_{29}—(OCF_2CF_2)_{17}—OCF_2—CONH—CH_2CH_2CH_2—Si(OCH_3)_3$$

Here, the subscripts of the fluoroalkyl ether structure represent an average number of recurring units represented by each structure.

Depending on the preparation method of the PFPE-containing silane compound (a), a compound having a structure in which a silyl group and optionally a linker portion are not introduced at one or both terminal portions of PFPE-modified product or a compound in which the PFPE-modified products are connected with R$^6$ may be produced in some cases. Hereinafter, a compound in which a silyl group is not contained at least one of the both terminals of the molecular chain constituted by such PFPE$^1$ may be sometimes indicated to as a "non-terminalized PFPE modified product". The purity of the compound represented by the formula (I) is preferably high, that is, a contained ratio of such a non-terminalized PFPE modified product is preferably small, and the PFPE-containing silane compound (a) may contain the non-terminalized PFPE modified product within the range which does not impair the function as a curable composition. For example, in the case of the above-mentioned general formula (I), a compound having a structure in which a carboxylic acid group, an ester group, a hydroxyl group or an alkylene-OH group is bonded to the structure represented by {-PFPE$^1$-C(O)NR$^7$—R$^6$—NR$^7$C(O)—}$_r$PFPE$^1$- may be contained. The purity of the PFPE-containing silane compound (a) can be made a terminalization rate of the silane as a measure, which shows how much the silyl group is introduced into the terminals. The terminalization rate can be measured by the ratio of the material in which the silyl group is introduced into the portion based on the total amount of the substance in which it is not sandwiched by R$^6$ among the PFPE$^1$ portion. The terminalization rate is preferably 90 mol % or more, more preferably 93 mol % or more, and further preferably 95 mol % or more. By making it within this range, a compound in which both terminals of the molecule are silylated can be contained with a sufficient amount, and the function as a curable composition can be sufficiently exhibited.

The terminalization rate can be determined by, for example, NMR measurement. In the case of the compound of the general formula (I), by measuring the CF$_2$ group existing at the terminal of PFPE$^1$, that is, the CF$_2$ group adjacent to the amide group bonded to the linker is measured by $^{19}$F NMR, how many silyl groups are introduced into the molecular terminal can be obtained. In a compound having a structure different from that of the compound of the general formula (I), the terminalization rate can be calculated by the NMR measurement at the portion different between the compound in which the terminal is silylated or not, and the method is well known for those skilled in the art.

Hereinafter, as one embodiment of the above-mentioned PFPE-containing silane compound (a), a specific structure will be explained in detail. The above-mentioned PFPE-containing silane compound (a) is preferably at least one kind of the compound represented by the formula (A), (B), (C) or (D). Each group and subscript appearing in the following formulae can correspond to the group and subscript appearing in the above-mentioned general formula, respectively, and those skilled in the art can grasp the corresponding relationship between them.

[Formula 3]

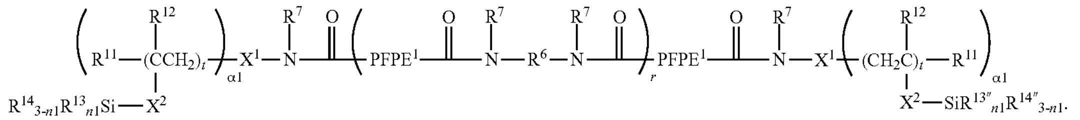
(A)

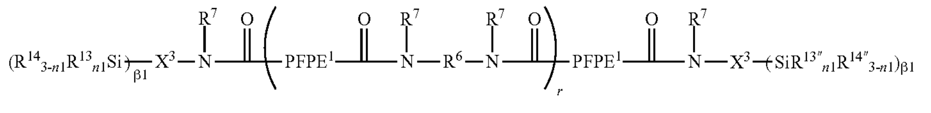
(B)

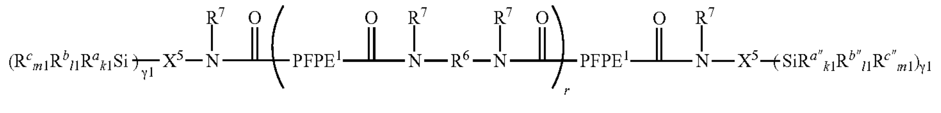
(C)

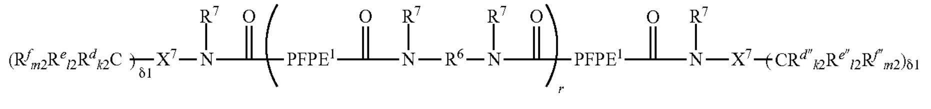
(D)

(wherein, $PFPE^1$, $R^6$ and $R^7$ have the same meanings as defined above.)

Hereinafter, the PFPE-containing silane compounds (a) represented by the above-mentioned formulae (A), (B), (C) and (D) will be explained.

Formula (A):

[Formula 4]

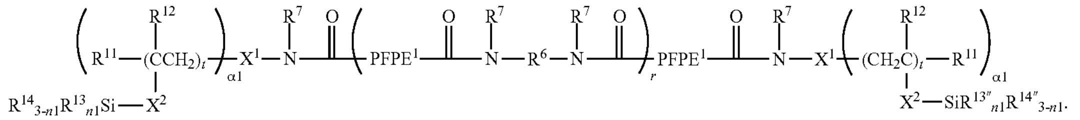
(A)

In the above-mentioned formula, $PFPE^1$, $R^6$ and $R^7$ have the same meanings as defined above.

In the above-mentioned formula, $R^{13}$s each independently represent a hydroxyl group or a hydrolyzable group(s) at each appearance. The hydrolyzable group has the same meaning as defined above. That is, $R^{13}$ can be corresponded to $R^4$ of the above-mentioned general formula.

In the above-mentioned formula, $R^{14}$s each independently represent a hydrogen atom or an alkyl group having 1 to 22 carbon atoms, and preferably an alkyl group having 1 to 4 carbon atoms at each appearance. That is, $R^{14}$ can be corresponded to $R^3$ of the above-mentioned general formula.

In the above-mentioned formula, $R^{11}$s each independently represent a hydrogen atom or a halogen atom at each appearance. The halogen atom is preferably an iodine atom, a chlorine atom or a fluorine atom, and more preferably a fluorine atom.

In the above-mentioned formula, $R^{12}$s each independently represent a hydrogen atom or a lower alkyl group at each appearance. The lower alkyl group is preferably an alkyl group having 1 to 20 carbon atoms, more preferably an alkyl group having 1 to 6 carbon atoms, and may be mentioned, for example, a methyl group, an ethyl group, a propyl group, etc.

In the above-mentioned formula, $R^{11''}$, $R^{12''}$, $R^{13''}$ and $R^{14''}$ have the same meanings as $R^{11}$, $R^{12}$, $R^{13}$ and $R^{14}$, respectively.

In the above-mentioned formula (A), the Si atom bonded to at least one group selected from the group consisting of a hydroxyl group and a hydrolyzable group(s) refers to an Si atom wherein n1 is an integer of 1 to 3, and it is contained in ($—SiR^{13}_{n1}R^{14}_{3-n1}$) or ($—SiR^{13''}_{n1}R^{14''}_{3-n1}$).

In the above-mentioned formula, n1 is an integer of 0 to 3, is preferably 1 to 3, and is more preferably 3, which is independently each ($—SiR^{13}_{n1}R^{14}_{3-n1}$) unit or each ($—SiR^{13''}_{n1}R^{14''}_{3-n1}$) unit. In the formula, at least two of "n1"s are integers of 1 to 3, that is, all the "n1"s do not become 0 simultaneously. That is, in the formula, there exist at least two Si atoms to which $R^{13}$ or $R^{13''}$ is bonded. In other words, in the formula (A), there exist at least two structures selected from the group consisting of the $—SiR^{13}_{n1}R^{14}_{3-n1}$ structure (that is, $—SiR^{13}$ portion) wherein n1 is 1 or more and the $—SiR^{13''}_{n1}R^{14''}_{3-n1}$ structure (that is, $—SiR^{13''}$ portion) wherein n1 is 1 or more. That is, n1 can be corresponded to the value of 3-p or 3-q of the above-mentioned general formula.

In the formula (A), the Si atom bonded to at least one group selected from the group consisting of a hydroxyl group and a hydrolyzable group(s) is preferably present at the both terminals of the molecular main chain. That is, in the formula (A), there exist at least one $—SiR^{13}_{n1}R^{14}_{3-n1}$ structure (that is, $—SiR^{13}$ portion) wherein n1 is 1 or more, and at least one $—SiR^{13''}_{n1}R^{14''}_{3-n1}$ structure (that is, $—SiR^{13''}$ portion) wherein n1 is 1 or more.

In the above-mentioned formula, $X^1$s each independently represent a single bond or a 2 to 10 valent organic group linked to an amide bond. The said $X^1$ is, in the compound represented by the formula (A), considered to be a part of a linker which links the perfluoro(poly)ether part (that is, $-PFPE^1-$ part) that mainly provides water repellent property and surface slipperiness, etc., and the silane part that provides a bonding ability to a substrate. Accordingly, the said $X^1$ may be a single bond, or either of the organic groups as long as the compound represented by the formula (A) can exist stably. That is, it can be understood that $X^1$ corresponds to a part of $R^5$ in the above-mentioned general formula with $X^2$ mentioned later and a hydrocarbon group linked thereto. Incidentally, in the present specification, in the group described as $X^1$, the left side of the description is bonded to an amide bond adjacent to the group represented by $PFPE^1$ and the right side is bonded to the group enclosed with parentheses, respectively. Provided that, the group described as $X^1$ includes, as long as it can be prepared as a stable compound, a group that binds in the opposite direction, for example, when it is $CO—C_6H_4—$, that in which a phenylene group is bonded to an amide bond adjacent to the group represented by $PFPE^1$, described as $—C_6H_4—CO—$.

In another embodiment, $X^1$ can be $X^e$. $X^e$ represents a single bond or a 2 to 10 valent organic group, and preferably a single bond or a 2 to 10 valent organic group having at least one selected from the group consisting of $—C_6H_4—$ (that is, -phenylene-. Hereinafter, it represents a phenylene group.), —O— (an ether group), —CO— (a carbonyl group), $—NR^{40}—$ and $—SO_2—$. The above-mentioned $R^{40}$s each independently represent a hydrogen atom, a phenyl group or a $C_{1\ to\ 6}$ alkyl group (preferably a methyl group), and preferably a hydrogen atom or a methyl group. The above-mentioned $—C_6H_4$, —CO—, $—NR^{40}—$ or $—SO_2—$ is preferably contained in the molecular main chain of the PFPE-containing silane compound (A).

$X^e$ more preferably represents a single bond or a 2 to 10 valent organic group having at least one selected from the group consisting of $—C_6H_4—$, $—CONR^{40}—$, $—CONR^{40}—C_6H_4—$, —CO—, $—CO—C_6H_4—$, $—O—CO—NR^{40}—$, $—SO_2NR^{40}—$, $—SO_2NR^{40}—C_6H_4—$, $—SO_2—$ and $—SO_2\text{-}C_6H_4—$. The above-mentioned $—C_6H_4—$, $—CONR^{40}—$, $—CONR^{40}—C_6H_4—$, —CO—, $—CO—C_6H_4—$, $—SO_2NR^{40}—$, $—SO_2NR^{40}—C_6H_4—$, $—SO_2—$ or $—SO_2\text{-}C_6H_4—$ is preferably contained in the molecular main chain of the PFPE-containing silane compound (A).

In the above-mentioned formula, $\alpha 1$ is an integer of 1 to 9, and can be changed depending on the number of the valence of $X^1$. In the formula (A), $\alpha 1$ is a value subtracting 1 from the value of the number of the valence of $X^1$. When $X^1$ is a single bond or a divalent organic group, then $\alpha 1$ is 1. That is, $\alpha 1$ can correspond to the value of j of the above-mentioned general formula.

The above-mentioned $X^1$ is preferably 2 to 7 valence, more preferably 2 to 4 valence, and further preferably a divalent organic group.

In one embodiment, $X^1$ is a 2 to 4 valent organic group, and $\alpha 1$ is 1 to 3.

In another embodiment, $X^1$ is a divalent organic group, and $\alpha 1$ is 1. In this case, the formula (A) is represented by the following formula (A').

[Formula 5]

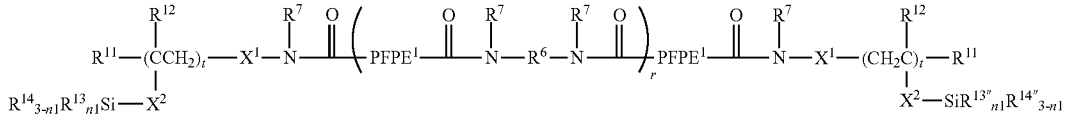

Examples of the above-mentioned $X^1$ are not particularly limited as long as it can form a bonding with an amide group linked to the $PFPE^1$ group and is capable of preparing the compound stably, for example, a divalent group represented by the following formula:

$$-(R^{31})_{p'}-(X^a)_{q'}-$$

[wherein:

$R^{31}$ represents a single bond, $-(CH_2)_{s'}-$ or an o-, m- or p-phenylene group, and preferably $-(CH_2)_{s'}-$, s' is an integer of 1 to 20, preferably an integer of 1 to 6, more preferably an integer of 1 to 3, and further more preferably 1 or 2, $X^a$ represents $-(X^b)_{l'}-$, $X^b$s each independently represent a group selected from the group consisting of —O—, —S—, an o-, m- or p-phenylene group, —C(O)O—, $-Si(R^{33})_2-$, $-(Si(R^{33})_2O)_{m'}-Si(R^{33})_2-$, $CONR^{34}-$, $-O-CONR^{34}-$, $-NR^{34}-$ and $-(CH_2)_{n'}-$ at each appearance, $R^{33}$s each independently represent a phenyl group, a $C_{1-6}$ alkyl group or a $C_{1-6}$ alkoxy group at each appearance, preferably a phenyl group or a C alkyl group, and more preferably a methyl group, $R^{34}$s each independently represent a hydrogen atom, a phenyl group or a $C_{1-6}$ alkyl group (preferably a methyl group) at each appearance, preferably a hydrogen atom, m' is each independently an integer of 1 to 100, and preferably an integer of 1 to 20 at each appearance, n' is each independently an integer of 1 to 20, preferably an integer of 1 to 6, and more preferably an integer of 1 to 3 at each appearance, l' is an integer of 1 to 10, preferably an integer of 1 to 5, and more preferably an integer of 1 to 3, p' is 0 or 1, q' is 0 or 1, here, at least one of p' and q' is 1, and the order of existence of each recurring units enclosed with parentheses applied with p' or q' is arbitrary]

is exemplified. Here, $R^{31}$ and $X^a$ (typically a hydrogen atom of $R^{31}$ and $X^a$) may be substituted by one or more substituents selected from a fluorine atom, a $C_{1-3}$ alkyl group and a $C_{1-3}$ fluoroalkyl group. With the proviso that, when $R^{31}$ is a single bond or p' is 0, $X^a$ is not $-CONR^{34}-$ or $-NR^{34}-$.

In one embodiment, l' in the above-mentioned formula is 1.

$X^1$ is preferably $-(R^{31})_{p'}-(X^a)_{q'}-R^{32}-$. $R^{32}$ represents a single bond, $-(CH_2)_{t'}-$ or an o-, m- or p-phenylene group, and preferably $-(CH_2)_{t'}-$. t' is an integer of 1 to 20, preferably an integer of 2 to 6, and more preferably an integer of 2 to 3. Here, $R^{32}$ (typically a hydrogen atom in $R^{32}$) may be substituted by one or more substituents selected from a fluorine atom, a $C_{1-3}$ alkyl group and a $C_{1-3}$ fluoroalkyl group.

$X^1$ can be preferably a single bond, a $C_{1-20}$ alkylene group, $-X^b-$ $-R^{31}-X^c-R^{32}-$, or $-X^d-R^{31}-$

[wherein, $R^{31}$ and $R^{32}$ have the same meanings as defined above.].

Incidentally, the alkylene group refers to a group having a $-(C_\delta H_{2\delta})-$ structure, which may be substituted or unsubstituted, and may be linear or branched.

$X^1$ is more preferably a single bond, a $C_{1-20}$ alkylene group, $-X^b-$ $-(CH_2)_{s'}-X^c-$, $-(CH_2)_{s'}-X^c-(CH_2)_{t'}-$, $-X^d-$, or $X^d-(CH_2)_{t'}-$

[wherein, s' and t' have the same meanings as defined above].

$X^1$ is further preferably $-X^b-$ $-X^f-$, $-X^f-C_{1-20}$ alkylene group, $-X^f-(CH_2)_{s'}-X^c-$, $-X^f-(CH_2)_{s'}-X^c-(CH_2)_{t'}-$ $-X^f-X^d-$, or $-X^f-X^d-(CH_2)_{t'}-$.

In the formulae, s' and t' have the same meanings as defined above.

In the above-mentioned formulae, $X^f$ is an alkylene group having 1 to 6 carbon atoms, preferably 1 to 4 carbon atoms, and more preferably 1 to 2 carbon atoms, for example, a methylene group. The hydrogen atom in $X^f$ may be substituted by one or more substituents selected from a fluorine atom, a $C_{1-3}$ alkyl group and a $C_{1-3}$ fluoroalkyl group, and preferably substituted. $X^f$ may be linear or branched, and preferably linear.

In the above-mentioned formula, $X^c$ represents

—O—,

—S—,

—C(O)O—, $-CONR^{34}-$, $-O-CONR^{34}-$, $-Si(R^{33})_2-$, $-(Si(R^{33})_2O)_{m'}-Si(R^{33})_2-$, $-O-(CH_2)_{u'}-(Si(R^{33})_2O)_{m'}-Si(R^{33})_2-$, $-O-(CH_2)_{u'}-Si(R^{33})_2-O-Si(R^{33})_2-CH_2CH_2-Si(R^{33})_2-O-Si(R^{33})_2-$, $-O-(CH_2)_{u'}-Si(OCH_3)_2OSi(OCH_3)_2-$, $-(CH_2)_{u'}-(Si(R^{33})_2O)_{m'}-Si(R^{33})_2-$, $-(CH_2)_{u'}-N(R^{34})-$, (o-, m- or p-phenylene)-$Si(R^{33})_2-$, $-CONR^{34}-(CH_2)_{u'}-(Si(R^{33})_2O)_{m'}-Si(R^{33})_2-$, $-CONR^{34}-(CH_2)_{u'}-N(R^{34})-$, or $-CONR^{34}$-(o-, m- or p-phenylene)-$Si(R^{33})_2-$

[wherein, $R^{33}$, $R^{34}$ and m' have the same meanings as defined above, and u' is an integer of 1 to 20, preferably an integer of 2 to 6, and more preferably an integer of 2 to 3.]. With the proviso that, when R31 is a single bond, $X^c$ is not a group having $-CONR^{34}-$ in the terminal. $X^c$ is preferably —O—.

In the above-mentioned formula, $X^d$ represents

—S—,

—C(O)O—, $-(CH_2)_{u'}-(Si(R^{33})_2O)_{m'}-Si(R^{33})_2-$, $-(CH_2)_{u'}-N(R^{34})-$, (o-, m- or p-phenylene)-$Si(R^{33})_2-$, $-CONR^{34}-$, $-CONR^{34}-(CH_2)_{u'}-(Si(R^{33})_2O)_{m'}-Si(R^{33})_2-$, $-CONR^{34}-(CH_2)_{u'}-N(R^{34})-$, or $-CONR^{34}$-(o-, m- or p-phenylene)-$Si(R^{33})_2-$

[wherein, each symbol has the same meaning as defined above].

and particularly preferably, $X^1$ is groups represented by $—X^b—$ $—X^f—$, $—X^f—C_{1-20}$ alkylene group, $—X^f—(CH_2)_{s'}—X^c—$, $—X^f—(CH_2)_{s'}—X^c—(CH_2)_{t'}—$ $—X^f—X^d—$, or $—X^f—X^d—(CH_2)_{t'}—$

[wherein, $X^b$, $X^f$, s' and t' have the same meanings as defined above], $X^b$ is $—CONR^{34}—$ $X^c$ is —O— or $—CONR^{34}—$, $X^d$ is $—CONR^{34}—$,

[$R^{34}$s each independently represent a hydrogen atom, a phenyl group or a $C_{1-6}$ alkyl group (preferably a methyl group) at each appearance].

In one embodiment, $X^1$ is groups represented by $—X^b—$ $—X^f—(CH_2)_{s'}—X^c—$, $—X^f—(CH_2)_{s'}—X^c—(CH_2)_{t'}—$ $—X^f—X^d—$, or $—X^f—X^d—(CH_2)_{t'}—$

[wherein, $X^f$, s' and t' have the same meanings as defined above], $X^b$ is $—CONR^{34}—$ $X^b$ is $—CONR^{34}—$, $X^d$ is $—CONR^{34}—$,

[$R^{34}$s each independently represent a hydrogen atom, a phenyl group or a $C_{1-6}$ alkyl group (preferably a methyl group) at each appearance].

In one embodiment, $X^1$ can be a single bond, a $C_{1-20}$ alkylene group, $—X^b—$ $—(CH_2)_{s'}—X^c—(CH_2)_{t'}—$, or $—X^d—(CH_2)_{t'}—$

[wherein, each symbol has the same meaning as defined above.]. With the proviso that $X^d$ is not $—CONR^{34}—$ $X^1$ is preferably a single bond, a $C_{1-20}$ alkylene group, $—CONR^{34}—$ $—(CH_2)_{s'}—O—(CH_2)_{t'}—$, $—(CH_2)_{s'}—(Si(R^{33})_2O)_{m'}—Si(R^{33})_2—(CH_2)_{t'}—$, $—(CH_2)_{s'}—O—(CH_2)_{t'}—(Si(R^{33})_2O)_{m'}—Si(R^{33})_2—(CH_2)_{t'}—$, or $—(CH_2)_{s'}—O(CH_2)_{t'}—Si(R^{33})_2—(CH_2)_{u'}—Si(R^{33})_2—(C_vH_{2v})—$

[wherein, $R^{33}$, $R^{34}$, m', s', t' and u' have the same meanings as defined above, v is an integer of 1 to 20, preferably an integer of 2 to 6, and more preferably an integer of 2 to 3.].

In the above-mentioned formula, $—(C_vH_{2v})—$ may be linear or may be branched, and, for example, can be $—CH_2—$, $—CH_2CH_2—$, $—CH_2CH_2CH_2—$, $—CH(CH_3)—$ or $—CH(CH_3)CH_2—$.

$X^1$ group may be substituted by one or more substituents selected from a fluorine atom, a $C_{1-3}$ alkyl group and a $C_{1-3}$ fluoroalkyl group (preferably a $C_{1-3}$ perfluoroalkyl group).

In one embodiment, $X^1$ group can be other than the $—O—C_{1-6}$ alkylene group.

In another embodiment, as the $X^1$ group, for example, there may be mentioned the following groups:

[Formula 6]

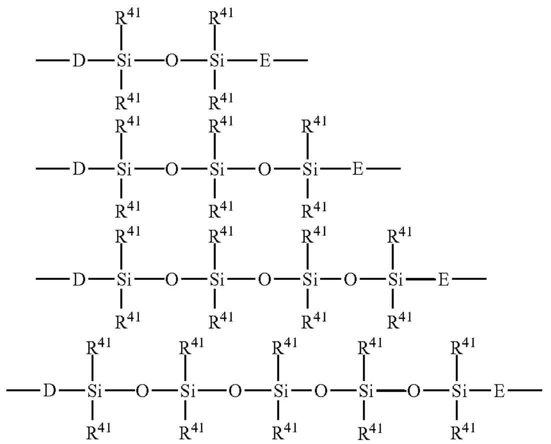

[Formula 7]

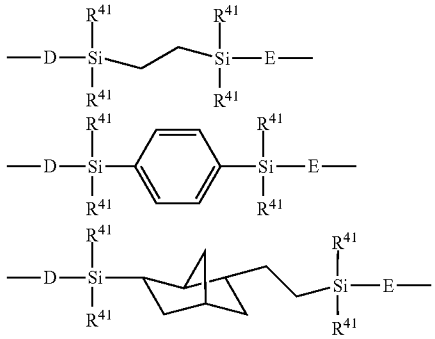

[wherein, $R^{41}$s are each independently a hydrogen atom, a phenyl group, an alkyl group having 1 to 6 carbon atoms or a $C_{1-6}$ alkoxy group, preferably a methyl group;

D is a group selected from $—CH_2O(CH_2)_2—$, $—CH_2O(CH_2)_3—$, $—CF_2O(CH_2)_3—$, $—(CH_2)_2—$, $—(CH_2)_3—$, $—(CH_2)_4—$, and (1,3-phenylene)-$Si(R^{42})_2—(CH_2)_2—$ (wherein, $R^{42}$s each independently represent a hydrogen atom, a $C_{1-6}$ alkyl group or a $C_{1-46}$ alkoxy group, preferably a methyl group or a methoxy group, more preferably a methyl group.), E is $—(CH_2)_{ne}—$ (ne is an integer of 2 to 6), D binds to $PFPE^1$ of the main chain of the molecule, and E binds to the group opposite to $PFPE^1$.]

Specific examples of $X^{1'}$ may be mentioned, for example:

a single bond, $—CH_2OCH_2—$, $—CH_2O(CH_2)_2—$, $—CH_2O(CH_2)_3—$, $—CH_2O(CH_2)_6—$, $—CF_2—CH_2—O—CH_2—$, $—CF_2—CH_2—O—(CH_2)_2—$, $—CF_2—CH_2—O—(CH_2)_3—$, $—CF_2—CH_2—O—(CH_2)_6—$, $—CH_2O(CH_2)_3Si(CH_3)_2OSi(CH_3)_2(CH_2)_2—$, $—CH_2O(CH_2)_3Si(CH_3)_2OSi(CH_3)_2OSi(CH_3)_2(CH_2)_2—$, —$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CF_2$—$CON(CH_3)$—$(CH_2)_3$—,
—$CF_2$—CON(Ph)-$(CH_2)_3$— (wherein, Ph means phenyl),
—$CF_2$—$CON(CH_3)$—$(CH_2)_6$—,
—$CF_2$—CON(Ph)-$(CH_2)_6$— (wherein, Ph means phenyl),
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—$(CH_2)_3Si(CH_3)_2OSi(CH_3)_2(CH_2)_2$—,
—$(CH_2)_3Si(CH_3)_2OSi(CH_3)_2OSi(CH_3)_2(CH_2)_2$—,
—$(CH_2)_3Si(CH_3)_2O(Si(CH_3)_2O)_2Si(CH_3)_2(CH_2)_2$—,
—$(CH_2)_3Si(CH_3)_2O(Si(CH_3)_2O)_3Si(CH_3)_2(CH_2)_2$—,
—$(CH_2)_3Si(CH_3)_2O(Si(CH_3)_2O)_{10}Si(CH_3)_2(CH_2)_2$—,
—$(CH_2)_3Si(CH_3)_2O(Si(CH_3)_2O)_2OSi(CH_3)_2(CH_2)_2$—,
—C(O)O—$(CH_2)_3$
—C(O)O—$(CH_2)_6$
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—$CH(CH_3)$—,
—$CH_2$—O—$(CH_2)_3$—$Si(CH_3)_2$—$(CH_2)_2$—$Si(CH_3)_2$—$(CH_2)_3$—,
—$CH_2$—O—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—,
1,3-phenylene,
-(1,3-phenylene)-$Si(R^{42})_2$—$(CH_2)_2$—
and the like.

Among the above, $X^1$ is preferably to be
a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CF_2$—$CON(CH_3)$—$(CH_2)_3$—, —$CF_2$—CON(Ph)-$(CH_2)_3$— (wherein, Ph means phenyl),
—$CF_2$—CON($CH_3$)—$(CH_2)_6$—,
—$CF_2$—CON(Ph)-$(CH_2)_6$— (wherein, Ph means phenyl),
—$(CH_2)_2NH(CH_2)_3$—,
—$(CH_2)_6NH(CH_2)_3$—,
—$CH_2O$—CONH—$(CH_2)_3$—,
—$CH_2O$—CONH—$(CH_2)_6$—,
—$OCH_2$—,
—$O(CH_2)_3$—, or
—$OCFHCF_2$—.

Among the above, $X^1$ is more preferably
a single bond,
—$CH_2OCF_2CHFOCF_2CF_2CF_2$—C(O)NH—$CH_2$—,
—$CH_2$—,
—$(CH_2)_2$—,
—$(CH_2)_3$—,
—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CF_2$—CON($CH_3$)—$(CH_2)_3$—,
—$CF_2$—CON(Ph)-$(CH_2)_3$— (wherein, Ph means phenyl),
—$CF_2$—CON($CH_3$)—$(CH_2)_6$—,
—$CF_2$—CON(Ph)-$(CH_2)_6$— (wherein, Ph means phenyl),
—$(CH_2)_2NH(CH_2)_3$—,
—$(CH_2)_6NH(CH_2)_3$—.

In one embodiment, $X^1$ represents $X^{e'}$. $X^{e'}$ is a single bond, an alkylene group having 1 to 6 carbon atoms, —$R^{51}$—$C_6H_4$—$R^{52}$—, —$R^{51}$—$CONR^{40}$—$R^{52}$—, —$R^{51}$—$CONR^{40}$—$C_6H_4$—$R^{52}$—, —$R^{51}$—CO—$R^{52}$—, —$R^{51}$—CO—$C_6H_4$—$R^{52}$—, —$R^{51}$—$SO_2NR^{40}$—$R^{52}$—, —$R^{51}$—$SO_2NR^{40}$—$C_6H_4$—$R^{52}$—, —$R^{51}$—$SO_2$—$R^{52}$—, or —$R^{51}$—$SO_2$-$C_6H_4$—$R^{52}$—. $R^{51}$ and $R^{52}$ each independently represent a single bond or an alkylene group having 1 to 6 carbon atoms (with the proviso that when $R^{51}$ connects to —$CONR^{40}$—, $R^{51}$ is not a single bond), and preferably a single bond or an alkylene group having 1 to 3 carbon atoms. $R^{43}$ has the same meaning as defined above. The above-mentioned alkylene group is substituted or unsubstituted, and preferably unsubstituted. As the substituent(s) of the above-mentioned alkylene group, there may be mentioned, for example, a halogen atom, and preferably a fluorine atom. The above-mentioned alkylene group is linear or branched, and preferably linear.

In a preferred embodiment, $X^{e'}$ can be
a single bond,
—$X^f$—,
an alkylene group having 1 to 6 carbon atoms, preferably having 1 to 3 carbon atoms,
—$X^f$—$C_{1-6}$ alkylene group, preferably —$X^f$—$C_{1-3}$ alkylene group, and more preferably
—$X^f$—$C_{1-2}$ alkylene group,
—$C_6H_4$—$R^{52'}$—,
—$X^f$—$CONR^{4'}$—$R^{52'}$—,
—$X^f$—$CONR^{4'}$—$C_6H_4$—$R^{52'}$—,
—CO—$R^{52'}$—,
—CO—$C_6H_4$—$R^{52'}$—,
—$SO_2NR^{4'}$—$R^{52'}$—,
—$SO_2NR^{4'}$—$C_6H_4$—$R^{52'}$—,
—$SO_2$—$R^{52'}$—
—$SO_2$-$C_6H_4$—$R^{52'}$—,
—$R^{51'}$—$C_6H_4$—,
—$R^{51'}$—$CONR^{4'}$—,
—$R^{51'}$—$CONR^{4'}$—$C_6H_4$—,
—$R^{51'}$—CO—$C_6H_4$—,
—$R^{51'}$—$SO_2NR^{4'}$—,
—$R^{51'}$—$SO_2NR^{4'}$—$C_6H_4$—,
—$R^{51'}$—$SO_2$—,
—$R^{51'}$—$SO_2$-$C_6H_4$—,
—$C_6H_4$—,
—$X^f$—$CONR^{43'}$—,
—$X^f$—$CONR^{43'}$—$C_6H_4$—,
—CO—,
—CO—$C_6H_4$—,
—$SO_2NR^{43'}$—,
—$SO_2NR^{43}$—$C_6H_4$—,
—$SO_2$—, or
—$SO_2$-$C_6H_4$—,
(wherein, $R^{51'}$ and $R^{52'}$ are each independently a linear alkylene group having 1 to 6 carbon atoms, and preferably 1 to 3 carbon atoms. As mentioned above, the above-mentioned alkylene group is substituted or substituted, and as the substituent for the above-mentioned alkylene group, there may be mentioned, for example, a halogen atom, and preferably a fluorine atom. $R^{4'}$ is a hydrogen atom or a methyl group.).

Among the above-mentioned, $X^{e'}$ is preferably
—$X^f$—,
an alkylene group having 1 to 6 carbon atoms, and preferably having 1 to 3 carbon atoms,
—$X^f$—$C_{1-6}$ alkylene group, preferably —$X^f$—$C_{1-3}$ alkylene group, and more preferably
—$X^f$—$C_{1-2}$ alkylene group,
—$C_6H_4$—$R^{52'}$—,
—$X^f$—$CONR^4$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$X^f$—$CONR^{4'}$—,
—$X^f$—$CONR^{4'}$—$C_6H_4$—,
—$R^{51'}$—$CONR^{4'}$—, or
—$R^{51'}$—$CONR^{4'}$—$C_6H_4$—.

In the formula, $X^f$, $R^{51'}$ and $R^{52'}$ each have the same meanings as defined above.

Among the above-mentioned, $X^{e'}$ can be more preferably
a single bond,
—$R^{52'}$—,
—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$C_6H_4$—,
—$X^1$—$CONR^{4'}$—, or
—$X^f$—$CONR^{4'}$—$C_6H_4$—.

In this embodiment, specific examples of $X^{e'}$ may be mentioned, for example,
a single bond,
an alkylene group having 1 to 6 carbon atoms,
a perfluoroalkylene group having 1 to 6 carbon atoms (for example, —$CF_2$—, —$(CF_2)_2$—, etc.),
—$CF_2$-$C_{1-6}$ alkylene group,
—$CH_2$—,
—$(CH_2)_2$—,
—$(CH_2)_3$—,
—$CF_2$—CONH—,
—$CF_2CONHCH_2$—,
—$CF_2CONH(CH_2)_2$—, $—CF_2CONH(CH_2)_3—$,
$—CF_2—CON(CH_3)—$,
$—CF_2—CON(CH_3)CH_2—$,
$—CF_2—CON(CH_3)—(CH_2)_2—$,
$—CF_2—CON(CH_3)—(CH_2)_3—$,
$—CH_2—CONH—$,
$—CH_2—CONH—CH_2—$,
$—CH_2—CONH—(CH_2)_2—$,
$—CH_2—CONH—(CH_2)_3—$,
$—CF_2—CH_2—CONH—$,
$—CF_2—CH_2—CONH—CH_2—$,
$—CF_2—CH_2—CONH—(CH_2)_2—$,
$—CF_2—CH_2—CONH—(CH_2)_3—$,
$—C_6H_4—$,
$—CH_2—CON(CH_3)—CH_2—$,
$—CH_2—CON(CH_3)—(CH_2)_2—$,
$—CH_2—CON(CH_3)—(CH_2)_3—$,
$—CF_2—CONH—C_6H_4—$,
$—CF_2—CON(CH_3)—C_6H_4—$,
$—CF_2—CH_2—CON(CH_3)—CH_2—$,
$—CF_2—CH_2—CON(CH_3)—(CH_2)_2—$,
$—CF_2—CH_2—CON(CH_3)—(CH_2)_3—$,
$—CF_2—CON(CH_3)—C_6H_4—$,
$—CO—$,
$—CO—C_6H_4—$,
$—C_6H_4—$,
$—SO_2NH—$,
$—SO_2NH—CH_2—$,
$—SO_2NH—(CH_2)_2—$,
$—SO_2NH—(CH_2)_3—$,
$—SO_2NH—C_6H_4—$,
$—SO_2N(CH_3)—$,
$—SO_2N(CH_3)—CH_2—$,
$—SO_2N(CH_3)—(CH_2)_2—$,
$—SO_2N(CH_3)—(CH_2)_3—$,
$—SO_2N(CH_3)—C_6H_4—$,
$—SO_2—$,
$—SO_2—CH_2—$,
$—SO_2—(CH_2)_2—$,
$—SO_2—(CH_2)_3—$, or
$—SO_2\text{-}C_6H_4—$,
etc.

Among the above-mentioned exemplification, preferred $X^{e\prime}$ may be mentioned
a single bond,
an alkylene group having 1 to 6 carbon atoms,
a perfluoroalkylene group having 1 to 6 carbon atoms (for example, $—CF_2—$, $—(CF_2)_2—$, etc.),
$—CF_2—C_{1\text{-}6}$ alkylene group,
$—CH_2—$,
$—(CH_2)_2—$,
$—(CH_2)_3—$,
$—CF_2CONH—$,
$—CF_2CONHCH_2—$,
$—CF_2CONH(CH_2)_2—$,
$—CF_2CONH(CH_2)_3—$,
$—CF_2—CON(CH_3)—$,
$—CF_2—CON(CH_3)CH_2—$,
$—CF_2—CON(CH_3)—(CH_2)_2—$,
$—CF_2—CON(CH_3)—(CH_2)_3—$,
$—CH_2—CONH—$,
$—CH_2—CONH—CH_2—$,
$—CH_2—CONH—(CH_2)_2—$,
$—CH_2—CONH—(CH_2)_3—$,
$—CF_2—CH_2—CONH—$,
$—CF_2—CH_2—CONH—CH_2—$,
$—CF_2—CH_2—CONH—(CH_2)_2—$,
$—CF_2—CH_2—CONH—(CH_2)_3—$,
$—C_6H_4—$,
$—CH_2—CON(CH_3)—CH_2—$,
$—CH_2—CON(CH_3)—(CH_2)_2—$,
$—CH_2—CON(CH_3)—(CH_2)_3—$,
$—CF_2—CONH—C_6H_4—$,
$—CF_2—CON(CH_3)—C_6H_4—$,
$—CF_2—CH_2—CON(CH_3)—CH_2—$,
$—CF_2—CH_2—CON(CH_3)—(CH_2)_2—$,
$—CF_2—CH_2—CON(CH_3)—(CH_2)_3—$,
$—CF_2—CON(CH_3)—C_6H_4—$,
etc.

Among the above-mentioned exemplification, more preferred $X^{e\prime}$ may be mentioned
a single bond,
$—CH_2—$,
$—(CH_2)_2—$,
$—(CH_2)_3—$,
$—CF_2CONH—$,
$—CF_2CONHCH_2—$,
$—CF_2CONH(CH_2)_2—$,
$—CF_2CONH(CH_2)_3—$,
$—CF_2—CON(CH_3)—$,
$—CF_2—CON(CH_3)CH_2—$,
$—CF_2—CON(CH_3)—(CH_2)_2—$,
$—CF_2—CON(CH_3)—(CH_2)_3—$,
$—CH_2—CONH—$,
$—CH_2—CONH—CH_2—$,
$—CH_2—CONH—(CH_2)_2—$,
$—CH_2—CONH—(CH_2)_3—$,
$—CF_2—CH_2—CONH—$,
$—CF_2—CH_2—CONH—CH_2—$,
$—CF_2—CH_2—CONH—(CH_2)_2—$,
$—CF_2—CH_2—CONH—(CH_2)_3—$,
$—C_6H_4—$,
$—CH_2—CON(CH_3)—CH_2—$,
$—CH_2—CON(CH_3)—(CH_2)_2—$,
$—CH_2—CON(CH_3)—(CH_2)_3—$,
$—CF_2—CONH—C_6H_4—$,
$—CF_2—CON(CH_3)—C_6H_4—$,
$—CF_2—CH_2—CON(CH_3)—CH_2—$,
$—CF_2—CH_2—CON(CH_3)—(CH_2)_2—$,
$—CF_2—CH_2—CON(CH_3)—(CH_2)_3—$, or
$—CF_2—CON(CH_3)—C_6H_4—$,
etc.

In one embodiment, $X^{e\prime}$ is a single bond.

In yet another embodiment, $X^1$ is a group represented by the formula: $—(R^{16})_x—(CFR^{17})_y—(CH_2)_z—$. In the formula, x, y and z are each independently an integer of 0 to 10, a sum of x, y and z is 1 or more, and the order of existence of each recurring units enclosed with parentheses is arbitrary in the formula.

In the above-mentioned formula, $R^{16}$s each independently represent an oxygen atom, phenylene, carbazolylene, $—NR^{18}—$ (wherein, $R^{18}$ represents a hydrogen atom or an organic group at each appearance) or a divalent organic group. $R^{16}$ is preferably an oxygen atom or a divalent polar group.

The above-mentioned "divalent polar group" is not particularly limited, and may be mentioned $—C(O)—$, and $—C({=}NR^{19})—$ (wherein $R^{19}$ represents a hydrogen atom or a lower alkyl group). The "lower alkyl group" is, for example, an alkyl group having 1 to 6 carbon atoms, for example, a methyl group, an ethyl group and an n-propyl group, and these may be substituted by one or more fluorine atoms.

In the above-mentioned formula, $R^{17}$s are each independently a hydrogen atom, a fluorine atom or a lower fluoroalkyl group, and preferably a fluorine atom at each appearance. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, and further preferably a trifluoromethyl group.

In this embodiment, $X^1$ is preferably a group represented by the formula: $—(O)_x—(CF_2)_y—(CH_2)_z—$ (wherein, x, y and z have the same meanings as defined above, and the order of existence of each recurring units enclosed with parentheses is arbitrary in the formula).

As the group represented by the above-mentioned formula: $—(O)_x—(CF_2)_y—(CH_2)_z—$, there may be mentioned, for example, a group represented by $—(O)_{x'}—(CH_2)_{z''}—O—[(CH_2)_{z'''}—O—]_{z''''}—$, and $—(O)_{x'}—(CF_2)_{y''}—(CH_2)_{z''}—O—[(CH_2)_{z'''}—O—]_{z''''}$ (wherein, x' is 0 or 1, y'', z'' and z''' are each independently an integer of 1 to 10, and z'''' is 0 or 1). Incidentally, the left end of these groups is bonded to the $PFPE^1$ side.

In another preferred embodiment, $X^1$ is $—O—CFR^{20}—(CF_2)_{e'}—$.

The above-mentioned $R^{20}$s each independently represent a fluorine atom or a lower fluoroalkyl group. Here, the lower fluoroalkyl group is, for example, a fluoroalkyl group having 1 to 3 carbon atoms, preferably a perfluoroalkyl group having 1 to 3 carbon atoms, more preferably a trifluoromethyl group and a pentafluoroethyl group, and further preferably a trifluoromethyl group.

The above-mentioned e's are each independently 0 or 1.

In one specific example, $R^{20}$ is a fluorine atom, and e' is 1.

In yet another embodiment, examples of $X^1$ group may be mentioned the following groups:

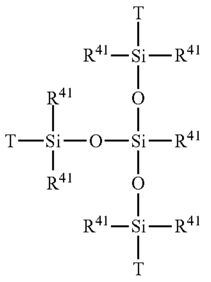

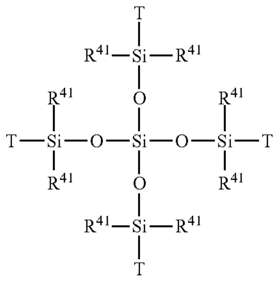

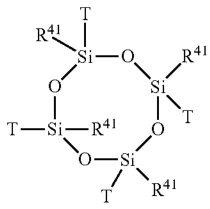

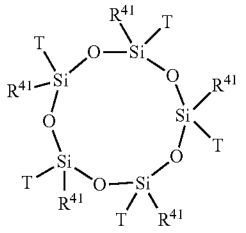

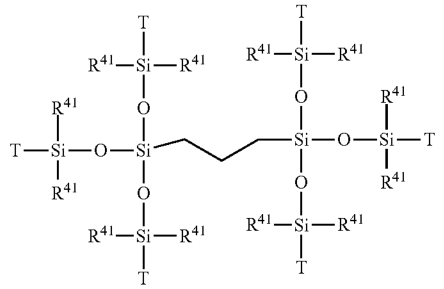

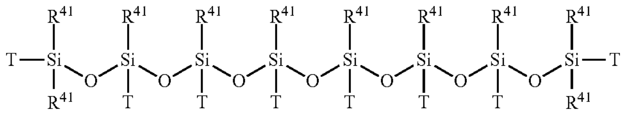

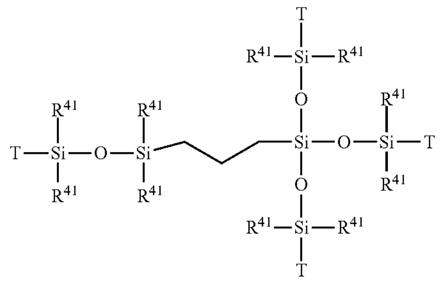

-continued

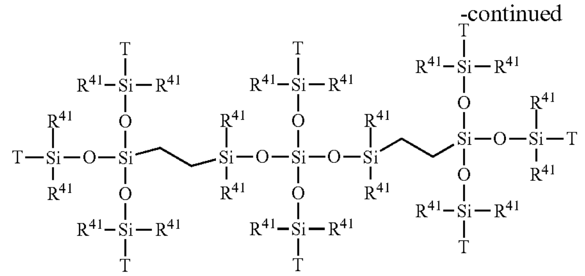

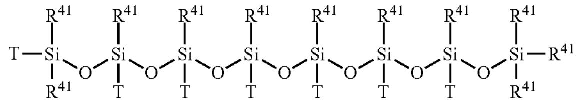

[wherein, $R^{41}$s are each independently a hydrogen atom, a phenyl group, an alkyl group having 1 to 6 carbon atoms or a $C_{1\ to\ 6}$ alkoxy group, and preferably a methyl group;

In the group $X^1$, one of T is the following group bonded to the amide bonding connected to $PFPE^1$ of the main chain of the molecule:

$—CH_2O(CH_2)_2—$, $—CH_2O(CH_2)_3—$, $—CF_2O(CH_2)_3—$, $—CH_2—$, $—(CH_2)_2—$, $—(CH_2)_3—$, $—(CH_2)_4—$, or

-(1,3-phenylene)-Si($R^4$—$(CH_2)_2$—

[wherein, $R^{42}$s each independently represent a hydrogen atom, a $C_{1-6}$ alkyl group or a $C_{1-6}$ alkoxy group, preferably a methyl group or a methoxy group, and more preferably a methyl group.], some of the other Ts is/are $—(CH_2)_{n''}$-(n" is an integer of 2 to 6) bonded to the group opposite to $PFPE^1$ of the main chain of the molecule, and the remaining Ts, when it is present, can be each independently a methyl group, a phenyl group, a $C_{1-6}$ alkoxy group or a radical capturing group or an ultraviolet absorbing group. Incidentally, also in the above-mentioned embodiment, in the groups described as $X^1$, left side is bonded to the amide bonding connected to the group represented by $PFPE^1$ and the right side is bonded to the opposite side of the group represented by $PFPE^1$, respectively.

The radical capturing group is not particularly limited as long as it can capture radicals generated by photoirradiation, and there may be mentioned, for example, residues of benzophenones, benzotriazoles, benzoic acid esters, phenyl salicylate, crotonic acids, malonic acid esters, organoacrylates, hindered amines, hindered phenols or triazines.

The ultraviolet absorbing group is not particularly limited as long as it can absorb ultraviolet rays, and there may be mentioned, for example, residues of benzotriazoles, hydroxybenzophenones, esters of substituted and unsubstituted benzoic acid or salicylic acid compounds, acrylates or alkoxy cinnamates, oxamides, oxanilides, benzoxazinones or benzoxazoles.

In a preferred embodiment, as the preferred radical capturing group or ultraviolet absorbing group, there may be mentioned

[Formula 9]

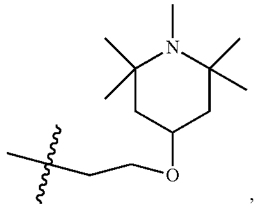

,

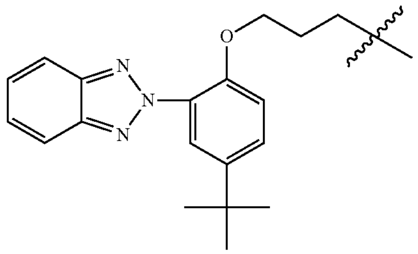

or

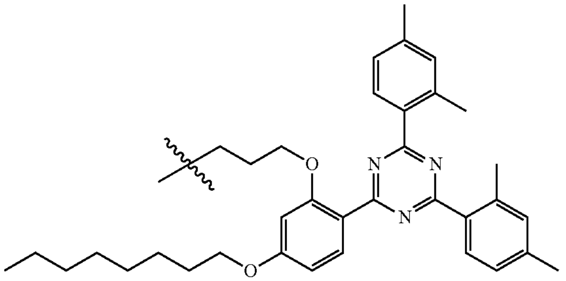

.

In the formula (A), $X^2$ each represent a single bond or a divalent organic group. $X^2$ is preferably alkylene groups having 1 to 20 carbon atoms, more preferably $—(CH_2)_u—$ (wherein, u is an integer of 0 to 2).

In the above formula, "t"s are each independently an integer of 1 to 10. In a preferred embodiment, t is an integer of 1 to 6. In another preferred embodiment, t is an integer of 2 to 10, and is preferably an integer of 2 to 6.

The compound represented by the formula (A) is preferably a compound represented by the following formula (A'):

[Formula 10]

(A')

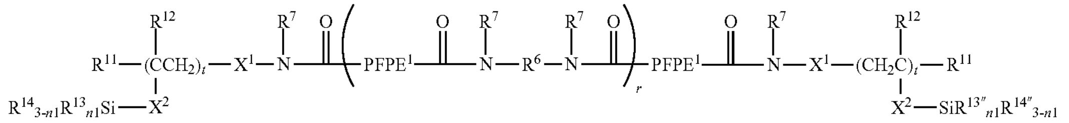

[wherein:

$PFPE^1$, $R^6$ and $R^7$ independently are as defined above;

$R^{13}$s each independently represent a hydroxyl group or a hydrolyzable group at each appearance, $R^{14}$s each independently represent a hydrogen atom or an alkyl group having 1 to 22 carbon atoms at each appearance;

$R^{11}$s each independently represent a hydrogen atom or a halogen atom at each appearance;

$R^{12}$s each independently represent a hydrogen atom or a lower alkyl group at each appearance;

$R^{11''}$, $R^{12''}$, $R^{13''}$, and $R^{14''}$ are same as $R^{11}$, $R^{12}$, $R^{13}$, and $R^{14}$, respectively;

n1 is an integer of 1 to 3, and preferably 3, $X^1$ is each independently $—O—CFR^{20}—(CF_2)_{e'}—$;

$R^{20}$s each independently represent a fluorine atom or a lower fluoroalkyl group at each appearance;

e's are each independently 0 or 1 at each appearance;

$X^2$ is each independently $—(CH_2)_u—$;

"u"s are each independently an integer of 0 to 2; and

"t"s are each independently an integer of 2 to 10.].

The compound represented by the above-mentioned formula (A) can be obtained by, for example, using a perfluoro (poly)ether derivative corresponding to the $-PFPE^1-$ portion as a raw material, and after introducing iodine into the terminal, reacting a vinyl monomer corresponding to $—CH_2CR^{12}(X^2—SiR^{13}_{n1}R^{14}_{3-n1})—$.

Formula (B):

[Formula 11]

(B)

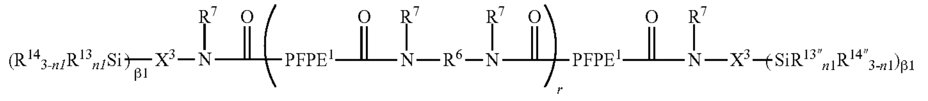

In the above-mentioned formula (B), $PFPE^1$, $R^6$, $R^7$, $R^{13}$, $R^{13''}$, $R^{14}$, $R^{14''}$ and n1 have the same meanings as the description regarding the above-mentioned formula (A).

In the above-mentioned formula (B), the Si atom bonded to at least one group selected from the group consisting of a hydroxyl group and a hydrolyzable group(s) refers to an Si atom wherein n1 is an integer of 1 to 3 and contained in $(SiR^{13}_{n1}R^{14}_{3-n1})$ or $(—SiR^{13''}_{n1}R^{14''}_{3-n1})$.

In the above-mentioned formula, n1 is an integer of 0 to 3, preferably 1 to 3, and more preferably 3 independently per each $(—SiR^{13}_{n1}R^{14}_{3-n1})$ unit or per each $(—SiR^{13''}_{n1}R^{14''}_{3-n1})$ unit. In the formula, at least two n1s are integers of 1 to 3, that is, all n1s do not become 0 simultaneously. That is, in the formula, at least two of $R^{13}$s or $R^{13''}$s exist. That is, in the formula (B), there exist at least two structures selected from the $—SiR^{13}_{n1}R^{14}_{3-n1}$ structure (that is, $—SiR^{13}$ portion) where n1 is 1 or more and the $—SiR^{13''}_{n1}R^{14''}_{3-n1}$ structure (that is, $—SiR^{13''}$ portion) where n1 is 1 or more.

In the formula (B), it is more preferable that at least one Si bonded to a hydroxyl group or a hydrolyzable group(s) is present at the both terminals of the molecular main chain of the PFPE-containing silane compound (a). That is, at least one $—SiR^{13}$ portion is present and at least one $—SiR^{13''}$ portion is present.

In the above-mentioned formula, $X^3$s each independently represent a 2 to 10 valent organic group. That is, $X^3$ corresponds to $R^5$ of the above-mentioned general formula. The said $X^3$ is considered to be a linker which links, in the compound represented by the formula (B), the perfluoro (poly)ether part (that is, $-PFPE^1-$ part) which mainly provides water repellent property and surface slipperiness, etc., and the silane part (specifically, $—SiR^{13}_{n1}R^{14}_{3-n1}$ or —$SiR^{13''}{}_{n1}R^{14''}{}_{3-n1}$) which provides a bonding ability to a substrate. Accordingly, the said $X^3$ may be any organic group as long as the compound represented by the formula (B) can exist stably. Incidentally, in the present specification, the structure described as $X^3$ is bonded to an amide bond that links to a group represented by $PFPE^1$ on the left side and to a group enclosed in parentheses attaching with β1 on the right side, respectively.

In another embodiment, $X^3$ represents $X^c$. $X^c$ has the same meaning as defined above.

β1 in the above-mentioned formula is an integer of 1 to 9, and can be changed depending on the number of the valence of $X^3$. In the formula (B), β1 is a value subtracting 1 from the value of the number of the valence of $X^3$. When $X^3$ is a single bond, then β1 is 1.

The above-mentioned $X^3$ is preferably a 2 to 7 valent, more preferably a 2 to 4 valent, and further preferably a divalent organic group.

In one embodiment, $X^3$ is a 2 to 4 valent organic group, and β1 is 1 to 3.

In another embodiment, $X^3$ is a divalent organic group, and β1 is 1. In this case, the formula (B) is represented by the following formula (B').

[Formula 12]

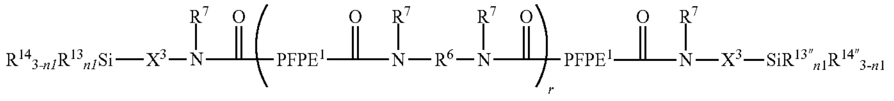

(B')

Examples of the above-mentioned $X^3$ are not particularly limited as long as it is a material capable of forming a bond with an amide group linked to the $PFPE^1$ group and capable of preparing the compound stably, and there may be mentioned, for example, those which are the same as described regarding $X^1$ and except for a single bond.

Among these, as preferable specific $X^3$, there may be mentioned

—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$ —,
—$CH_2O(CH_2)_3Si(CH_3)_2O(Si(CH_3)_2O)_{20}Si(CH_3)_2(CH_2)_2$ —,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—$CF_2CONH$—,
—$CF_2CONHCH_2$—,

—$CF_2CONH(CH_2)_2$—,
—$CF_2CONH(CH_2)_3$—,
—$CF_2CONH(CH_2)_6$—,
—$CF_2$—$CON(CH_3)$—$(CH_2)_3$—,
—$CF_2$—$CON(Ph)$-$(CH_2)_3$— (wherein, Ph means phenyl),
—$CF_2$—$CON(CH_3)$—$(CH_2)_6$—,
—$CF_2$—$CON(Ph)$-$(CH_2)_6$— (wherein, Ph means phenyl),
—$(CH_2)_2NH(CH_2)_3$—,
—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—$(CH_2)_3Si(CH_3)_2OSi(CH_3)_2(CH_2)_2$—,
—$(CH_2)_3Si(CH_3)_2OSi(CH_3)_2OSi(CH_3)_2(CH_2)_2$—,
—$(CH_2)_3Si(CH_3)_2O(Si(CH_3)_2O)_2Si(CH_3)_2(CH_2)_2$—,
—$(CH_2)_3Si(CH_3)_2O(Si(CH_3)_2O)_3Si(CH_3)_2(CH_2)_2$—,
—$(CH_2)_3Si(CH_3)_2O(Si(CH_3)_2O)_{10}Si(CH_3)_2(CH_2)_2$—,
—$(CH_2)_3Si(CH_3)_2O(Si(CH_3)_2O)_{20}Si(CH_2(CH_2)_2$—,
—C(O)O—$(CH_2)_3$—,
—C(O)O—$(CH_2)_6$—,
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—$CH(CH_3)$—,
—$CH_2$—O—$(CH_2)_3$—$Si(CH_3)_2$—$(CH_2)_2$—$Si(CH_3)_2$—$(CH_2)_3$—,
—$CH_2$—O—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—,
1,3-phenylene,
-(1,3-phenylene)-$Si(CH_3)_2$—$(CH_2)_2$—
etc.

Among the above, $X^3$ is preferably to be
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CF_2$—$CH_2OCF_2CHFOCF_2CF_2CF_2$—C(O)NH—$CH_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CF_2$—$CON(CH_3)$—$(CH_2)_3$—,
—$CF_2$—$CON(Ph)$-$(CH_2)_3$— (wherein, Ph means phenyl),
—$CF_2$—$CON(CH_3)$—$(CH_2)_6$—,
—$CF_2$—$CON(Ph)$-$(CH_2)_6$— (wherein, Ph means phenyl),
—$(CH_2)_2NH(CH_2)_3$—,
—$(CH_2)_6NH(CH_2)_3$—,
—$CH_2O$—CONH—$(CH_2)_3$—,
—$CH_2O$—CONH—$(CH_2)_6$—,
—$OCH_2$—,
—$O(CH_2)_3$—, or
—$OCFHCF_2$—.

Among the above, $X^3$ is more preferably
—$CH_2OCF_2CHFOCF_2CF_2CF_2$—C(O)NH—$CH_2$—,
—$CF_2$—$CH_2OCF_2CHFOCF_2CF_2CF_2$—C(O)NH—$CH_2$—,
—$CH_2$—,
—$(CH_2)_2$—,
—$(CH_2)_3$—,
—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CF_2$—$CON(CH_3)$—$(CH_2)_3$—,
—$CF_2$—$CON(Ph)$-$(CH_2)_3$— (wherein, Ph means phenyl),
—$CF_2$—$CON(CH_3)$—$(CH_2)_6$—,
—$CF_2$—$CON(Ph)$-$(CH_2)_6$— (wherein, Ph means phenyl),
—$(CH_2)_2NH(CH_2)_3$—, or
—$(CH_2)_6NH(CH_2)_3$—.

In another preferred embodiment, $X^3$ represents $X^{e'}$. $X^{e'}$ has the same meaning as defined above except for removing a single bond.

In one embodiment, in the formula (B), Si bonded to a hydroxyl group or a hydrolyzable group(s) exists at least two. That is, in the formula (B), —$SiR^{13}$ portion exists at least two.

A preferable compound represented by the formula (B) is a compound represented by the following formula (B'):

[Formula 13]

(B')

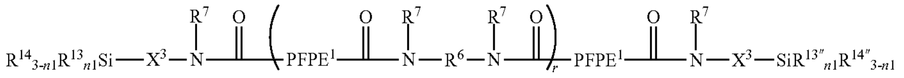

[wherein:

$PFPE^1$, $R^6$ and $R^e$ are as defined above;

$R^{13}$s each independently represent a hydroxyl group or a hydrolyzable group(s) at each appearance;

$R^{14}$s each independently represent a hydrogen atom or an alkyl group having 1 to 22 carbon atoms at each appearance;

$R^{13''}$ and $R^{14''}$ are the same meanings as those of $R^{13}$ and $R^{14}$, respectively;

n1 is an integer of 1 to 3, and is preferably 3;

$X^3$ is an alkylene group having 1 to 20 carbon atoms, $—CH_2O(CH_2)_2—$, $—CH_2O(CH_2)_3—$ or $—CH_2O(CH_2)_6—$.].

The compound represented by the above-mentioned formula (B) can be produced by the conventionally known method, for example, the method described in JP 2013-117012A or an improved method thereof.

Formula (C):

[Formula 14]

(C)

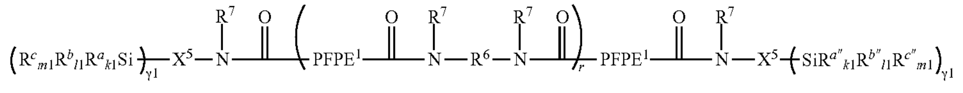

In the above-mentioned formula (C), $PFPE^1$, $R^6$ and $R^7$ have the same meanings as the description regarding the above-mentioned formula (A).

In the above formula, $X^5$s each independently represent a 2 to 10 valent organic group. That is, $X^5$ corresponds to $R^5$ of the above general formula. $X^5$ is understood to be a linker, in the compound represented by the formula (C), which links a perfluoro(poly)ether portion (that is, -$PFPE^1$- portion) which mainly provides water repellent property and surface slipperiness, etc., and a silane portion (that is, the group represented by $—SiR^a_{k1}R^b_{l1}R^c_{m1}$ or $—SiR^{a''}_{k1}R^{b''}_{l1}R^{c''}_{m1}$) which provides a bonding ability to a substrate. Accordingly, $X^5$ may be any group, as long as the compound represented by the formula (C) can be stably present. Incidentally, in the present specification, in the structure described as $X^5$, the left side is bonded to the group represented by $PFPE^1$ and the right side is bonded to the group enclosed with parentheses to which γ1 is applied, respectively.

In another embodiment, $X^5$ represents $X^e$. $X^e$ have the same meanings as defined above.

In another embodiment, the formula (C) is represented by the following formula (C').

[Formula 15]

(C')

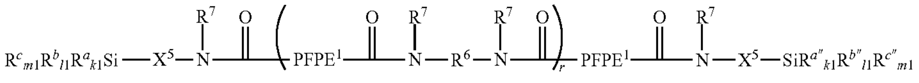

Examples of the above-mentioned $X^5$ are not particularly limited as long as it is a material capable of forming a bond with an amide group linked to the $PFPE^1$ group and capable of preparing the compound stably, and there may be mentioned, for example, those which are the same as described regarding $X^1$ and except for a single bond.

Among these, as preferable specific $X^5$, there may be mentioned

—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)$—,
—$CF_2$—$CON(CH_3)$—$(CH_2)_3$—,
—$CF_2$—CON(Ph)-$(CH_2)_3$— (wherein, Ph means phenyl),
—$CF_2$—$CON(CH_3)$—$(CH_2)_6$—,
—$CF_2$—CON(Ph)-$(CH_2)_6$— (wherein, Ph means phenyl),
—$(CH_2)_2NH(CH_2)_3$—,
—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—$(CH_2)_3Si(CH_3)_2OSi(CH_3)_2(CH_2)_2$—,
—$(CH_2)_3Si(CH_3)_2OSi(CH_3)_2OSi(CH_3)_2(CH_2)_2$—,
—$(CH_2)_3Si(CH_3)_2O(Si(CH_3)_2O)_2Si(CH_3)_2(CH_2)_2$—,
—$(CH_2)_3Si(CH_3)_2O(Si(CH_3)_2O)_3Si(CH_3)_2(CH_2)_2$—,
—$(CH_2)_3Si(CH_3)_2O(Si(CH_3)_2O)_{10}Si(CH_3)_2(CH_2)_2$—,
—$(CH_2)_3Si(CH_3)_2O(Si(CH_3)_2O)_{20}Si(CH_3)_2(CH_2)_2$—,
—C(O)O—$(CH_2)_3$—,
—C(O)O—$(CH_2)_6$—,
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—$CH(CH_3)$—,
—$CH_2$—O—$(CH_2)_3$—$Si(CH_3)_{24}CH_2)_2$—$Si(CH_3)_2$—$(CH_2)_3$—,
—$CH_2$—O—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—,
1,3-phenylene,
-(1,3-phenylene)$Si(CH_3)_2$—$(CH_2)_2$—
etc.

Among the above, $X^5$ is preferably to be

—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_{20}CF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CF_2$—$CH_2OCF_2CHFOCF_2CF_2CF_2$—C(O)NH—$CH_2$—,
—$CH_2$—,
—$(CH_2)_2$—, $-(CH_2)_3-$,
$-(CH_2)-$,
$-(CH_2)_5-$,
$-(CH_2)_6-$,
$-CF_2-$,
$-(CF_2)_2-$,
$-CF_2-CH_2-$,
$-CF_2-(CH_2)_2-$,
$-CF_2-(CH_2)_3-$,
$-CF_2-(CH_2)_4-$,
$-CF_2-(CH_2)_5-$,
$-CF_2-(CH_2)_6-$,
$-CF_2CONH-$,
$-CF_2CONHCH_2-$,
$-CF_2CONH(CH_2)_2-$,
$-CF_2CONH(CH_2)_3-$,
$-CF_2CONH(CH_2)_6-$,
$-CF_2-CON(CH_3)-(CH_2)_3-$,
$-CF_2-CON(Ph)-(CH_2)_3-$ (wherein, Ph means phenyl),
$-CF_2-CON(CH_3)-(CH_2)_6-$,
$-CF_2-CON(Ph)-(CH_2)_6-$ (wherein, Ph means phenyl),
$-(CH_2)_2NH(CH_2)_3-$,
$-(CH_2)_6NH(CH_2)_3-$,
$-CH_2O-CONH-(CH_2)_3-$,
$-CH_2O-CONH-(CH_2)_6-$,
$-OCH_2-$,
$-O(CH_2)_3-$, or
$-OCFHCF_2-$.

Among the above, $X^5$ is more preferably
$-CH_2OCF_2CHFOCF_2CF_2CF_2-C(O)NH-CH_2-$,
$-CF_2-CH_2OCF_2CHFOCF_2CF_2CF_2-C(O)NH-CH_2-$,
$-CF_2CONH-$,
$-CF_2CONHCH_2-$,
$-CF_2CONH(CH_2)_2-$,
$-CF_2CONH(CH_2)_3-$,
$-CF_2CONH(CH_2)_6-$,
$-CF_2-CON(CH_3)-(CH_2)_3-$,
$-CF_2-CON(Ph)-(CH_2)_3-$ (wherein, Ph means phenyl),
$-CF_2-CON(CH_3)-(CH_2)_6-$,
$-CF_2-CON(Ph)-(CH_2)_6-$ (wherein, Ph means phenyl),
$-(CH_2)_2NH(CH_2)_3-$, or
$-(CH_2)_6NH(CH_2)_3-$.

In another preferred embodiment, $X^5$ represents $X^{e'}$. $X^{e'}$ have the same meanings as defined above, except that single bonds are excluded.

In the above-mentioned formula, $R^a$s each independently represent $-Z^3-SiR^{71}_{p1}R^{72}_{q1}R^{73}_{r1}$ at each appearance.

In the formula, $Z^3$s each independently represent an oxygen atom or a divalent organic group at each appearance.

$Z^3$ is preferably a divalent organic group, and does not include a group which forms a siloxane bond with the Si atom (Si atom to which $R^a$ is bonded) at the terminal of the main chain of the molecule in the formula (C).

$Z^3$ is preferably a $C_{1-6}$ alkylene group, $-(CH_2)_g-O-(CH_2)_h-$ (wherein, g is an integer of 1 to 6, and h is an integer of 1 to 6) or -phenylene-$(CH_2)_i-$ (wherein, i is an integer of 0 to 6), and more preferably a $C_{1-3}$ alkylene group. These groups may be substituted by one or more substituents selected from, for example, a fluorine atom, a $C_{1-6}$ alkyl group, a $C_{2-6}$ alkenyl group and a $C_{2-6}$ alkynyl group. From the viewpoint that ultraviolet durability is particularly good, $Z^3$ is more preferably a linear or branched alkylene group, and further preferably a linear alkylene group. A number of the carbon atoms constituting the alkylene group of $Z^3$ is preferably in the range of 1 to 6, and more preferably in the range of 1 to 3. Incidentally, with regard to the alkylene group, it is the same as mentioned above.

In the formula, $R^{71}$s each independently represent $R^{a'}$ at each appearance. $R^{a'}$ has the same meaning as that of $R^a$.

In $R^a$, a number of the Si atoms linked linearly through the $Z^3$ group is 5 at the maximum. That is, in $R^a$, when $R^{71}$ is present with a number of at least one, the Si atoms linked linearly through the $Z^3$ group exist two or more in $R^a$, and a number of the Si atoms linked linearly through such a $Z^3$ group is 5 at the maximum. Incidentally, a "number of the Si atoms linked linearly through the $Z^3$ group in $R^a$" is equal to the number of repetitions of $-Z^3-Si-$ linked linearly in $R^a$.

For example, an example in which the Si atoms are linked through the $Z^3$ group in $R^a$ is shown below.

[Formula 16]

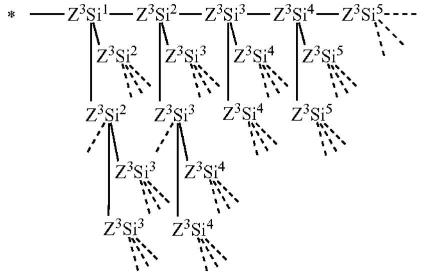

In the above-mentioned formula, * means a site that binds to Si in the main chain, and . . . means that a predetermined group other than $Z^3Si$ is bonded, that is, when all three bonding arms of the Si atom are . . . , it means the end portion of the repetition of $Z^3Si$. Also, the number on the right shoulder of Si means the number of the appearance of Si linked linearly through the $Z^3$ group counted from *. That is, the chain in which the $Z^3Si$ repetition is terminated at $Si^2$ is "the number of the Si atoms linked linearly through the $Z^3$ group in $R^a$" is 2, and similarly, the chain in which the $Z^3Si$ repetition is terminated at $Si^3$, $Si^4$ and $Si^5$, "the number of the Si atoms linked linearly through the $Z^3$ group in $R^a$" are 3, 4 and 5, respectively. Incidentally, as clearly seen from the above-mentioned formula, there are a plurality of the $Z^3Si$ chains in $R^a$, but it is not necessary that they all have the same length, and each may have an arbitrary length.

In a preferred embodiment, as shown below, "the number of the Si atoms linked linearly through the $Z^3$ group in $R^a$" is one (left formula) or two (right formula) in all chains.

[Formula 17]

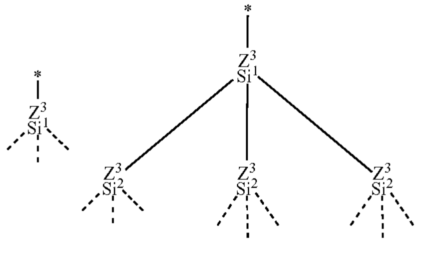

In one embodiment, the number of the Si atoms linked linearly through the $Z^3$ group in $R^a$ is 1 or 2, and preferably 1.

In the formula, $R^{72}$s each independently represent a hydroxyl group or a hydrolyzable group at each appearance. The "hydrolyzable group" has the same meaning as defined above.

$R^{72}$ is preferably —OR (wherein, R represents a substituted or unsubstituted $C_{1-3}$ alkyl group, and more preferably a methyl group).

In the formula, $R^{73}$s each independently represent a hydrogen atom or a lower alkyl group at each appearance. The lower alkyl group is preferably an alkyl group having 1 to 20 carbon atoms, more preferably an alkyl group having 1 to 6 carbon atoms, and further preferably a methyl group.

In the formula, p1s are each independently an integer of 0 to 3 at each appearance; q1s are each independently an integer of 0 to 3 at each appearance; and r1s are each independently an integer of 0 to 3 at each appearance. Provided that in each ($-Z^3-SiR^{71}_{p1}R^{72}_{q1}R^{73}_{r1}$), a sum of p1, q1 and r1 is 3.

In a preferred embodiment, in $R^{a'}$ ($R^a$ when no $R^{a'}$ is present) at the terminal of $R^a$, the above-mentioned q1 is preferably 2 or more, for example, 2 or 3, and is more preferably 3.

In a preferred embodiment, at least one of the terminal part of Its can be $-Si(-Z^3-SiR^{72}_{q1}R^{73}_{r1})_2R^b_{l1}R^c_{m1}$ (provided that, either one of l1 and m1 is 1, and the other is 0) or $-Si(-Z^3-SiR^{72}_{q1}R^{73}_{r1})_3$, and preferably $-Si(-Z^3-SiR^{72}_0R^{73}_{r1})_3$ (here, a sum of q1 and r1 is 3). In the formula, the unit of ($-Z^3-SiR^{72}_{q1}R^{73}_{r1}$) is preferably ($-Z^3-SiR^{72}_3$). In a further preferred embodiment, the terminal part of $R^a$ can be all $-Si(-Z^3-SiR^{72}_{q1}R^{73}_{r1})_3$, and preferably $-Si(-Z^3-SiR^{72}_3)_3$.

In the above-mentioned formula, $R^{a''}$s each independently represent $-Z^3-SiR^{71}_{p1}R^{72''}_{q1}R^{73}_{r1}$ at each appearance. $Z^3$, $R^{71}$, $R^{73}$, p1, q1, and r1 have the same meanings as defined above. $R^{72''}$ has the same meaning as $R^{72}$.

In a preferred embodiment, at least one of the terminal part of $R^{a''}$ can be $-Si(-Z^3-SiR^{72''}_{q1}R^{73}_{r1})_2R^{b''}_{l1}R^{c''}_{m1}$ (provided that, either one of l1 and m1 is 1, and the other is 0) or $-Si(-Z^3-SiR^{72''}_{q1}R^{73}_{r1})_3$, and preferably $-Si(-Z^3-SiR^{72''}_{q1}R^{73}_{r1})_3$ (here, a sum of q1 and r1 is 3). In the formula, the unit of ($-Z^3-SiR^{72''}_{q1}R^{73}_{r1}$) is preferably ($-Z^3-SiR^{72''}_3$). In a further preferred embodiment, the terminal part of $R^a$ can be all $-Si(-Z^3-SiR^{72''}_{q1}R^{73}_{r1})_3$, and preferably $-Si(-Z^3-SiR^{72''}_3)_3$.

In the formula (C), there exist at least two "Si"s bonded to a hydroxyl group or a hydrolyzable group(s). That is, there exist at least two structures selected from the group consisting of $SiR^{72}$ (specifically the group represented by $-SiR^{71}_{p1}R^{72}_{q1}R^{73}_{r1}$, provided that, q1 is an integer of 1 to 3), $SiR^{72''}$ (specifically, the group represented by $-SiR^{71}_{p1}R^{72''}_{q1}R^{73}_{r1}$, provided that, q1 is an integer of 1 to 3), $SiR^1$ (specifically, the group represented by $-SiR^a_{k1}R^{b''}_{l1}R^{c''}_{m1}$, provided that, l1 is an integer of 1 to 3) and $SiR^{b''}$ (specifically, the group represented by $-SiR^{a''}_{k1}R^{b''}_{l1}R^{c''}_{m1}$, provided that, l1 is an integer of 1 to 3). $R^b$ and $R^{b''}$ will be mentioned later.

In the formula (C), it is more preferable that at least one Si bonded to a hydroxyl group or a hydrolyzable group(s) is present at the both terminals of the molecular main chain of the PFPE-containing silane compound (a). That is, at least one structure of $SiR^{72}$ and/or $SiR^b$ is present and at least one structure of $SiR^{n''}$ and/or $SiR^{b''}$ is present.

In the above formula, $R^b$ each independently represent a hydroxyl group or a hydrolyzable group at each appearance.

The above $R^b$ is preferably a hydroxyl group, —OR, —OCOR, —O—N=C(R)$_2$, —N(R)$_2$, —NHR or halogen (in these formulae, R represents a substituted or unsubstituted alkyl group having 1 to 4 carbon atoms), and more preferably —OR. In R, an unsubstituted alkyl group such as a methyl group, an ethyl group, a propyl group, an isopropyl group, an n-butyl group, an isobutyl group, etc.; and a substituted alkyl group such as a chloromethyl group, etc., are contained. Among these, an alkyl group, in particular, an unsubstituted alkyl group is preferable, and a methyl group or an ethyl group is more preferable. The hydroxyl group is not particularly limited, and may be one in which it is generated by hydrolyzing a hydrolyzable group. $R^b$ is more preferably —OR (wherein, R represents a substituted or unsubstituted $C_{1-3}$ alkyl group, and more preferably a methyl group).

In the above-mentioned formula, $R^{b''}$ has the same meaning as in $R^b$.

In the above-mentioned formula, $R^c$s each independently represent a hydrogen atom or a lower alkyl group at each appearance. The lower alkyl group is preferably an alkyl group having 1 to 20 carbon atoms, more preferably an alkyl group having 1 to 6 carbon atoms, and further preferably a methyl group.

In the above-mentioned formula, $R^{c''}$ has the same meaning as in $R^c$.

In the formula, k1 is an integer of 0 to 3 at each appearance; l1 is an integer of 0 to 3 at each appearance; and m1 is an integer of 0 to 3 at each appearance. Provided that, in each ($SiR^a_{k1}R^b_{l1}R^c_{m1}$) and each ($SiR^{a''}_{k1}R^{b''}_{l1}R^{c''}_{m1}$), a sum of k1, l1 and m1 is 3.

In one embodiment, k1 is preferably an integer of 1 to 3, and more preferably 3.

The compound represented by the above-mentioned formula (C) can be synthesized by, for example, the method described in WO 2014/069592.

Formula (D):

[Formula 18]

(D)

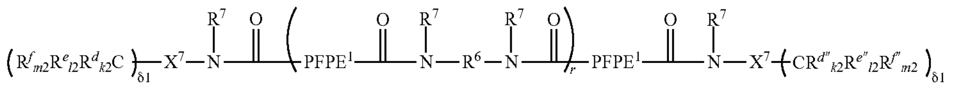

In the above-mentioned formula (D), $PFPE^1$, $R^6$ and $R^7$ have the same meanings as those defined in the above-mentioned formula (A).

In the above-mentioned formula, $X^7$s each independently represent a single bond or 2 to 10 valent organic group. The said $X^7$ is considered to be a linker which links, in the compound represented by the formula (D), the perfluoro (poly)ether part (that is, $-PFPE^1-$ part) which mainly provides water repellent property and surface slipperiness, etc., and the part (that is, the group enclosed in parentheses attaching with δ1) which provides a bonding ability to a substrate. Accordingly, the said $X^7$ may be a single bond or any organic group as long as the compound represented by the formula (D) can exist stably. Incidentally, in the present specification, the structure described as $X^7$ is bonded to an amide bond that links to a group represented by $PFPE^1$ on the left side and to a group enclosed in parentheses attaching with δ1 on the right side, respectively.

In another embodiment, $X^7$ represents $X^e$. $X^e$ has the same meaning as defined above.

In the above-mentioned formula, δ1 is an integer of 1 to 9, and δ1 can change depending on the number of the valence of $X^7$. In the formula (D), δ1 is a value subtracting 1 from the valence of $X^7$. When $X^7$ is a single bond, then δ1 is 1.

The above-mentioned $X^7$ is preferably a 2 to 7 valent, more preferably a 2 to 4 valent, and further preferably a divalent organic group.

In one embodiment, $X^7$ is a 2 to 4 valent organic group, and δ1 is 1 to 3.

In another embodiment, $X^7$ is a divalent organic group, and δ1 is 1. In this case, the formula (D) is represented by the following formula (D').

[Formula 19]

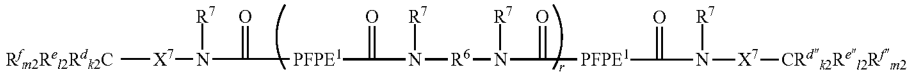

Examples of the above-mentioned $X^7$ are not particularly limited as long as it can form a bond with an amide group linking to the $PFPE^1$ group and the compound can be prepared stably and, for example, those as described with regard to $X^1$ may be mentioned.

Among these, as preferable specific $X^7$, there may be mentioned, a single bond, $-CH_2OCH_2-$, $-CH_2O(CH_2)_2-$, $-CH_2O(CH_2)_3-$, $-CH_2O(CH_2)_6-$, $-CF_2-CH_2-O-CH_2-$, $-CF_2-CH_2-O-(CH_2)_2-$, $-CF_2-CH_2-O-(CH_2)_3-$, $-CF_2-CH_2-O-(CH_2)_6-$, $-CH_2O(CH_2)_3Si(CH_3)_2OSi(CH_3)_2(CH_2)_2-$, $-CH_2O(CH_2)_3Si(CH_3)_2OSi(CH_3)_2OSi(CH_3)_2(CH_2)_2-$, $-CH_2O(CH_2)_3Si(CH_3)_2O(Si(CH_3)_2O)_2Si(CH_3)_2(CH_2)_2-$, $-CH_2O(CH_2)_3Si(CH_3)_2O(Si(CH_3)_2O)_3Si(CH_3)_2(CH_2)_2-$, $-CH_2O(CH_2)_3Si(CH_3)_2O(Si(CH_3)_2O)_{10}Si(CH_3)_2(CH_2)_2-$, $-CH_2O(CH_2)_3Si(CH_3)_2O(Si(CH_3)_2O)_{20}Si(CH_3)_2(CH_2)_2-$, $-CH_2OCF_2CHFOCF_2-$, $-CH_2OCF_2CHFOCF_2CF_2-$, $-CH_2OCF_2CHFOCF_2CF_2CF_2-$, $-CH_2OCH_2CF_2CF_2OCF_2-$, $-CH_2OCH_2CF_2CF_2OCF_2CF_2-$, $-CH_2OCH_2CF_2CF_2OCF_2CF_2CF_2-$, $-CH_2OCH_2CF_2CF_2OCF(CF_3)CF_2OCF_2-$, $-CH_2OCH_2CF_2CF_2OCF(CF_3)CF_2OCF_2CF_2-$, $-CH_2OCH_2CF_2CF_2OCF(CF_3)CF_2OCF_2CF_2CF_2-$, $-CH_2OCH_2CHFCF_2OCF_2-$, $-CH_2OCH_2CHFCF_2OCF_2CF_2-$, $-CH_2OCH_2CHFCF_2OCF_2CF_2CF_2-$, $-CH_2OCH_2CHFCF_2OCF(CF_3)CF_2OCF_2-$, $-CH_2OCH_2CHFCF_2OCF(CF_3)CF_2OCF_2CF_2-$, $-CH_2OCH_2CHFCF_2OCF(CF_3)CF_2OCF_2CF_2CF_2-$, $-CH_2OCF_2CHFOCF_2CF_2CF_2-C(O)NH-CH_2-$, $-CH_2OCH_2(CH_2)_7CH_2Si(OCH_3)_2OSi(OCH_3)_2(CH_2)_2Si(OCH_3)_2OSi(OCH_3)_2(CH_2)_2-$, $-CH_2OCH_2CH_2CH_2Si(OCH_3)_2OSi(OCH_3)_2(CH_2)_3-$, $-CH_2OCH_2CH_2CH_2Si(OCH_2CH_3)_2OSi(OCH_2CH_3)_2(CH_2)_3-$, $-CH_2OCH_2CH_2CH_2Si(OCH_3)_2OSi(OCH_3)_2(CH_2)_2-$, $-CH_2OCH_2CH_2CH_2Si(OCH_2CH_3)_2OSi(OCH_2CH_3)_2(CH_2)_2-$, $-(CH_2)_2-Si(CH_3)_2-(CH_2)_2-$, $-CH_2-$, $-(CH_2)_2-$,
$-(CH_2)_3-$,
$-(CH_2)_4-$,
$-(CH_2)_5-$,
$-(CH_2)_6-$,
$-CF_2-$,
$-(CF_2)_2-$,
$-CF_2-CH_2-$,
$-CF_2-(CH_2)_2-$,
$-CF_2-(CH_2)_3-$,
$-CF_2-(CH_2)_4-$,
$-CF_2-(CH_2)_5-$,
$-CF_2-(CH_2)_6-$,
$-CO-$,
$-CF_2CONH-$,
$-CF_2CONHCH_2-$,
$-CF_2CONH(CH_2)_2-$,
$-CF_2CONH(CH_2)_3-$,
$-CF_2CONH(CH_2)_6-$,
$-CF_2-CON(CH_3)-(CH_2)_3-$,
$-CF_2-CON(Ph)-(CH_2)_3-$ (wherein, Ph means phenyl),
$-CF_2-CON(CH_3)-(CH_2)_6-$,
$-CF_2-CON(Ph)-(CH_2)_6-$ (wherein, Ph means phenyl),
$-CONH-(CH_2)_2NH(CH_2)_3-$,
$-CONH-(CH_2)_6NH(CH_2)_3-$,
$-CH_2O-CONH-(CH_2)_3-$,
$-CH_2O-CONH-(CH_2)_6-$,
$-S-(CH_2)_3-$,
$-(CH_2)_2S(CH_2)_3-$,
$-(CH_2)_3Si(CH_3)_2OSi(CH_3)_2(CH_2)_2-$,
$-(CH_2)_3Si(CH_3)_2OSi(CH_3)_2OSi(CH_3)_2(CH_2)_2-$,
$-(CH_2)_3Si(CH_3)_2O(Si(CH_3)_2O)_2Si(CH_3)_2(CH_2)_2-$,
$-(CH_2)_3Si(CH_3)_2O(Si(CH_3)_2O)_3Si(CH_3)_2(CH_2)_2-$,
$-(CH_2)_3Si(CH_3)_2O(Si(CH_3)_2O)_{10}Si(CH_3)_2(CH_2)_2-$,
$-(CH_2)_3Si(CH_3)_2O(Si(CH_3)_2O)_{20}Si(CH_3)_2(CH_2)_2-$,
$-C(O)O-(CH_2)_3-$,
$-C(O)O-(CH_2)_6-$,
$-CH_2-O-(CH_2)_3-Si(CH_3)_2-(CH_2)_2-Si(CH_3)_2-(CH_2)_2-$,
$-CH_2-O-(CH_2)_3-Si(CH_3)_2-(CH_2)_2-Si(CH_3)_2-CH(CH_3)-$,
$-CH_2-O-(CH_2)_3-Si(CH_3)_2-(CH_2)_2-Si(CH_3)_2-(CH_2)_3-$,
$-CH_2-O-(CH_2)_3-Si(CH_3)_2-(CH_2)_2-Si(CH_3)_2-CH(CH_3)-CH_2-$,
$-OCH_2-$,
$-O(CH_2)_3-$,
$-OCFHCF_2-$,
1,3-phenylene,
-(1,3-phenylene)-$Si(CH_3)_2-(CH_2)_2-$
etc.

Among the above-mentioned, more preferred specific $X^7$ is to be preferably
$-CH_2OCH_2-$,
$-CH_2O(CH_2)_2-$,
$-CH_2O(CH_2)_3-$,
$-CH_2O(CH_2)_6-$,
$-CF_2-CH_2-O-CH_2-$,
$-CF_2-CH_2-O-(CH_2)_2-$,
$-CF_2-CH_2-O-(CH_2)_3-$,
$-CF_2-CH_2-O-(CH_2)_6-$,
$-CH_2OCF_2CHFOCF_2-$,
$-CH_2OCF_2CHFOCF_2CF_2-$,
$-CH_2OCF_2CHFOCF_2CF_2CF_2-$,
$-CH_2OCH_2CF_2CF_2OCF_2-$,
$-CH_2OCH_2CF_2CF_2OCF_2CF_2-$,
$-CH_2OCH_2CF_2CF_2OCF_2CF_2CF_2-$,
$-CH_2OCH_2CF_2CF_2OCF(CF_3)CF_2OCF_2-$,
$-CH_2OCH_2CF_2CF_2OCF(CF_3)CF_2OCF_2CF_2-$,
$-CH_2OCH_2CF_2CF_2OCF(CF_3)CF_2OCF_2CF_2CF_2-$,
$-CH_2OCH_2CHFCF_2OCF_2-$,
$-CH_2OCH_2CHFCF_2OCF_2CF_2-$,
$-CH_2OCH_2CHFCF_2OCF_2CF_2CF_2-$,
$-CH_2OCH_2CHFCF_2OCF(CF_3)CF_2OCF_2-$,
$-CH_2OCH_2CHFCF_2OCF(CF_3)CF_2OCF_2CF_2-$,
$-CH_2OCH_2CHFCF_2OCF(CF_3)CF_2OCF_2CF_2CF_2-$,
$-CH_2OCF_2CHFOCF_2CF_2CF_2-C(O)NH-CH_2-$,
$-CF_2-CH_2OCF_2CHFOCF_2CF_2CF_2-C(O)NH-CH_2-$,
$-CH_2-$,
$-(CH_2)_2-$,
$-(CH_2)_3-$,
$-(CH_2)_4-$,
$-(CH_2)_5-$,
$-(CH_2)_6-$,
$-CF_2-$,
$-(CF_2)_2-$,
$-CF_2-CH_2-$,
$-CF_2-(CH_2)_2-$,
$-CF_2-(CH_2)_3-$,
$-CF_2-(CH_2)_4-$,
$-CF_2-(CH_2)_3-$,
$-CF_2-(CH_2)_6-$,
$-CF_2CONH-$,
$-CF_2CONHCH_2-$,
$-CF_2CONH(CH_2)_2-$,
$-CF_2CONH(CH_2)_3-$,
$-CF_2CONH(CH_2)_6-$,
$-CF_2-CON(CH_3)-(CH_2)_3-$,
$-CF_2-CON(Ph)-(CH_2)_3-$ (wherein, Ph means phenyl),
$-CF_2-CON(CH_3)-(CH_2)_6-$,
$-CF_2-CON(Ph)-(CH_2)_6-$ (wherein, Ph means phenyl),
$-(CH_2)_2NH(CH_2)_3-$,
$-(CH_2)_6NH(CH_2)_3-$,
$-CH_2O-CONH-(CH_2)_3-$,
$-CH_2O-CONH-(CH_2)_6-$,
$-OCH_2-$,
$-O(CH_2)_3-$, or
$-OCFHCF_2-$.

Among the above, $X^7$ is more preferably
$-CH_2OCF_2CHFOCF_2CF_2CF_2-C(O)NH-CH_2-$,
$-CF_2-CH_2OCF_2CHFOCF_2CF_2CF_2-C(O)NH-CH_2-$,
$-CH_2-$,
$-(CH_2)_2-$,
$-(CH_2)_3-$,
$-(CH_2)_6-$,
$-CF_2CONH-$,
$-CF_2CONHCH_2-$,
$-CF_2CONH(CH_2)_2-$,
$-CF_2CONH(CH_2)_3-$,
$-CF_2CONH(CH_2)_6-$,
$-CF_2-CON(CH_3)-(CH_2)_3-$,
$-CF_2-CON(Ph)-(CH_2)_3-$ (wherein, Ph means phenyl),
$-CF_2-CON(CH_3)-(CH_2)_6-$,
$-CF_2-CON(Ph)-(CH_2)_6-$ (wherein, Ph means phenyl),
$-(CH_2)_2NH(CH_2)_3-$, or
$-(CH_2)_6NH(CH_2)_3-$.

In a more preferred embodiment, $X^7$ represents $X^{e'}$. $X^{e'}$ has the same meaning as defined above. In one embodiment, $X^{e'}$ is a single bond.

In the above-mentioned formula, $R^d$s each independently represent $—Z^4CR^{81}{}_{p2}R^{82}{}_{q2}R^{83}{}_{r2}$ at each appearance.

In the formula, $Z^4$s each independently represent an oxygen atom or a divalent organic group at each appearance.

The above $Z^4$ is preferably a $C_{1-6}$ alkylene group, $—(CH_2)_g—O—(CH_2)_h—$ (wherein, g is an integer of 0 to 6, for example, an integer of 1 to 6, h is an integer of 0 to 6, for example, an integer of 1 to 6) or -phenylene-$(CH_2)_i$— (wherein, i is an integer of 0 to 6), and more preferably a $C_{1-3}$ alkylene group. These groups may be substituted by one or more substituent(s), for example, selected from a fluorine atom, a $C_{1-6}$ alkyl group, a $C_{2-6}$ alkenyl group and a $C_{2-6}$ alkynyl group.

In the above formula, $R^{81}$s each independently represent $R^{d'}$ at each appearance. $R^{d''}$ has the same meaning as $R^d$.

In $R^d$, a number of C atoms linearly linked through the $Z^4$ group is five at the maximum. That is, in the above $R^d$, when $R^{8'}$ is present with at least one, two or more C atoms which linearly linked through the $Z^4$ group in $R^d$ are present, and a number of C atoms linearly linked through such a $Z^4$ group is five at the maximum. Incidentally, a "number of C atoms linearly linked through the $Z^4$ group in $R^d$" is equal to the number of repetitions of $—Z^4—C—$ linearly linked in $R^d$.

In a preferred embodiment, as shown below, the "number of C atoms linearly linked through the $Z^4$ group in $R^d$" is one (left formula) or two (right formula) in all chains.

[Formula 20]

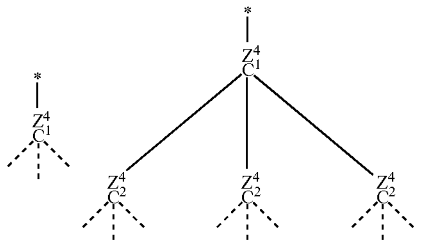

In one embodiment, the number of C atoms linearly linked through the $Z^4$ group in $R^d$ is 1 or 2, and preferably 1.

In the formula, $R^{82}$s each independently represent $—Y—SiR^{85}{}_{n2}R^{86}{}_{3-n2}$ at each appearance.

Ys each independently represent a divalent organic group at each appearance.

In a preferred embodiment, Y is a $C_{1-6}$ alkylene group, $—(CH_2)_{g'}—O—(CH_2)_{h'}—$ (wherein, g' is an integer of 0 to 6, for example, an integer of 1 to 6, h' is an integer of 0 to 6, for example, an integer of 1 to 6) or -phenylene-$(CH_2)_{i'}$— (wherein, i' is an integer of 0 to 6). These groups may be substituted by one or more substituents selected from, for example, a fluorine atom, a $C_{1-6}$ alkyl group, a $C_{2-6}$ alkenyl group and a $C_{2-6}$ alkynyl group.

In one embodiment, Y can be a $C_{1-6}$ alkylene group or -phenylene-$(CH_2)_{i'}$—. When Y is the above-mentioned group, light resistance, in particular, ultraviolet durability can be more heightened.

The above-mentioned $R^{85}$s each independently represent a hydroxyl group or a hydrolyzable group(s) at each appearance.

The above-mentioned "hydrolyzable group" may be mentioned the same as the formula (C).

$R^{85}$ is preferably —OR (wherein, R represents a substituted or unsubstituted $C_{1-3}$ alkyl group, more preferably an ethyl group or a methyl group, and particularly a methyl group).

The above-mentioned $R^{86}$s each independently represent a hydrogen atom or a lower alkyl group at each appearance. The lower alkyl group is preferably an alkyl group having 1 to 20 carbon atoms, more preferably an alkyl group having 1 to 6 carbon atoms, and further preferably a methyl group.

n2 represents an integer of 0 to 3 independently for each $(—Y—SiR^{85}{}_{n2}R^{86}{}_{3-n2})$ unit or each $(—Y—SiR^{85''}{}_{n2}R^{86''}{}_{3-n2})$ unit, preferably an integer of 1 to 3, more preferably 2 or 3, and particularly preferably 3. $R^{85''}$ and $R^{86''}$ are explained later.

The above $R^{83}$s each independently represent a hydrogen atom, a hydroxyl group or a lower alkyl group at each appearance, and preferably a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formula, p2s are each independently an integer of 0 to 3 at each appearance; q2s are each independently an integer of 0 to 3 at each appearance; and r2s are each independently an integer of 0 to 3 at each appearance. Provided that a sum of p2, q2 and r2 is 3 per each $(—Z^4—CR^{81}{}_{p2}R^{82}{}_{g2}R^{83}{}_{r2})$ or each $(—Z^4—CR^{81}{}_{p2}R^{82}{}_{q2}R^{83}{}_{r2})$. $R^{82''}$ is explained later.

In a preferred embodiment, in the terminal $R^{d'}$ ($R^d$ when no $R^{d'}$ is present) in $R^d$, the above-mentioned q2 is preferably 2 or more, for example, 2 or 3, and more preferably 3.

In a preferred embodiment, at least one of the terminal part of $R^d$ can be $—C(—Y—SiR^{83}{}_{n2}R^{88}{}_{3-n2})_2$ (specifically, $—C(—Y—SiR^{85}{}_{n2}R^{86}{}_{3-n2})_2R^{83}$) or $—C(—Y—SiR^{83}{}_{n2}R^{86}{}_{3-n2})_3$, and preferably $—C(—Y—SiR^{85}{}_{n2}R^{86}{}_{3-n2})_3$. Here, n2 is an integer of 1 to 3. In the formula, the unit of $(—Y—SiR^{85}{}_{n2}R^{86}{}_{3-n2})$ is preferably $(—Y—SiR^{85}{}_3)$. In a further preferred embodiment, the terminal part of $R^d$ can be all $—C(—Y—SiR^{83}{}_{n2}R^{86}{}_{3-n2})_3$, and preferably $—C(—Y—SiR^{83}{}_3)_3$.

In a more preferred embodiment, the terminal of the group represented by $(CR^d{}_{k2}R^e{}_{l2}R^f{}_{m2})$ is $C(—Y—SiR^{85}{}_{n2}R^{86}{}_{3-n2})_2\ R^f)$ or $C(—Y—SiR^{85}{}_{n2}R^{86}{}_{3-n2})_3$, and preferably $C(—Y—SiR^{85}{}_{n2}R^{86}{}_{3-n2})_3$. Here, n2 is an integer of 1 to 3. In the formula, the unit of $(—Y—SiR^{85}{}_{n2}R^{86}{}_{3-n2})$ is preferably $(—Y—SiR^{85}{}_3)$. In a further preferred embodiment, the terminal portions of the above-mentioned group can be all $—C(—Y—SiR^{85}{}_{n2}R^{86}{}_{3-n2})_3$, and preferably $—C(—Y—SiR^{83}{}_3)_3$.

In the above-mentioned formula, $R^{d''}$s each independently represent $—Z^4—CR^{81}{}_{p2}R^{82''}{}_{q2}R^{83}{}_{r2}$ at each appearance. $Z^4$, $R^{81}$, $R^{83}$, p2, q2, and r2 have the same meanings as defined above. $R^{82''}$s each independently represent $—Y—SiR^{85''}{}_{n2}R^{86''}{}_{3-n2}$ at each appearance. Here, Y and n2 have the same meanings as defined above. $R^{85''}$ and $R^{86''}$ have the same meanings as $R^{85}$ and $R^{86}$, respectively.

In a preferred embodiment, in $R^{d'}$ ($R^{d''}$ when no $R^{d'}$ is present) at the terminal in $R^{d''}$, the above-mentioned q2 is preferably 2 or more, for example, 2 or 3, and more preferably 3.

In a preferred embodiment, at least one of the terminal portion of $R^{d''}$ can be $—C(—Y—SiR^{85''}{}_{n2}R^{86''}{}_{3-n2})_2$ (specifically $—C(—Y—SiR^{85''}{}_{n2}R^{86''}{}_{3-n2})_2R^{83}$) or $—C(—Y—SiR^{85''}{}_{n2}R^{86''}{}_{3-n2})_3$, and preferably can be $—C(—Y—SiR^{83''}{}_{n2}R^{86''}{}_{3-n2})_3$. Here, n2 is an integer of 1 to 3. In the formula, the unit of $(—Y—SiR^{85''}{}_{n2}R^{86''}{}_{3-n2})$ is preferably $(—Y—SiR^{85''}{}_3)$. In a further preferred embodiment, the terminal portions of $R^d$ can be all —C(—Y—$SiR^{85"}_{n2}R^{86"}_{3-n2})_3$, and preferably can be —C(—Y—$SiR^{85"}_3)_3$.

In a more preferred embodiment, the terminal of the group represented by $(CR^{d"}_{k2}R^{e"}_{l2}R^{f"}_{m2})$ is C(—Y—$SiR^{85"}_{n2}R^{86"}_{3-n2})_2R^{f"}$) or C(—Y—$SiR^{85"}_{n2}R^{86"}_{3-n2})_3$, and preferably C(—Y—$SiR^{85"}_{n2}R^{86"}_{3-n2})_3$. Here, n2 is an integer of 1 to 3. In the formula, the unit of (—Y—$SiR^{85"}_{n2}R^{86"}_{3-n2}$) is preferably (—Y—$SiR^{85"}_3$). In a further preferred embodiment, the terminal part of the above-mentioned group can be all —C(—Y—$SiR^{85"}_{n2}R^{86"}_{3-n2})_3$, and preferably —C(—Y—$SiR^{85"}_3)_3$.

In the above-mentioned formula, $R^{e"}$s each independently represent —Y—$SiR^{83}_{n2}R^{86}_{3-n2}$ at each appearance. Here, Y, $R^{85}$, $R^{86}$ and n2 have the same meanings in the description of the above-mentioned $R^{82}$.

In the above-mentioned formula, $R^{e"}$ each independently represent —Y—$SiR^{85"}_{n2}R^{86"}_{3-n2}$ at each appearance. Here, $R^{85"}$, $R^{86"}$, Y and n2 have the same meanings as defined above.

In the above-mentioned formula, $R^f$s each independently represent a hydrogen atom, a hydroxyl group or a lower alkyl group at each appearance. It is preferable that $R^f$s each independently represent a hydrogen atom or a lower alkyl group at each appearance. The lower alkyl group is preferably an alkyl group having 1 to 20 carbon atoms, more preferably an alkyl group having 1 to 6 carbon atoms, and further preferably a methyl group.

In the above-mentioned formula, $R^{f"}$ has the same meaning as $R^f$.

In the formula, k2s are each independently an integer of 0 to 3 at each appearance; l2s are each independently an integer of 0 to 3 at each appearance; and m2s are each independently an integer of 0 to 3 at each appearance. Provided that a sum of k2, l2 and m2 is 3.

In one embodiment, at least one of k2s is 2 or 3, and preferably 3.

In one embodiment, k2 is 2 or 3, and preferably 3.

In one embodiment, l2 is 2 or 3, and preferably 3.

In the above-mentioned formula (D), two or more groups selected from the group consisting of the group represented by —Y—$SiR^{85}$ and the group represented by —Y-$SiR^{85"}$ are present. In the above-mentioned formula (D), it is preferable that one or more groups represented by —Y—$SiR^{85}$, and one or more groups represented by —Y—$SiR^{85"}$ are present.

It is more preferable that one or more carbon atoms bonded to two or more groups represented by —Y—$SiR^{85}_{n2}R^{86}_{3-n2}$ are present, and one or more carbon atoms bonded to two or more groups represented by —Y—$SiR^{85"}_{n2}R^{86"}_{3-n2}$ are present. In the formula, n2 is an integer of 1 to 3.

In one embodiment, in the above-mentioned formula (D), it is preferable that one or more groups represented by —C—(Y—$SiR^{85}_{n2}R^{86}_{3-n2})_2$, and one or more groups represented by —C—(Y—$SiR^{85"}_{n2}R^{86"}_{3-n2})_2$ are present (wherein, n2 is an integer of 1 to 3.).

In one embodiment, in the above-mentioned formula (D), it is preferable that one or more groups represented by —C—(Y—$SiR^{85}_{n2}R^{86}_{3-n2})_3$, and one or more groups represented by —C—(Y—$SiR^{85"}_{n2}R^{86"}_{3-n2})_3$ are present (wherein, n2 is an integer of 1 to 3.).

In the formula (D), n2 is an integer of 1 to 3, and at least one of q2s is 2 or 3, or at least one of 12 and m4 is 2 or 3.

In the above-mentioned formula (D), it is preferable in the formula that at least two groups of the —Y—$SiR^{85}_{n2}R^{86}_{3-n2}$ groups or the —Y—$SiR^{85"}_{n2}R^{86"}_{3-n2}$ groups are present. In the above-mentioned formula (D), it is more preferable that one or more —Y—$SiR^{85}_{n2}R^{86}_{3-n2}$ groups, and one or more —Y—$SiR^{85"}_{n2}R^{86"}_{3-n2}$ group are present. That is, it is preferable that the group containing —$SiR^{85}$ and the group containing —$SiR^{85"}$ are present at the both terminals of the molecular main chain of the PFPE-containing silane compound (A).

The compound represented by the above-mentioned formula (D) can be produced by combining known methods.

In a preferred embodiment, the PFPE-containing silane compound (a) is represented by the formula (B) or (C).

In one embodiment, the PFPE-containing silane compound (a) is represented by the formula (A), (C) or (D).

In one embodiment, the PFPE-containing silane compound (a) has two or more, preferably three or more Si atoms having a hydroxyl group or a hydrolyzable group(s) at least one terminal thereof.

The PFPE-containing silane compound (a) is not particularly limited, and in one embodiment, it can have a number average molecular weight of $5\times10^2$ to $1\times10^5$. Even in such a range, it is preferable to have a number average molecular weight of 2,000 to 50,000, more preferably 2,500 to 30,000, and further preferably 3,000 to 10,000. Incidentally, in the present invention, the number average molecular weight is made a value measured by $^{19}$F-NMR.

<Crosslinking Agent (b)>

A crosslinking agent of the present invention is a compound having at least two $OR^2$ groups bonded to an Si atom (provided that the compounds falling under the above (a) are excluded) or a partially hydrolyzed condensate thereof (hereinafter, also referred to as "crosslinking agent".), which is subjected to crosslinking reaction (condensation reaction) with the PFPE-containing silane compound (a) (specifically, a hydroxyl group or a hydrolyzable group bonded to the Si atom of the PFPE-containing silane compound (a)). By containing the PFPE-containing silane compound (a) and the cross-linking agent (b), physical properties (for example, tensile strength, elastic modulus) of the cured product obtained from the curable composition become good.

The crosslinking agent (b) is a compound having at least two $OR^2$ groups bonded to an Si atom (provided that the compounds falling under the above (a) are excluded.) or a partially hydrolyzed condensate thereof. In the formula, $R^2$s are each independently a hydrogen atom or a monovalent organic group at each appearance. The monovalent organic group means a group containing a monovalent carbon. Such a monovalent organic group is not particularly limited, and may be mentioned a monovalent hydrocarbon group. The hydrocarbon group has the same meaning as defined above.

The crosslinking agent (b) has a different structure from that of the PFPE-containing silane compound (a). The crosslinking agent (b) preferably does not have a perfluoro (poly)ether portion. The crosslinking agent (b) may have any reactive functional groups other than the Si—$OR^2$ group, alkenyl group and alkynyl group, or may not have the same, and in the point of crosslinking property, it is preferable that it does not have other reactive functional group. In the present invention, the other reactive functional group refers to a primary amino group, an epoxy group, a (meth)acryloyl group, a (meth)acryloxy group, a mercapto group, an isocyanate group, etc. Hereinafter, the crosslinking agent (b) will be explained by dividing into a (B1) a crosslinking agent having no reactive functional group and a (B2) crosslinking agent having a reactive functional group.

<<(B1) Crosslinking Agent Having No Reactive Functional Group>>

As the (B1) crosslinking agent having no reactive functional group, there may be mentioned, for example, an organosilicon compound represented by $R^1_n$ $Si(OR^2)_{4-n}$ (wherein, $R^1$s are each independently a substituted or unsubstituted monovalent hydrocarbon group at each appearance, $R^e$s are each independently a hydrogen atom or a monovalent organic group at each appearance, and n is 0, 1 or 2.).

$R^1$s are preferably each independently a substituted or unsubstituted monovalent hydrocarbon group having 1 to 12 carbon atoms at each appearance. $R^1$ may be specifically mentioned an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, etc.; a cycloalkyl group such as a cyclopentyl group, a cyclohexyl group, a cycloheptyl group, etc.; an aryl group such as a phenyl group, a tolyl group, a xylyl group, a naphthyl group, etc.; an aralkyl group such as a benzyl group, a phenylethyl group, a phenylpropyl group, etc.; an alkenyl group such as a vinyl group, an allyl group, a propenyl group, a butenyl group, etc.; an alkynyl group such as an ethynyl group, a propynyl group, etc.; and a group in which a part or whole of the hydrogen atoms of these groups is/are substituted by a halogen atom(s) such as fluorine, chlorine, bromine, etc., (for example, a chloromethyl group, a bromoethyl group, a chloropropyl group, a trifluoropropyl group, a 3,3,4,4,5,5,6,6,6-nonafluorohexyl group), etc.

$R^2$ are preferably each independently $CH_3$—, $C_2H_5$—, $C_3H_7$—, $CF_3CH_2$—, $CH_3CO$—, $CH_2{=}C(CH_3)$—, $CH_3CH_2C(CH_3){=}N$—, $(CH_3)_2N$—, $(C_2H_5)_2N$—, $CH_2{=}C(OC_2H_5)$—, $(CH_3)_2C{=}C(OC_8H_{17})$—, or

[Formula 21]

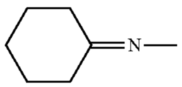

at each appearance. $R^2$ is preferably a substituted or unsubstituted alkyl group having 1 to 3 carbon atoms, and particularly preferably $CH_3$— or $C_2H_5$—.

n is preferably 1 or 2.

As the (B1) crosslinking agent having no reactive functional group, there may be further mentioned organosilicon compounds represented by the following (B1-1) to (B1-3). In one embodiment, the (B1) crosslinking agent having no reactive functional group may be mentioned a compound having at least two silanol group in one molecule as shown by the following formula (B1-1) or (B1-2).

[Formula 22]

(B1-1)

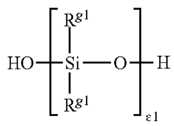

(B1-2)

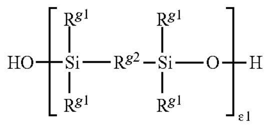

In the formulae (B1-1) and (B1-2), $R^{g1}$s are each independently a substituted or unsubstituted monovalent hydrocarbon group having 1 to 8 carbon atoms at each appearance.

As $R^{g1}$, there may be specifically mentioned an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, etc.; a cycloalkyl group such as a cyclopentyl group, a cyclohexyl group, a cycloheptyl group, etc.; an alkenyl group such as a vinyl group, an allyl group, a propenyl group, an isopropenyl group, a butenyl group, an isobutenyl group, a hexenyl group, a cyclohexenyl group, etc.; an aryl group such as a phenyl group, a tolyl group, a xylyl group, a naphthyl group, etc.; an aralkyl group such as a benzyl group, a phenylethyl group, a phenylpropyl group, etc.; and a group in which a part or whole of the hydrogen atoms of these groups is/are substituted by a halogen atom(s) (for example, a chloromethyl group, a bromoethyl group, a chloropropyl group, a trifluoropropyl group, a nonafluorohexyl group).

In the formula (B1-2), $R^{g2}$s are each independently a substituted or unsubstituted divalent hydrocarbon group having 1 to 20 carbon atoms at each appearance, and preferably having 2 to 10 carbon atoms. As $R^{g2}$, there may be specifically exemplified by an alkylene group such as a methylene group, an ethylene group, a propylene group, a methylethylene group, a butylene group, a hexamethylene group, etc.; a cycloalkylene group such as a cyclohexylene group, etc., an arylene group such as a phenylene group, a tolylene group, a xylylene group, a naphthylene group, a biphenylene group, etc.; a group in which a part or whole of the hydrogen atoms of these groups is/are substituted by a halogen atom(s); and a combination of these substituted or unsubstituted alkylene group(s) and an arylene group. Among these, the $R^{g2}$ is preferably a methylene group, an ethylene group, a propylene group, a butylene group, a hexamethylene group, cyclohexylene group and phenylene group, and particularly preferably an ethylene group, propylene group, a butylene group and a phenylene group.

As the compound having a silanol group in the molecule, there may be mentioned a resinous compound constituted by bonding of one kind or a combination of two or more kinds of $R^{g1}{}_3SiO_{1/2}$, $R^{g1}{}_2SiO_{2/2}$, $R^{g1}SiO_{3/2}$ and $SiO_{4/2}$ units with a silanol group. The constitutional units in the above-mentioned resinous compound may be directly bonded to each other, or may be bonded to each other through a divalent or more of a hydrocarbon group.

In the formula (B1-1) or (B1-2), ε1s are each independently an integer of 1 or more at each appearance. ε1 is preferably 2 or more, more preferably 5 or more, preferably 50 or less, and more preferably 20 or less.

The compound represented by the formula (B1-1) or (B1-2) is preferably those having no $PFPE^1$ structure in the molecular structure.

The (B1) crosslinking agent having no reactive functional group can be an organosilicon compound represented by the formula (B1-3):

[Formula 23]

(B1-3)

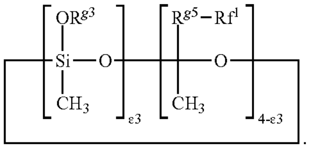

Here, the unit containing $OR^{g3}$ and the unit containing $R^{g4}$ do not have to be arranged as shown in the above-mentioned formula (B1-3) and, for example, it can be understood that the arrangement order thereof is arbitrary, where both exist alternately, etc.

In the formula (B1-3), $R^{g3}$ has the same meaning as that of $R^2$. The above-mentioned $R^{g3}$ is a portion capable of reacting a hydroxyl group or a hydrolyzable group bonded to the Si atom of the PFPE-containing silane compound (a).

$R^{g3}$ is preferably a monovalent organic group.

In the formula (B1-3), $R^{g3}$ is more preferably each independently $CH_3$—, $C_2H_5$—, $C_3H_7$—, $CF_3CH_2$—, $CH_3CO$—, $CH_2(CH_3)$—, $CH_3CH_2C(CH_3)$=N—, $(CH_3)_2N$—, $(C_2H_5)_2N$—, $CH_2$=$C(OC_2H_5)$—, $(CH_3)_2C$=$C(OC_8H_{17})$—, or

[Formula 24]

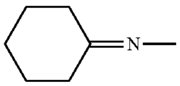

at each appearance.

In the formula (B1-3), $R^{g4}$s are each independently a monovalent organic group at each appearance. $R^{g4}$ is preferably a substituted or unsubstituted monovalent hydrocarbon group, and more preferably a substituted or unsubstituted monovalent hydrocarbon group having 1 to 12 carbon atoms. $R^{g4}$ may be specifically mentioned an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, etc.; a cycloalkyl group such as a cyclopentyl group, a cyclohexyl group, a cycloheptyl group, etc.; an aryl group such as a phenyl group, a tolyl group, a xylyl group, a naphthyl group, etc.; an aralkyl group such as a benzyl group, a phenylethyl group, a phenylpropyl group, etc.; an alkenyl group such as a vinyl group, an ally group, a propenyl group, a butenyl group, etc.; an alkynyl group such as an ethynyl group, a propynyl group, etc.; and a group in which a part or whole of the hydrogen atoms of these groups is/are substituted by a halogen atom(s) such as fluorine, chlorine, bromine, etc., (for example, a chloromethyl group, a bromoethyl group, a chloropropyl group, a trifluoropropyl group, a 3,3,4,4,5,5,6,6,6-nonafluorohexyl group, etc.

In the formula (B1-3), ε3 is 2 or 3.

The (B1) crosslinking agent having no reactive functional group is preferably a compound represented by the formula: $R^1{}_nSi(OR^2)_{4-n}$.

In a preferred embodiment, the (B) crosslinking agent having no reactive functional group may be exemplified by an alkoxy group-containing compound such as tetramethoxysilane, methyltrimethoxysilane, vinyltrimethoxysilane, phenyltrimethoxy-silane, tetraethoxysilane, methyltriethoxysilane, vinyltriethoxysilane, phenyltriethoxy-silane, tetrapropoxysilane, tetraisopropoxysilane, dimethyldimethoxysilane, vinyl-methyldimethoxysilane, dimethyldiethoxysilane and 3-chloropropyltrimethoxysilane and a partially hydrolyzed condensate thereof; a substituted alkoxy group-containing compound such as tetrakis(2-ethoxyethoxy)silane, methyltris(2-methoxyethoxy)silane, vinyl(2-ethoxyethoxy)silane and phenyltris(2-methoxyethoxy)silane and a partially hydrolyzed condensate thereof; an enoxy group-containing compound such as methyltripropenoxysilane, methyltriisopropenoxysilane, vinyltriisopropenoxysilane, phenyltriisopropenoxysilane, dimethyldiisopropenoxysilane and methylvinyl-diisopropenoxysilane and a partially hydrolyzed condensate thereof; an acyloxy group-containing compound such as methyltriacetoxysilane and a partially hydrolyzed condensate thereof, etc. Component (B1) may be used one kind alone or may be used two or more kinds simultaneously.

<<(B2) Crosslinking Agent Having Reactive Functional Group>>

The (B2) crosslinking agent having a reactive functional group is a compound not only contributing to the crosslinking reaction (condensation reaction) of the PFPE-containing silane compound (a) but also functions as an adhesive imparting agent. As Component (B2), a compound represented by

[Formula 25]

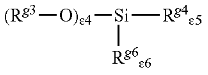

(B2)

can be used.

In the formula (B2), $R^{g3}$ and $R^{g4}$ have the same meanings as defined above.

In the formula (B2), $R^{g6}$s each independently represent $R^{g8}$—$R^{g7}$— at each appearance.

$R^{g7}$s each independently represent a single bond, an oxygen atom or a divalent organic group at each appearance. The divalent organic group is as defined above.

$R^{g7}$ is preferably an alkylene group having 1 to 10 carbon atoms, or a group having 1 to 10 carbon atoms and contains a nitrogen atom or an oxygen atom in the main chain.

$R^{g7}$ is more preferably an alkylene group having 1 to 3 carbon atoms, $CH_2CH_2$—NH—$CH_2CH_2CH_2$, or $CH_2$—O—$CH_2CH_2CH_2$.

$R^{g8}$ is a reactive functional group. The above-mentioned $R^{g8}$ is preferably each independently a primary amino group, an epoxy group, a (meth)acryloyl group, a (meth)acryloxy group, a mercapto group or an isocyanate group at each appearance, and more preferably a primary amino group.

In the formula (B2), ε4 is 2 or 3, and more preferably 3. In the formula (B2), ε5 is 0 or 1. In the formula (B2), ε6 is 1 or 2, and preferably 1. Provided that a sum of ε4, ε5 and ε6 is 4. Particularly preferably ε4 is 3, ε5 is 0, and ε6 is 1.

As the (B2) crosslinking agent having a reactive functional group, there may be exemplified by, for example, a substituted or unsubstituted amino group-containing silane such as 3-aminopropyltrimethoxysilane, 3-aminopropyltriethoxysilane, 3-aminopropyltriisopropoxysilane, 3-aminopropyltriacetamidesilane, N-(2-aminoethyl)-3-aminopropyltrimethoxysilane, N-(2-aminoethyl)-3-aminopropyltriethoxysilane, N-methyl-3-aminopropyltrimethoxysilane, N-phenyl-3-aminopropyltrimethoxysilane, N,N-dimethyl-3-aminopropyltrimethoxysilane; an epoxy group-containing silane such as 3-glycidoxypropyltrimethoxysilane, 3-glycidoxypropyltriethoxysilane, 3-glycidoxy-propylmethyldimethoxysilane and 3,4-epoxycyclohexylethyltrimethoxysilane; an isocyanate group-containing silane such as 3-isocyanatepropyltrimethoxysilane, 3-isocyanatepropyltriethoxysilane and 3-isocyanatepropylmethyldimethoxysilane; a (meth)acryloxy group-containing silane such as 3-acryloxypropyltrimethoxysilane, 3-methacryloxypropyltrimethoxysilane, 3-acryloxypropyhnethyldimethoxysilane, 3 methacryloxypropylmethyldimethoxysilane and 3-methacryloxypropylmethyldiethoxy-silane; a mercapto group-containing silane such as 3-mercaptopropyltrimethoxysilane; and a mixture or reactant of primary amino group-containing silane and epoxy group-containing silane.

In one embodiment, the crosslinking agent (b) does not have a group represented by $PFPE^1$ in the molecular chain.

In one embodiment, a molecular weight of the crosslinking agent (b) is 1,000 or less, preferably 600 or less, and more preferably 250 or less. The lower limit of the molecular weight of the crosslinking agent may be 90 or more, and may be 120 or more.

The crosslinking agent (b) may be used one kind alone or may be used two or more kinds simultaneously. When two or more kinds are used in combination, it may be either of the case where (B1) may be used in combination of two or more kinds, (B2) may be used in combination of two or more kinds, or (B1) and (B2) may be used in combination of each or more one kinds. From the viewpoint of crosslinking property, the crosslinking agent (b) is preferably contained at least (B1) with one or more kinds. Also, from the viewpoints of crosslinking property and adhesiveness to the substrate, it is preferable to use (B1) and (D) mentioned later, (B2) and (D) or (B1), (B2) and (D) in combination, and is more preferable to use (B1) and (D) in combination.

The crosslinking agent (b) can contain, for example, 0.1 part by mass or more, specifically contain 0.3 part by mass or more, and can contain 30 parts by mass or less, specifically 20 parts by mass or less, and more specifically 10 parts by mass or less based on 100 parts by mass of the PFPE-containing silane compound (a) in the curable composition.

A total content of Components (B1) and (B2) based on PFPE-containing silane compound (a) is preferably 0.1% by mass or more from the viewpoint of crosslinking property, more preferably 0.3% by mass or more, and also preferably 30% by mass or less, more preferably 20% by mass or less, and particularly preferably 10% by mass or less.

A total content of Components (B1) and (B2) based on PFPE-containing silane compound (a) is preferably 0.1 to 30% by mass from the viewpoint of crosslinking property, more preferably 0.3 to 20% by mass, and particularly preferably 0.3 to 10% by mass.

A content of Component (B1) is preferably 10 to 100% by mass based on the sum of Components (B1) and (B2), more preferably 20 to 100% by mass, and particularly preferably 50 to 100% by mass. A preferred content of Components (B1) and (B2) to PFPE-containing silane compound (a) can be calculated from the preferred content of sum of Components (B1) and (B2) to PFPE-containing silane compound (a) and the preferred content of Component (B1) to the sum of Components (B1) and (B2), respectively.

The crosslinking agent (b) can contain, for example, 0.1 to 30 parts by mass, specifically can contain 0.3 to 10 parts by mass, more specifically can contain 0.3 to 5.0 parts by mass based on 100 parts by mass of the PFPE-containing silane compound (a) in the curable composition.

The crosslinking agent (b) can contain, for example, 1 mol or more of the $—OR^2$ group, and specifically can contain 2 mol or more based on 1 mol of a hydroxyl group or a hydrolyzable group bonded to the Si atom of the PFPE-containing silane compound (a) in the curable composition. The crosslinking agent (b) can contain, for example, 30 mol or less of the $—OR^2$ group, specifically can contain 20 mol or less, and more specifically can contain 10 mol or less based on 1 mol of a hydroxyl group or a hydrolyzable group bonded to the Si atom of the PFPE-containing silane compound (a).

The crosslinking agent (b) can contain, for example, the $—OR^2$ group in the range of 1 to 30 mol, and specifically can contain in the range of 2 to 20 mol based on 1 mol of a hydroxyl group or a hydrolyzable group bonded to the Si atom of the PFPE-containing silane compound (a).

<Condensation Catalyst>

The condensation catalyst (c) is a component to promote hydrolysis condensation reaction of the PFPE-containing silane compound (a) and the crosslinking agent (b).

As the above-mentioned condensation catalyst, a metal-based catalyst, an organic acid-based catalyst, an inorganic acid-based catalyst, a base-based catalyst, etc., can be used. From the viewpoint of curing rate of the composition, as the condensation catalyst, it is preferable to be a metal-based catalyst.

As the metal atom contained in the above-mentioned metal-based catalyst, there may be mentioned, for example, titanium, zirconium, tin, etc.

In particular, organic tin compounds or alkoxy titaniums is preferred.

As an embodiment of the above-mentioned metal-based catalyst, a compound having an alkoxide ($—O—R^h$) as a ligand can be used.

When a compound having alkoxide is used as the above-mentioned metal-based catalyst, as $R^h$, an alkyl group having 1 to 4 carbon atoms is preferable. When such a catalyst is used, the condensation reaction is more promoted.

When a compound having alkoxide is used as the above metal-based catalyst, as the above-mentioned $R^h$, an alkyl group having 1 to 3 carbon atoms is more preferable. When a catalyst having an alkyl group as mentioned above is used, the condensation reaction is particularly promoted. The above-mentioned catalyst is easily dissolved or dispersed in the curable composition so that it can contribute to promote a uniform reaction. The above-mentioned catalyst contains less foreign substances so that it can contribute to form a cured product of a transparent curable composition.

Preferable metal-based catalyst may be exemplified by a carboxylic acid metal salt such as iron octoate, manganese octoate, zinc octoate, tin naphthate, tin caprylate and tin oleate; an organic tin compound such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, dioctyltin dilaurate and dimethyltin dineodecanoate; an organic titanium compound such as tetraethoxy titanium, tetrapropoxy titanium, tetraisopropoxy titanium, tetra-n-butoxy titanium, tetraisobutoxy titanium, diisopropoxy titanium bis(ethylacetoacetate) and 1,3-propanedioxy titanium bis(ethylacetoacetate); organic aluminum such as aluminum trisacetylacetonate, aluminum trisethyl acetoacetate, diisopropoxyaluminum ethyl acetoacetate and triethoxyaluminum, etc.; and an organic zirconium compound such as zirconium tetraacetylacetonate, tetraisopropoxy zirconium, tetrapropoxy zirconium, tetra-n-butoxy zirconium, tetraisobutoxy zirconium, tetra-n-propoxy zirconium, tetrabutoxy zirconium, tributoxy zirconium acetylacetonate, tributoxy zirconium stearate, etc.

As the above-mentioned organic acid-based catalyst, there may be mentioned, for example, a compound having carboxylic acid, sulfonic acid or phosphoric acid, and specifically mentioned acetic acid, trifluoroacetic acid, methanesulfonic acid, toluene-sulfonic acid, an alkylphosphoric acid, etc.

As the above-mentioned inorganic acid-based catalyst, there may be mentioned, for example, hydrochloric acid, sulfuric acid, etc.

As the above-mentioned base-based catalyst, there may be mentioned, for example, amine compounds such as ammonia, triethylamine, diethylamine; a dialkylhydroxylamine such as dimethylhydroxyamine, diethylhydroxylamine, etc.; and a guanidyl compound such as tetramethylguanidine, guanidyl group-containing silane or siloxane, etc.; and the like.

The condensation catalyst is preferably contained in the curable composition in an amount of 0.01 to 10.0 parts by mass, and more preferably 0.03 to 5.0 parts by mass based on 100 parts by mass of the PFPE-containing silane compound (a).

The condensation catalyst may be used one kind alone or may be used two or more kinds simultaneously.

(Additional Components)

The curable composition of the present invention may contain additional components other than the above-mentioned PEPE-containing silane compound (a), the crosslinking agent (b) and the condensation catalyst (c) as long as the effects of the present invention are not impaired. Such components may be mentioned (D) an adhesiveness imparting agent, (E) a filler, (F) a solvent, (G) a PFPE-containing silane compound other than the PFPE-containing silane compound (a), (H) various kinds of additives, etc. (hereinafter, they are sometimes abbreviated to as "Component (D)", etc.).

<(D) Adhesive-Imparting Agent Compound Containing Two or More Alkoxysilyl Groups in One Molecule, and Group Linking Between Alkoxysilyl Groups is —O— Group; and Group Having Group Other than Siloxane Bond>

A compound used as an adhesive-imparting agent in the curable composition of the present invention is a compound containing two or more alkoxysilyl groups in one molecule, and a group linking between the alkoxysilyl groups being an —O— group; and a group other than a group having a siloxane bond, or a partially hydrolyzed condensate thereof (provided that (a) is excluded.) (hereinafter, also referred to as an adhesive-imparting agent containing two or more alkoxysilyl groups in one molecule.). Component (D) is a component improving adhesiveness of the cured product of the composition to a substrate such as glass, metal, plastic, etc.

Component (D) is a compound which undergoes a crosslinking reaction (condensation reaction) with a hydroxyl group or a hydrolyzable group bonded to the Si atom of the PFPE-containing silane compound (a) or an Si—$OR^2$ group of the crosslinking agent (b) at the time of curing the curable composition. By containing Component (I)), adhesiveness of the cured product of the composition to a substrate such as glass, metal, plastic, etc., is markedly improved.

Component (D) may have a reactive functional group, or may not have the same. In Component (D), the group linking between the alkoxysilyl groups is an —O— group; and a group having a group other than a siloxane bond. From the viewpoint of adhesiveness to a substrate, the group that links between the alkoxysilyl groups is preferably a group containing a nitrogen atom and/or a carbonyl group, and more preferably a group further containing, in addition to a nitrogen atom and/or a carbonyl group, an —O— group, an alkenylene group and/or an alkylene group.

As the group linking between the alkoxysilyl groups of Component (D), it is further preferably a group containing

[Formula 26]

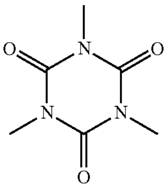

[Formula 27]

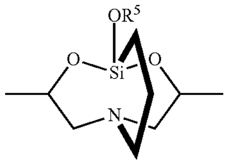

$—O—C(=O)—C=C—C(=O)—O—$, or

[Formula 28]

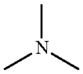

particularly preferably

[Formula 29]

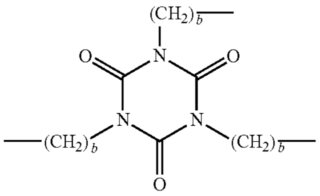

[Formula 30]

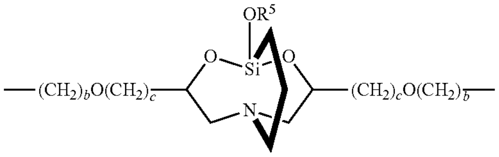

$—(CH_2)_b—O—C(=O)—C=C—C(=O)—O—(CH_2)_b—$,

[Formula 31]

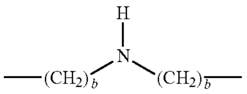

or

[Formula 32]

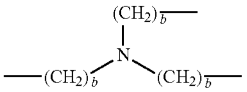

(wherein, $R^5$s are each independently an alkyl group having 1 to 4 carbon atoms at each appearance, preferably a methyl group or an ethyl group, "b"s and "c"s are each independently an integer of 1 to 8 at each appearance, and preferably an integer of 1 to 4.).

From the viewpoint of adhesiveness to the substrate, Component (D) is preferably a compound selected from the group consisting of an alkoxysilyl group-containing isocyanurate compound, an alkoxysilyl group-containing carbasilatrane compound, an alkoxysilyl group-containing fumaric acid ester compound and an alkoxysilyl group-containing amine compound, and particularly preferably an alkoxysilyl group-containing isocyanurate compound or an alkoxysilyl group-containing carbasilatrane compound.

As the alkoxysilyl group-containing isocyanurate compound, there may be mentioned, for example, tris(3-trialkoxysilylpropyl)isocyanurate such as tris(3-trimethoxysilylpropyl)isocyanurate, tris(3-triethoxysilylpropyl)isocyanurate, etc.

As the alkoxysilyl group-containing carbasilatrane compound, there may be mentioned, for example, the following compounds:

[Formula 33]

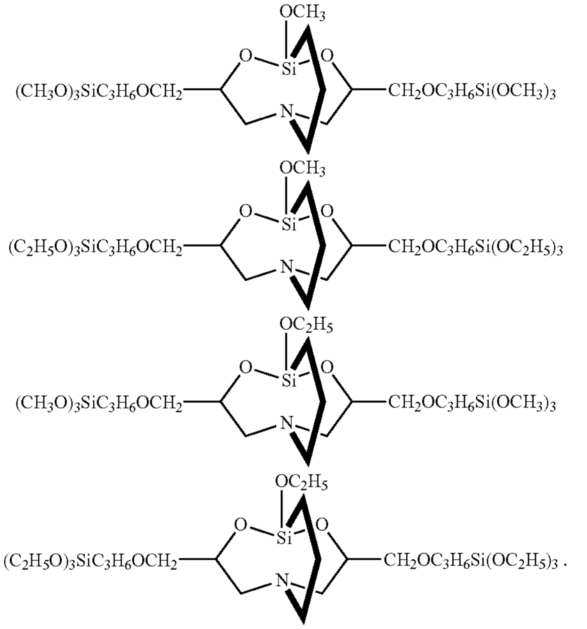

As the alkoxysilyl group-containing fumaric acid ester compound, there may be mentioned, for example, bis(3-trimethoxysilylpropyl)fumarate, bis(3-triethoxy-silylpropyl) fumarate, etc. As the alkoxysilyl group-containing amine compound, there may be mentioned bis(3-trimethoxysilylpropyl)amine, bis(3-triethoxysilylpropyl)amine, tris(3-trimethoxysilylpropyl)amine, tris(3-triethoxysilylpropyl) amine, etc.

Component (D) may be a compound in which a part of the hydrogen atom(s) is substituted by a fluorine atom(s). Component (D) may be used one kind alone or may be used two or more kinds simultaneously.

A content of Component (D) based on the PFPE-containing silane compound (a) is preferably 0.01% by mass or more from the viewpoint of adhesiveness to the substrate, more preferably 0.02% by mass or more, and further preferably 0.05% by mass or more, and also preferably 30% by mass or less, more preferably 20% by mass or less, and further preferably 10% by mass or less.

The content of Component (D) based on the PFPE-containing silane compound (a) is preferably 30% by mass or less from the viewpoint of adhesiveness to the substrate, more preferably 0.01 to 30% by mass, further preferably 0.02 to 20% by mass, and particularly preferably 0.05 to 10% by mass.

The content of Component (D) is preferably 0 to 90% by mass based on a sum of Components (B) and (D), more preferably 1 to 70% by mass, and particularly preferably 1 to 50% by mass.

Component (D) can contain, for example, 1 mol or more of an alkoxysilyl group, and specifically 2 mol or more based on 1 mol of a hydroxyl group or a hydrolyzable group bonded to the Si atom of the PFPE-containing silane compound (a) in the curable composition. Component (D) can contain, for example, 30 mol or less of an alkoxysilyl group, specifically 20 mol or less, and more specifically 10 mol or less based on 1 mol of a hydroxyl group or a hydrolyzable group bonded to the Si atom of the PFPE-containing silane compound (a) in the curable composition.

Component (D) can contain an alkoxysilyl group, for example, in the range of 1 to 30 mol, and specifically in the range of 2 to 20 mol based on 1 mol of a hydroxyl group or a hydrolyzable group bonded to the Si atom of the PFPE-containing silane compound (a).

<(E) Filler>

The curable composition may further contain a (E) filler. As the (E) filler, there may be exemplified by oxides such as fumed silica, calcined silica, silica aerogel, precipitated silica, diatomaceous earth, pulverized silica, fused silica, quartz powder, finned titanium oxide, iron oxide, zinc oxide, titanium oxide, aluminum oxide, etc.; materials on the surface of which is treated with a hydrophobic agent such as trimethylchlorosilane, dimethyldichlorosilane, hexamethyldisilazane, octamethylcyclo-tetrasiloxane, etc.; silicates such as calcium carbonate, magnesium carbonate, zinc carbonate, etc.; silicates such as aluminosilicate, calcium silicate, etc.; talc; complex oxide such as glass wool, mica fine powder, etc.; conductive fillers such as carbon black, copper powder, nickel powder, etc.; synthetic resin powders such as polymethylsilsesquioxanc, polystyrene, polyvinyl chloride, polypropylene, etc.; and fibrous fillers such as asbestos, glass fibers, organic fibers, etc., and can be selected depending on coating workability, and physical properties required for a rubber-like elastic body obtained by curing.

When the (E) filler is a particulate filler, an average particle diameter thereof is preferably 100 μm or less from the viewpoints of dispersibility of (E), fluidity of the curable composition and high mechanical strength of the cured product, more preferably 50 μm, and particularly preferably 10 μm or less. The measured value of the average particle diameter is a median diameter (d50) measured by the laser diffraction/scattering method.

The (E) filler can be contained in an amount of, for example, 200 parts by mass or less based on 100 parts by mass of the PFPE-containing silane compound (a) in the curable composition, specifically can be contained 1 to 100 parts by mass, and more specifically can be contained 1 to 50 parts by mass.

(F) Solvent

The curable composition may contain a solvent(s). In this case, depending on the use and purpose of the curable composition, it can be used by dissolving in a suitable solvent (for example, a fluorine atom-containing solvent) with a desired concentration. A concentration of the above-mentioned solvent may be, for example, 80 parts by mass or less based on 100 parts by mass of the curable composition, may be 50 parts by mass or less, may be 30 parts by mass or less, and may be 20 parts by mass or less. From the viewpoint of adjusting a viscosity of the curable composition, it is preferable to contain a solvent. By containing the solvent, handleability of the curable composition can be good. In addition, a shape of a cured product formed by the curable composition can be easily controlled, and for example, formation of a cured product with a large thickness can be facilitated.

As the above-mentioned solvent, there may be mentioned, for example:

a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane ((ZEORORA H (trade name), etc.), $C_4F_9OCH_3$, $C_4F_9OC_2H_5$, $CF_3CH_2OCF_2CHF_2$, $C_6F_{13}CH{=}CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyltrifluoromethanesulfonate, trifluoroacetic acid and $CF_3O(CF_2CF_2O)_{w1}(CF_2O)_{w2}CF_2CF_3$ [wherein, w1 and w2 are each independently an integer of 0 or more and 1,000 or less, and the order of existence of each recurring units enclosed with parentheses to which w1 or w2 are applied is arbitrary in the formula, provided that a sum of w1 and w2 is 1 or more.], 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, 1,1,1,4,4,4-hexafluoro-2-butene, ethyl perfluorobutyl ether and methyl perfluorobutyl ether, etc. These solvents can be used alone, or as a mixture of two or more kinds.

Incidentally, when the cured product obtained from the curable composition is adhered to various kinds of substrates, various kinds of primers can be used in combination.

In one embodiment, when the curable composition is used, the composition may be used by further diluting with a solvent depending on the use thereof and the purpose. As the solvent to be used for dilution, the fluorine atom-containing solvent exemplified above can be used. For example, it may be used by dissolving with 1,3-bis(trifluoromethyl)benzene, Fluorinert (available from 3M Company), perfluorobutyl methyl ether, perfluorobutyl ethyl ether, etc., with a desired concentration as the solvent. In particular, for the use of a thin film coating, it is preferable to use the above-mentioned solvent.

(G) PFPE-Containing Silane Compound Other than the PFPE-Containing Silane Compound (a)

The curable composition can further contain a PFPE-containing silane compound other than the PFPE-containing silane compound (a). The curable composition of the present invention can contain a compound represented by the following formula (G-1), (G-2), (G-3) or (G-4) (hereinafter, it may be also referred to as "PFPE-containing silane compound (b)").

[Formula 34]

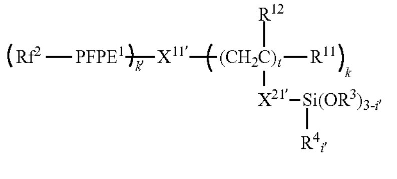

(G-1)

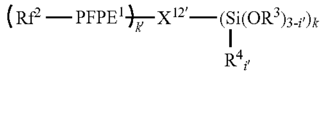

(G-2)

-continued $$(Rf^2-PFPE^1)_{k1'}-X^{13'}-(SiR^a_{l2}R^b_{m2}R^c_{n2})_{k1} \qquad (G-3)$$

$$(Rf^2-PFPE^1)_{k2'}-X^{14'}-(CR^d_{l4}R^e_{m4}R^f_{n4})_{k2} \qquad (G-4)$$

In the formulae (0-1), (G-2), (G-3) and (G-4), with regard to the portion that overlaps with the description regarding (A), (B), (C) and (D), the description may be sometimes omitted.

In the above-mentioned formulae, $Rf^2$s each independently represent an alkyl group having 1 to 16 carbon atoms which may be substituted by one or more fluorine atoms at each appearance.

The "alkyl group having 1 to 16 carbon atoms" in the above-mentioned alkyl group having 1 to 16 carbon atoms which may be substituted by one or more fluorine atoms may be linear or may be branched, preferably linear or branched having 1 to 6 carbon atoms, particularly an alkyl group having 1 to 3 carbon atoms, and more preferably a linear alkyl group having 1 to 3 carbon atoms.

The above-mentioned $Rf^2$ is preferably an alkyl group having 1 to 16 carbon atoms substituted by 1 or more fluorine atoms, more preferably a $CF_2H-C_{1-15}$ fluoroalkylene group or a $C_{1-16}$ perfluoroalkyl group, and further preferably a $C_{1-16}$ perfluoroalkyl group.

The perfluoroalkyl group having 1 to 16 carbon atoms may be linear or may be branched, preferably linear or branched having 1 to 6 carbon atoms, particularly a perfluoroalkyl group having 1 to 3 carbon atoms, more preferably a linear perfluoroalkyl group having 1 to 3 carbon atoms, and specifically $-CF_3$, $-CF_2CF_3$, or $-CF_2CF_2CF_3$.

In the formula (G-1), k is an integer of 1 to 9, and k' is an integer of 1 to 9. k and k' can vary depending on the number of the valence of $X^{11'}$. In the formula (G-1), a sum of k and k' is the same as the number of the valence of $X^{11'}$. For example, when $X^{11'}$ is a 10 valent organic group, a sum of k and k' is 10 and, for example, it can take k is 9 and k' is 1, k is 5 and k' is 5, or k is 1 and k' is 9. Also, when X" is a divalent organic group, k and k' are 1. In the formula (G-1), when $X^{11'}$ is a single bond, k and k' are 1.

The above-mentioned $X^{11'}$ is preferably 2 to 7 valent, more preferably 2 to 4 valent, and further preferably a divalent organic group.

In one embodiment, $X^{11'}$ is a 2 to 4 valent organic group, k is 1 to 3, and k' is 1.

In another embodiment, $X^{11'}$ is a divalent organic group, k is 1, and k' is 1.

In the above-mentioned formula (0-1), i's are each independently an integer of 0 to 3 at each appearance, preferably 0 to 2, and more preferably 0. It is preferable that, in the formula, at least one of i' is an integer of 0 to 2, that is, not all i's are 3 at the same time. In other words, in the formula (G-1), at least one $OR^3$ is present.

In the formula (G-2), k is an integer of 1 to 9, and k' is an integer of 1 to 9. k and k' can vary depending on the number of the valence of $X^{12'}$. In the formula (G-2), a sum of k and k' is the same as the number of the valence of $X^{12'}$. For example, when $X^{12'}$ is a 10 valent organic group, a sum of k and k' is 10 and, for example, it can take k is 9 and k' is 1, k is 5 and k' is 5, or k is 1 and k' is 9. Also, when $X^{12'}$ is a divalent organic group, k and k' are 1. In the formula (G-2), when $X^{12'}$ is a single bond, k and k' are 1.

The above-mentioned $X^{12'}$ is preferably a 2 to 7 valent, more preferably a 2 to 4 valent, and further preferably a divalent organic group.

In one embodiment, $X^{12'}$ is a 2 to 4 valent organic group, k is 1 to 3, and k' is 1.

In another embodiment, $X^{12'}$ is a divalent organic group, k is 1, and k' is 1.

In the formula (G-2), i' has the same meaning as defined in (G-1).

In the above-mentioned formula (G-3), k1 is an integer of 1 to 9, and k1' is an integer of 1 to 9. k1 and k1' can vary depending on the number of the valences of $X^{13'}$. In the formula (G-3), a sum of k1 and k1' is the same as the number of the valence of $X^{13}$. For example, when $X^{13'}$ is a 10 valent organic group, a sum of k1 and k1' is 10 and, for example, it can take k1 is 9 and k1' is 1, k1 is 5 and k1' is 5, or k1 is 1 and k1' is 9. Also, when $X^{13'}$ is a divalent organic group, k1 and k1' are 1. In the formula (G-3), when $X^{13'}$ is a single bond, k1 and k1' are 1.

The above-mentioned $X^{13'}$ is preferably a 2 to 7 valent, more preferably a 2 to 4 valent, further preferably a divalent organic group.

In one embodiment, $X^{13'}$ is a 2 to 4 valent organic group, k1 is 1 to 3, and k1' is 1.

In another embodiment, $X^{13}$ is a divalent organic group, k1 is 1, and k1' is 1.

In the above-mentioned formula (G-4), k2 is an integer of 1 to 9, and k2' is an integer of 1 to 9. k2 and k2' can vary depending on the number of the valences of $X^{14'}$. In the formula (G-4), a sum of k2 and k2' is the same as the number of the valence of $X^{14'}$. For example, when $X^{14'}$ is a 10 valent organic group, a sum of k2 and k2' is 10 and, for example, it can take k2 is 9 and k2' is 1, k2 is 5 and k2' is 5, or k2 is 1 and k2' is 9. Also, when $X^{14'}$ is a divalent organic group, k2 and k2' are 1. In the formula (G-4), when $X^{14'}$ is a single bond, k2 and k2' are 1.

The above-mentioned $X^{14'}$ is preferably a 2 to 7 valent, more preferably a 2 to 4 valent, further preferably a divalent organic group.

In one embodiment, $X^{14'}$ is a 2 to 4 valent organic group, k2 is 1 to 3, and k2' is 1.

In another embodiment, $X^{14}$ is a divalent organic group, k2 is 1, and k2' is 1.

In one embodiment, the PFPE-containing silane compound (b) can be a compound represented by the formula (G-1), (G-3) or (G-4). By using such a silane compound, adhesiveness to a substrate can be more improved.

In one embodiment, the PFPE-containing silane compound (b) has two or more Si atoms having a hydroxyl group or a hydrolyzable group at the terminal, preferably having 3 or more.

In one embodiment, in the curable composition, an amount of the compound represented by the formulae (G-1), (G-2), (G-3) and (G-4) is 0.1 mol % or more and 35 mol % or less based on a sum of the compound represented by the formulae (A), (B), (C) and (D) (hereinafter, also referred to as "Component (1)") and the compound represented by the formulae (G-1), (G-2), (G-3) and (G-4) (hereinafter, also referred to as "Component (2)"). A lower limit of the compound represented by the formulae (G-1), (G-2), (G-3) and (G-4) based on a sum of Component (1) and Component (2) can be preferably 0.1 mol %, more preferably 0.2 mol %, further preferably 0.5 mol %, further more preferably 1 mol %, particularly preferably 2 mol %, and specifically 5 mol %. An upper limit of the compound represented by the formulae (G-1), (G-2), (G-3) and (G-4) based on a sum of Component (1) and Component (2) can be preferably 35 mol %, more preferably 30 mol %, further preferably 20 mol %, and further more preferably 15 mol % or 10 mol %. A content of the compound represented by the formulae (G-1), (G-2), (G-3) and (G-4) based on a sum of Component (1) and Component (2) is preferably 0.1 mol % or more and 30 mol % or less, more preferably 0.1 mol % or more and 20 mol % or less, further preferably 0.2 mol % or more and 10 mol % or less, further more preferably 0.5 mol % or more and 10 mol % or less, and particularly preferably 1 mol % or more and 10 mol % or less, and for example, 2 mol % or more and 10 mol % or less or 5 mol % or more and 10 mol % or less. By making the contents of Component (1) and Component (2) within such ranges, the curable composition can contribute to form a cured product having good friction durability.

In the curable composition, a combination of Component (1) and Component (2) is preferably a combination of a compound represented by the formula (A) and a compound represented by the formula (G-1), a combination of a compound represented by the formula (B) and a compound represented by the formula (G-2), a combination of a compound represented by the formula (C) and a compound represented by the formula (G-3), or a combination of a compound represented by the formula (D) and a compound represented by the formula (G-4).

The compounds represented by the formula (A) and the formula (G-1) are preferably "t" of 2 or more, more preferably an integer of 2 to 10, and further preferably an integer of 2 to 6. By making "t" 2 or more, a plurality of Si atoms having $OR^3$ are present, and higher durability (for example, friction durability) can be obtained in the cured product formed by the curable composition.

The compounds represented by the formula (C) and the formula (G-3) are preferably 12 of 2 or 3, and more preferably 3.

In a preferred embodiment, the compound represented by the formula (C) has a structure represented by $—Si—(Z^3—SiR^{72}{}_3)_2$ or $—Si—(Z^3—SiR^{72}{}_3)_3$ at the terminal, further preferably has a structure represented by $—Si—(Z^3—SiR^{72}{}_3)_3$; the compound represented by the formula (G-3) has a structure represented by $—Si—(Z^3—SiR^{72}{}_3)_2$ or $—Si—(Z^3—SiR^{72}{}_3)_3$ at the terminal, and further preferably has a structure represented by $—Si—(Z^3—SiR^{72}{}_3)_3$. By making the terminal such a structure, higher durability (for example, friction durability) can be obtained in the cured product formed by the curable composition.

As the group represented by the above-mentioned $—Si—(Z^3—SiR^{72}3)_2$, there may be specifically mentioned a group in which Its is represented by $—Z^3—SiR^{72}{}_3$, and a sum of m1 and n1 is 1 in $—Si—R^a{}_2R^b{}_{m1}R^c{}_{n1}$, a group in which $R^a$ is represented by $—Z^3—SiR^{72}{}_3$, and a sum of m2 and n2 is 1 in $—Si—R^a{}_2R^b{}_{m2}R^c{}_{n2}$, or a group in which the terminal of $R^{71}$ is represented by $—Z^3—SiR^{72}{}_3$, and a sum of q1 and r1 is 1 in $—Si—R^{71}{}_2R^{72}{}_{q1}R^{73}{}_{r1}$.

The compounds represented by the formula (D) and the formula (G-4) are preferably m4 of 2 or 3, and more preferably 3.

In a preferred embodiment, the compound represented by the formula (D) has a $—C—(Y—SiR^{85}{}_3)_2$ (specifically, $—C—(Y—SiR^{85}{}_3)_2R^{83}$) or $—C—(Y—SiR^{85}{}_3)_3$ structure at the terminal, further preferably has a $—C—(Y—SiR^{85}{}_3)_3$ structure; and the compound represented by the formula (G-4) has a $—C—(Y—SiR^{85}{}_3)_2$ (specifically, $—C—(Y—SiR^{85}{}_3)_2R^{83}$) or $—C—(Y—SiR^{85}{}_3)_3$ structure at the terminal, and further preferably has a $—C—(Y—SiR^{85}{}_3)_3$ structure. By making the terminal such a structure, the curable composition contributes to form a cured product having higher durability (for example, friction durability).

As the PFPE-containing silane compound (b), it can be a compound represented by the following formula (G-5).

[Formula 35]

(G-5)

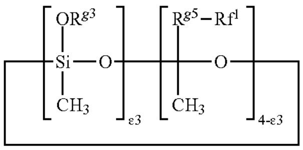

In the formula (G-5), $OR^{g3}$ represents a hydrolyzable group. $R^{g3}$s are each independently and preferably $CH_3$—, $C_2H_5$—, $C_3H_7$—, $CF_3CH_2$—, $CH_3CO$—, $CH_2$=C($CH_3$)—, $CH_3CH_2C(CH_3)$=N—, $(CH_3)_2N$—, $(C_2H_5)_2N$—, $CH_2$=C($OC_2H_5$)—, $(CH_3)_2C$=C($OC_8H_{17}$)—, or

[Formula 36]

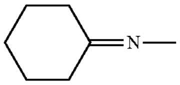

at each appearance, and more preferably $CH_3$— or $C_2H_5$—.

In the formula (G-5), ε3 is 2 or 3.

$Rf^1$ is a monovalent fluorinated (poly)ether group. As $Rf^1$, there may be exemplified by the structure in which $CF_3O$—, $CF_3CF_2O$—, $CF_3CF_2CF_2O$—, $(CF_3)_2CFO$—, or $CF_3CF_2CF_2CF_2O$—, etc., is bonded to the $CF_2$ terminal of the above-mentioned $PFPE^1$.

$R^{g5}$ is a divalent organic group. The divalent organic group has the same meaning as defined above. $R^{g5}$ can be a substituted or unsubstituted divalent hydrocarbon group which may contain, for example, one kind or two or more kinds of an oxygen atom, a nitrogen atom, a silicon atom and a sulfur atom, and may contain an amide bond or a sulfonamide bond. The divalent hydrocarbon group preferably has a number of the carbon atoms of 2 to 20. Here, specific examples of the substituted or unsubstituted divalent hydrocarbon group which does not intervene an oxygen atom, a nitrogen atom, a silicon atom or a sulfur atom and does not contain an amide bond or a sulfonamide bond may be mentioned an alkylene group such as an ethylene group, a propylene group, a methylethylene group, a butylene group, a hexamethylene group, etc.; a cycloalkylene group such as a cyclohexylene group, etc.; an arylene group such as a phenylene group, a tolylene group, a xylylene group, a naphthylene group, a biphenylene group, etc.; a combination of these alkylene groups and arylene groups; and a group in which some or all of the hydrogen atom of these alkylene groups and arylene groups are substituted by a halogen atom.

In the above-mentioned divalent hydrocarbon group, an oxygen atom can be contained as —O—, a nitrogen atom can be contained as —$NR^{g51}$— ($R^{g51}$ is a hydrogen atom or an alkyl group having 1 to 10 carbon atom or an aryl group) or —N=, a silicon atom can be contained as —$SiR^{g52}R^{g53}$— ($R^{g52}$s and $R^{g53}$s are each independently an alkyl group having 1 to 10 carbon atoms or an aryl group at each appearance), and a sulfur atom can be contained as —S—. In addition, in the above-mentioned divalent hydrocarbon group, the amide bond can be contained as —C(=O)$NR^{g51}$— ($R^{g51}$ is the same as mentioned above), and the sulfonamide bond can be contained as —$SO_2NR^{g51}$— ($R^{g51}$ is the same as mentioned above). Specific examples of such a divalent hydrocarbon group may be mentioned the following. Incidentally, in the following formula, Me represents a methyl group and Ph represents a phenyl group, and in the following respective formulae, the $Rf^1$ group is bonded to the left side.

[Formula 37]

J—$CH_2CH_2OCH_2CH_2CH_2$—,

J—$CH_2OCH_2CH_2CH_2$—,

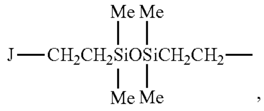

J—$CH_2CH_2SCH_2CH_2CH_2$—,

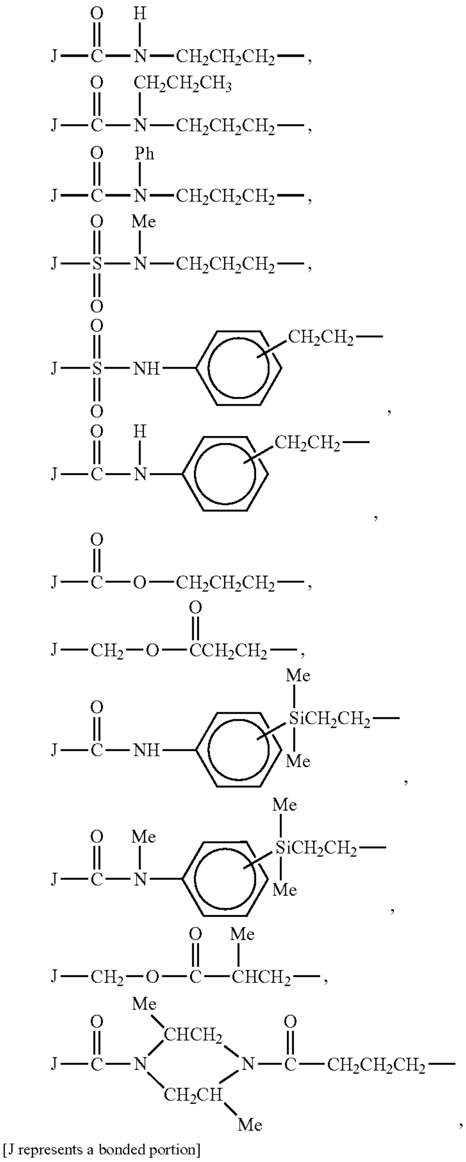

[J represents a bonded portion]

(H) Various Kinds of Additives

The curable composition may further contain various kinds of additives. The various kinds of additives are not particularly limited, and may contain, for example, an (unreactive) fluoropolyether compound which can be understood as fluorine-containing oil, preferably a perfluoro(poly)ether compound (hereinafter, referred to as "fluorine-containing oil"), a stabilizer (dehydrating agents, molecular sieves, magnesium sulfate or methyl orthoformate), viscosity modifiers, fluorescent agents, colorants, heat resistance improvers, cold resistance improvers, rust preventives, liquid reinforcing agents, etc.

The above-mentioned fluorine-containing oil is not particularly limited and may be mentioned, for example, a compound (perfluoro(poly)ether compound) represented by the following general formula (III).

$$Rf^5—(OC_4F_8)_{a'}—(OC_3F_6)_{b'}—(OC_2F_4)_{c'}—(OCF_2)_{d'}—Rf^6 \quad \text{(III)}$$

In the formula, $Rf^5$ represents an alkyl group having 1 to 16 carbon atoms which may be substituted by one or more fluorine atoms (preferably a $C_{1-16}$ perfluoroalkyl group), $Rf^6$ represents an alkyl group having 1 to 16 carbon atoms which may be substituted by one or more fluorine atoms (preferably a $C_{1-16}$ perfluoroalkyl group), a fluorine atom or a hydrogen atom, $Rf^5$ and $Rf^6$ are more preferably each independently a $C_{1-3}$ perfluoroalkyl group.

a', b', c' and d' each represent a number of recurring units of four kinds of perfluoro(poly)ethers constituting the main skeleton of the polymer, each independently an integer of 0 or more and 300 or less, and a sum of a', b', c' and d' is at least 1, preferably 1 to 300, and more preferably 20 to 300. The order of existence of each repeating unit enclosed with parentheses by applying the subscripts a', b', c' or d' is arbitrary in the formula. Among these recurring units, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, preferably $—(OCF_2CF_2CF_2CF_2)—$. $—(OC_3F_6)—$ may be any of $—(OCF_2CF_2CF_2)—$, $—(OCF(CF_3)CF_2)—$ and $—(OCF_2CF(CF_3))—$, and preferably $—(OCF_2CF_2CF_2)—$. $—(OC_2F_4)—$ may be any of $—(OCF_2CF_2)—$ and $—(OCF(CF_3))—$, and preferably $—(OCF_2CF_2)—$.

Examples of the perfluoro(poly)ether compound represented by the general formula (III) may be mentioned a compound (it may be one kind or a mixture of two or more kinds) represented by any of the following general formulae (IIIa) and (IIIb).

$$Rf^5—(OCF_2CF_2CF_2)_{b''}—Rf^6 \quad \text{(IIIa)}$$

$$Rf^5—(OCF_2CF_2CF_2CF_2)_{a'''}—(OCF_2CF_2CF_2)_{b'''}—(OCF_2CF_2)_{c'''}—Rf^6 \quad \text{(IIIb)}$$

In these formulae, $Rf^5$ and $Rf^6$ are as defined above; in the formula (IIIa), b" is an integer of 1 or more and 100 or less; in the formula (IIIb), a''' and b''' are each independently an integer of 1 or more and 30 or less, and c''' and d''' are each independently an integer of 1 or more and 300 or less. The order of existence of each repeating unit enclosed with parentheses by applying the subscripts a''', b''', c''', d''' is arbitrary in the formula.

The above-mentioned fluorine-containing oil may have a number average molecular weight of 1,000 to 30,000. In particular, a number average molecular weight of the compound represented by the formula (IIIa) is preferably 2,000 to 8,000. In one embodiment, a number average molecular weight of the compound represented by the formula (IIIb) is 3,000 to 8,000. In another embodiment, a number average molecular weight of the compound represented by the formula (IIIb) is 8,000 to 30,000.

In the curable composition, the fluorine-containing oil can be contained in an amount of, for example, 0 to 500 parts by mass, preferably 0 to 100 parts by mass, more preferably 1 to 50 parts by mass, and further preferably 1 to 5 parts by mass based on 100 parts by mass of the PFPE-containing silane compound (a).

Also, from another point of view, the fluorine-containing oil may be a compound represented by the general formula Rf'—F (wherein, Rf' is a 05-16 perfluoroalkyl group.). Further, it may be a chlorotrifluoroethylene oligomer. The compound represented by Rf'—F and the chlorotrifluoroethylene oligomer are preferable in the point of obtaining high affinity with the PFPE-containing silane compound (a) wherein Rf is a $C_{1-16}$ perfluoroalkyl group.

By containing the fluorine-containing oil, the curable composition can form a more flexible cured composition.

In one embodiment, an average molecular weight of the fluorine-containing oil may be larger than an average molecular weight of the PFPE-containing silane compound (a) (or the compound represented by the formula (A), (B), (C) or (D)). By making such an average molecular weight, in the cured product formed by using the curable composition, more excellent friction durability and surface slipperiness can be obtained.

In one embodiment, an average molecular weight of the fluorine-containing oil may be smaller than an average molecular weight of the PFPE-containing silane compound (a) (or the compound represented by the formula (A), (B), (C) or (D)). By making such an average molecular weight, it can contribute to form a cured product having high friction durability and high surface slipperiness while suppressing lowering in transparency of the cured product formed by using the curable composition.

As a colorant, there may be mentioned pigments, dyes, etc.

As the heat resistance improver, there may be mentioned red iron oxide, cerium oxide, etc.

As the liquid reinforcing agent, there may be mentioned a network polysiloxane comprising triorganosiloxy units and $SiO_2$ units, etc.

(Method for Producing Curable Composition)

The curable composition can be produced by uniformly kneading Components (a) to (c) which are essential components and Components (D) to (H) which are optional components by a mixing means such as a universal kneader (planetary mixer), a kneader, etc. The order of addition of each component is arbitrary, and it is preferable that (E) which is optional component is added to a mixture of (a), and (F) and (G) which are optional components and dispersed therein, and then, (b), (c) and (D), and (H) which is optional component are added and mixed.

Regarding the constitution of the curable composition, it may be constituted as a so-called one-component type depending on the uses, or it may be a two-component type and both may be mixed at the time of use.

(Use)

The cured product of the curable composition can be used, for example, as a potting material, a sealing material, etc. The cured product of the curable composition can be used, for example, by filling in the voids of the electronic member (for example, a laminating portion between the housing and the printed circuit board, or a gap between the resin-molded metal terminal portion and the molded resin, etc.), and dried and cured.

For forming a cured product having higher wear resistance (for example, a potting material, a sealing material), it is preferable that, prior to the treatment by the curable composition of the present invention, the object to be treated is washed with acetone, hydrofluoroether, etc., and then, dried in order to remove oil content in a void wall. Further, in addition to the above-mentioned washing, if it is pretreated with UV ozone, oxygen plasma, etc., wear resistance of the cured product can be further improved.

Prior to the treatment by the curable composition of the present invention, if necessary, by subjecting to primer treatment to the void wall, etc., adhesiveness of the potting material formed from the curable composition is improved, and wear resistance thereof can be further improved. The primer treatment may be carried out according to the conventional method under the same conditions as the primer treatment when a silane coupling agent is used. As the substrate, metals such as aluminum, copper, nickel, iron, brass, stainless, etc.; polyester resins such as epoxy resin, polyethylene terephthalate, polybutylene terephthalate resin, etc., engineering plastics such as polycarbonate resin, acrylic resin, polyimide resin, phenol resin, polyamide resin, polyphenylene sulfide resin, etc.; and glass, etc.

Incidentally, when the cured product obtained from the curable composition of the present invention is to be adhered to various kinds of substrates, various kinds of primers may be used in combination.

A temperature at the time of curing treatment is not particularly limited, and usually the treatment may be carried out at room temperature. A treatment time is also not particularly limited and can be set to, for example, 5 minutes to 1 hour.

In one embodiment, the curable composition can be cured at room temperature. Such a curable composition is particularly useful as a composition for forming a potting material.

In one embodiment, when the curable composition of the present invention is to be used, the composition may be further diluted using a solvent and used depending on the use and purpose. As a solvent to be used for dilution, the fluorine atom-containing solvent exemplified above can be used. For example, it may be dissolved in 1,3-bis(trifluoromethyl) benzene, Fluorinert (available from 3M Company), perfluorobutyl methyl ether, perfluorobutyl ethyl ether, etc., as the solvent, at a desired concentration and used. In particular, in the use of the thin film coating, it is preferable to use the above-mentioned solvent.

Since the curable composition of the present invention can be cured deeply when used as an adhesive to a metal or plastic substrate, it can be useful as an adhesive for the use around electrical and electronic parts and around automobile parts. The cured product of the curable composition of the present invention can have good elastic modulus, chemical resistance, acid resistance and base resistance. Further, it can have a low glass transition temperature, can suppress to increase in elastic modulus at a low temperature, and has a high decomposition temperature. Such a cured product of the curable composition of the present invention can be used for automobile parts (for example, a sealing material, specifically, gaskets), etc., chemical plants, electrical and electronic parts such as semiconductor manufacturing equipment, etc., and automobile parts that can be used at cold regions (for example, −50° C. or lower) or under high temperature conditions, etc. The curable composition of the present invention can be cured to the deep part when it is used as an adhesive to a metal or plastic substrate, so that it can be particularly useful as an adhesive for the use of peripherals of electrical and electronic parts and peripherals of automobile parts.

EXAMPLES

The present invention will be explained more specifically by referring to the following Examples, but is not limited to these Examples. Incidentally, in the present Examples, the order of existence of recurring units constituting the perfluoro(poly)ether is arbitrary.

Production Example 1

Preparation of PFPE-Containing Silane Compound (a)

In 2,000 mL of a four-necked flask equipped with a reflux condenser, a thermometer and a stirrer were charged 1,000 g of a PFPE-modified ester material represented by an average composition of $CH_3OCO—CF_2—(OCF_2)_{29}—(OCF_2CF_2)_{17}—OCF_2—COOCH_3$ and 500 g of 1,3-bis(trifluoromethyl)benzene, and after adding 10 mL of ethylenediamine using a dropping funnel under nitrogen stream, the mixture was stirred at 25° C. for one hour. Subsequently, after adding 51 mL of 3-aminopropyltrimethoxysilane, the mixture was stirred at 25° C. for one hour. Thereafter, by distilling off the volatile component under reduced pressure, a PFPE-containing silane compound (a) represented by the following formula was obtained. Regarding the obtained PFPE-containing silane compound (a), integrated values of the peaks of $—\underline{CF_2}—CONH—CH_2CH_2CH_2—Si(OCH_3)_3$ and $—\underline{CF_2}—COOCH_3$ which is the raw material were compared by $^{19}$F-NMR analysis, and the silane terminalization rate was calculated to be 97 mol %.

PFPE-Containing Silane Compound (a)

$$(CH_3O)_3Si—CH_2CH_2CH_2—NHCO—CF_2—(OCF_2)_{29}—(OCF_2CF_2)_{17}—OCF_2—CONHCH_2CH_2NHCO—CF_2—(OCF_2)_{29}—(OCF_2CF_2)_{17}—OCF_2—CONH—CH_2CH_2CH_2—Si(OCH_3)_3$$

Production Example 2

Preparation of PFPE-Containing Silane Compound (a')

In 1,000 mL of a four-necked flask equipped with a reflux condenser, a thermometer and a stirrer was charged 1,000 g of a PFPE-modified ester material represented by an average composition of $CH_3OCO—CF_2—(OCF_2)_{29}—(OCF_2CF_2)_{17}—OCF_2—COOCH_3$, and after adding 102 mL of 3-aminopropyltrimethoxysilane under nitrogen stream, the mixture was stirred at 25° C. for one hour. Thereafter, by distilling off the volatile component under reduced pressure, a PFPE-containing silane compound (a') represented by the following formula was obtained. Regarding the obtained PFPE-containing silane compound (a'), integrated values of the peaks of $—\underline{CF_2}—CONH—CH_2CH_2CH_2—Si(OCH_3)_3$ and $—\underline{CF_2}—COOCH_3$ which is the raw material were compared by $^{19}$F-NMR analysis, and the silane terminalization rate was calculated to be 95 mol %.

PFPE-Containing Silane Compound (a')

$$(CH_3O)_3Si—CH_2CH_2CH_2—NHCO—CF_2—(OCF_2)_{29}—(OCF_2CF_2)_{17}—OCF_2—CONH—CH_2CH_2CH_2—Si(OCH_3)_3$$

PFPE-Modified Ester Material $$CH_3OCO—CF_2—(OCF_2)_{29}—(OCF_2CF_2)_{17}—OCF_2—COOCH_3$$

Production Example 3

Preparation of PFPE-Containing Silane Compound (b)

In 2,000 mL of a four-necked flask equipped with a reflux condenser, a thermometer and a stirrer were charged 1,000 g of a PFPE-modified ester material represented by an average composition of $CH_3CH_2OCO—CF_2—(OCF_2)_{12}—(OCF_2CF_2)_{12}—OCF_2—COOCH_2CH_3$ and 500 g of 1,3-bis(trifluoromethyl)benzene, and after adding 13 mL of ethylenediamine using a dropping funnel under nitrogen stream, the mixture was stirred at 25° C. for one hour. Subsequently, after adding 69 mL of 3-aminopropyltrimethoxysilane, the mixture was stirred at 25° C. for one hour. Thereafter, by distilling off the volatile component under reduced pressure, a PFPE-containing silane compound (b) represented by the following formula was obtained. Regarding the obtained PFPE-containing silane compound (b), integrated values of the peaks of $—\underline{CF_2}—CONH—CH_2CH_2CH_2—Si(OR')_3$ and $—\underline{CF_2}—COOCH_2CH_3$ which is the raw material were compared by $^{19}$F-NMR analysis, and the silane terminalization rate was calculated to be 98 mol %. Incidentally, as R' in the following formula, $CH_3$ was 89 mol % and $CH_2CH_3$ was 11 mol % by $^{1}$H-NMR analysis.

PFPE-Containing Silane Compound (b)

$$(R'O)_3Si—CH_2CH_2CH_2—NHCO—CF_2—(OCF_2)_{12}—(OCF_2CF_2)_{12}—OCF_2—CONHCH_2CH_2NHCO—CF_2—(OCF_2)_{12}—(OCF_2CF_2)_{12}—$$

$$—OCF_2—CONH—CH_2CH_2CH_2—Si(OR')_3$$

Production Example 4

Preparation of PFPE-Containing Silane Compound (b')

In 1,000 mL of a four-necked flask equipped with a reflux condenser, a thermometer and a stirrer was charged 1,000 g of a PFPE-modified ester material represented by an average composition of $CH_3CH_2OCO—CF_2—(OCF_2)_{12}—(OCF_2CF_2)_{12}—OCF_2—COOCH_2CH_3$, and after adding 141 mL of 3-aminopropyltrimethoxysilane under nitrogen stream, the mixture was stirred at 25° C. for one hour. Thereafter, by distilling off the volatile component under reduced pressure, a PFPE-containing silane compound (b') represented by the following formula was obtained. Regarding the obtained PFPE-containing silane compound (b'), integrated values of the peaks of $—\underline{CF_2}—CONH—CH_2CH_2CH_2—Si(OR')_3$ and $—\underline{CF_2}—COOCH_3$ which is the raw material were compared by $^{19}F$-NMR analysis, and the silane terminalization rate was calculated to be 99 mol %. Incidentally, as R' in the following formula, $CH_3$ was 91 mol % and $CH_2CH_3$ was 9 mol % by $^1H$-NMR analysis.

PFPE-Containing Silane Compound (b')

$$(RO')_3Si—CH_2CH_2CH_2—NHCO—CF_2—(OCF_2)_{12}—(OCF_2CF_2)_{12}—OCF_2—CONH—CH_2CH_2CH_2—Si(OR')_2$$

Production Example 5

Preparation of PFPE-Containing Silane Compounds (c1) and (c2)

A PFPE mixture 1 containing the following Components (C1) and (C2) was prepared.

$$CH_3OCO—CF(CF_3)—\{OCF_2CF(CF_3)\}_m—OCF_2CF_2O—\{CF(CF_3)CF_2O\}_n—CF(CF_3)—COOCH_3 \quad (C1)$$

(m + n =12)

$$CF_3CF_2CF_2O—\{CF(CF_3)CF_2O\}_{12}—CF(CF_3)—COOCH_3 \quad (C2)$$

(C1):(C2) = 85:15 (molar ratio)

In 2,000 mL of a four-necked flask equipped with a reflex condenser, a thermometer and a stirrer were charged 1,000 g of the PFPE mixture 1 and 500 g of 1,3-bis(trifluoromethyl)benzene, using a dropping funnel under nitrogen stream, and after adding 13 mL of ethylenediamine using a dropping funnel, the mixture was stirred at 70° C. for 10 hours. Subsequently, after adding 57 mL of 3-aminopropyltrimethoxysilane, the mixture was stirred at 70° C. for 12 hours. Thereafter, by distilling off the volatile component under reduced pressure, PFPE-containing silane compounds (c1) and (c2) represented by the following formulae were obtained. Regarding the obtained PFPE-containing silane compounds (c1) and (c2), integrated values of the peaks of $—\underline{CF}(CF_3)—CONH—CH_2CH_2CH_2—Si(OCH_3)_3$ and $—\underline{CF}(CF_3)—COOCH_3$ which is the raw material were compared by $^{19}F$-NMR analysis, and the silane terminalization rate was calculated to be 99 mol %.

PFPE-Containing Silane Compound (c1)

$$(CH_3O)_3Si—CH_2CH_2CH_2—NHCO—CF(CF_3)—\{OCF_2CF(CF_3)\}_m—OCF_2CF_2O—\{CF(CF_3)CF_2O\}_n—CF(CF_3)—CONHCH_2CH_2NHCO—$$

$$—CF(CF_3)—\{OCF_2CF(CF_3)\}_{m'}—OCF_2CF_2O—\{CF(CF_3)CF_2O\}_{n'}—CF(CF_3)—CONH—CH_2CH_2CH_2—Si(OCH_3)_3$$

(wherein, m + n = 12, m' + n' = 12)

PFPE-Containing Silane Compound (c2)

$$CF_3CF_2CF_2O—\{CF(CF_3)CF_2O\}_{12}—CF(CF_3)—CONHCH_2CH_2NHCO—CF(CF_3)—\{OCF_2CF(CF_3)\}_m—OCF_2CF_2O—\{CF(CF_3)CF_2O\}_n—CF(CF_3)—CONH—CH_2CH_2CH_2—Si(OCH_3)_3$$

(wherein, m + n = 12)

Production Example 6

Preparation of PFPE-Containing Silane Compounds (c1') and (c2')

In 1,000 mL of a four-necked flask equipped with a reflux condenser, a thermometer and a stirrer were charged 1,000 g of the PFPE mixture 1 and 500 g of 1,3-bis(trifluoromethyl)benzene, under nitrogen stream, and after adding 123 mL of 3-aminopropyltrimethoxysilane, the mixture was stirred at 70° C. for 12 hours. Thereafter, by distilling off the volatile component under reduced pressure, PFPE-containing silane compounds (c1') and (c2') represented by the following formulae were obtained. Regarding the obtained PFPE-containing silane compounds (c1') and (c2'), integrated values of the peaks of $—CF(CF_3)—CONH—CH_2CH_2CH_2—Si(OCH_3)_3$ and $—CF(CF_3)—COOCH_3$ which is the raw material were compared by $^{19}$F-NMR analysis, and the silane terminalization rate was calculated to be 98 mol %.

PFPE-Containing Silane Compound (c1')

$$(CH_3O)_3Si—CH_2CH_2CH_2—NHCO—CF(CF_3)—\{OCF_2CF(CF_3)\}_m—OCF_2CF_2O—\{CF(CF_3)CF_2O\}_n—CF(CF_3)—CONH—CH_2CH_2CH_2—Si(OCH_3)_3 \text{ (wherein, } m+n=12)$$

PFPE-Containing Silane Compound (c2')

$$CF_3CF_2CF_2O—\{CF(CF_3)CF_2O\}_{12}—CF(CF_3)—CONH—CH_2CH_2CH_2—Si(OCH_3)_3$$

Example 1

Preparation of Curable Composition

In a glass apparatus for mixing were weighed 100 parts by mass of the PFPE-containing silane compound (a), 2 parts by mass of methyltrimethoxysilane as a crosslinking agent and 0.1 part by mass of dibutylbis(triethoxysiloxy)tin as a catalyst, and stirring was carried out using a magnetic stirrer to produce a curable composition.

Example 2

In the same manner as in Example 1 except for using 2 parts by mass of diisopropoxytitanium bis(ethylacetacetate) as a catalyst in place of dibutylbis(triethoxy-siloxy)tin, a curable composition was produced.

Example 3

In the same manner as in Example 2 except for changing the PFPE-containing silane compound (a) to the PFPE-containing silane compound (b) of Production Example 3, a curable composition was produced.

Comparative Example 1

In the same manner as in Example 1 except for changing the PFPE-containing silane compound (a) to the following compound (a'), a curable composition was produced.

Comparative Example 2

In the same manner as in Example 2 except for changing the PFPE-containing silane compound (a) to the above-mentioned compound (a'), a curable composition was produced.

(Deep Part Curability Test)

The curable composition produced in each Example and Comparative Example were poured into a mold made of polytetrafluoroethylene (PTFE) having a height and width of 5 cm and a depth of 2 mm so as to have a height of 20 mm, and placed in an atmosphere of 23° C., and a relative humidity of 50%. Whether it is cured or not was judged by observing the interface between the solid and the liquid, the distance from the surface to the cured portion was measured, and the time required for curing to a thickness of 500 μm was measured. The results are shown in the following Table 1.

TABLE 1

| | 500 μm curing time (hr) |
|---|---|
| Example 1 | 18 |
| Example 2 | 27 |
| Example 3 | 24 |
| Comparative Example 1 | 44 |
| Comparative Example 2 | 48 |

As shown in Table 1, in Examples, that is, the curable compositions using the PFPE-containing silane compound (a) or (b) wherein r=1 or more in the general formula (I), the time of curing to a thickness of 500 μm was short, and it could be understood that they were excellent in deep part curability. On the other hand, in Comparative Examples, that is, the compound wherein r=0 in the general formula (I), the time of curing to a deep part was long, and thus, the curable compositions of Examples were superior in the points of reliability that the adhesion of an adhesive substrate could be carried out more certainly and stably, and operability that stable adhesion of the substrate could be completed in a short time.

UTILIZABILITY IN INDUSTRY

The present invention provides a curable composition which can be cured by moisture at room temperature and cures to a deep part. Since it is good in deep part curability, the curable composition of the present invention has high reliability in adhesion, and can be suitably used in peripherals of electrical and electronic parts and peripheral uses of automobile parts.

The invention claimed is:

1. A curable composition which comprises (a) a perfluoro(poly)ether group-containing silane compound represented by the following general formula (I):

(I)

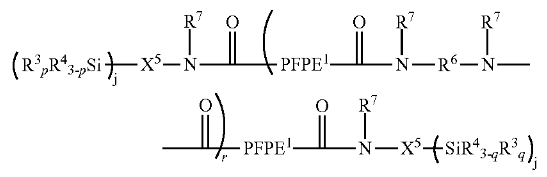

wherein,
$R^3$s each independently represent a hydrogen atom or a monovalent organic group at each appearance,
$R^4$s each independently represent a hydroxyl group or a hydrolyzable group(s) at each appearance,
$R^5$s each independently represent a divalent alkylene group at each appearance,
$R^6$s each independently represent a divalent organic group at each appearance,
$R^7$s are all hydrogen atoms,
$PFPE^1$s each independently represent a divalent perfluoro (poly)ether group represented by the formula:

$$-(C_fF_{2f})-(OCF_2)_{a1}-(OC_2F_4)_{a2}-(OC_3X^{10}{}_6)_{a3}-(OC_4F_8)_{a4}-(OC_5F_{10})_{a5}-(OC_6F_{12})_{a6}-(OC_7F_{14})_{a7}-(OC_8F_{16})_{a8}-$$

wherein, f is an integer of 1 or more and 10 or less, a1, a2, a3, a4, a5, a6, a7 and a8 are each independently an integer of 0 or more and 200 or less, a sum of a1, a2, a3, a4, a5, a6, a7 and a8 is an integer of 5 or more and 200 or less, and the unit represented by $(C_fF_{2f})$ is located at the left end of the group, the order of existence of each repeating unit enclosed in parentheses with the subscript a1, a2, a3, a4, a5, a6, a7 or a8 is arbitrary in the formula, $X^{10}$s are each independently a hydrogen atom, a fluorine atom or a chlorine atom at each appearance, provided that when all $X^{10}$s are hydrogen atoms or chlorine atoms, at least one of a1, a2, a4, a5, a6, a7 and a8 is an integer of 1 or more at each appearance,
j is 1,
p and q are each 0 or 1, and
r is an integer of 1 or more;

(b) an organic silicon compound having at least two $OR^2$ groups, where, $R^2$s are each independently a hydrogen atom or a monovalent organic group at each appearance, bonded to an Si atom, provided that, the (a) PFPE-containing silane compound is excluded, or a partially hydrolyzed condensate thereof; and (c) a condensation catalyst.

2. The curable composition according to claim 1, wherein r in the perfluoro(poly)ether group-containing silane compound is an integer of 1 or more and 5 or less.

3. The curable composition according to claim 2, wherein $R^6$s in the perfluoro(poly)ether group-containing silane compound are divalent alkylene groups.

4. The curable composition according to claim 1, wherein the $PFPE^1$ in the perfluoro(poly)ether group-containing silane compound is a divalent perfluoro(poly)ether group represented by the formula:

$$-(C_fF_{2f})-(OCF_2)_{a1}-(OCF_2CF_2)_{a21}-(OCF(CF_3))_{a2'}-(OCF_2CF_2CF_2)_{a31}-(OCF_2CF(CF_3))_{a3'}-(OCF(CF_3)CF_2)_{a3''}-(OCF_2CF_2CF_2CF_2)_{a4}-$$

where, f is an integer of 1 or more and 4 or less, a21, a2', a31, a3' and a3" are each independently an integer of 0 or more and 200 or less, a sum of a21 and a2' equals to a2, a sum of a31, a3' and a3" equals to a3, a sum of a1, a21, a2', a31, a3', a3" and a4 is 5 or more, and the order of existence of each repeating unit is arbitrary in the formula.

5. The curable composition according to claim 4, wherein, in the $PFPE^1$ of the perfluoro(poly)ether group-containing silane compound, a1 is an integer of 0 or more and 50 or less, a2 is an integer of 0 or more and 50 or less, a3 is an integer of 0 or more and 30 or less, a4 is an integer of 0 or more and 30 or less, and a sum of a1, a2, a3 and a4 is 5 or more and 200 or less.

6. The curable composition according to claim 1, wherein Component (b) contains a compound represented by the following formula:

$$R^1_nSi(OR^2)_{4-n}$$

wherein, $R^1$s each independently represent a substituted or unsubstituted monovalent hydrocarbon group at each appearance, $R^2$s each independently represent a hydrogen atom or a monovalent organic group at each appearance, and n is 0, 1 or 2, or a partially hydrolyzed condensate thereof.

7. The curable composition according to claim 6, wherein Component (b) further contains a compound represented by the following formula (B2):

(B2)

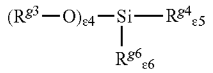

wherein, $R^{g3}$s are each independently a hydrogen atom or a monovalent organic group at each appearance, $R^{g4}$ is a substituted or unsubstituted monovalent hydrocarbon group, $R^{g6}$s are each independently $R^{g8}$—$R^{g7}$— at each appearance, $R^{g7}$s are each independently an alkylene group having 1 to 10 carbon atoms or a group having 1 to 10 carbon atoms and containing a nitrogen atom(s) or an oxygen atom(s) in a main chain at each appearance, $R^{g8}$s are each independently a primary amino group, an epoxy group, a (meth)acryloyl group, a (meth)acryloxy group, a mercapto group or an isocyanate group at each appearance, ε4 is 2 or 3, ε5 is 0 or 1, and ε6 is 1 or 2, provided that a sum of ε4, ε5 and ε6 is 4, or a partially hydrolyzed condensate thereof.

* * * * *